(12) United States Patent
Swenson

(10) Patent No.: US 6,596,213 B2
(45) Date of Patent: Jul. 22, 2003

(54) METHOD OF MOLDING MULTI-LAYER POLYMER PLASTIC ARTICLES WITH CONTROL OF RELATIVE SHIFTING OF THE CORE LAYER

(75) Inventor: Paul Swenson, Hamilton, MA (US)

(73) Assignee: Kortec, Inc., Beverly, MA (US)

( * ) Notice: Subject to any disclaimer, the term of this patent is extended or adjusted under 35 U.S.C. 154(b) by 100 days.

(21) Appl. No.: 09/828,254

(22) Filed: Apr. 6, 2001

(65) Prior Publication Data

US 2002/0192404 A1 Dec. 19, 2002

(51) Int. Cl.[7] .............................................. B29C 45/16
(52) U.S. Cl. ................ 264/255; 264/328.8; 264/328.12
(58) Field of Search ............................. 264/255, 328.8, 264/328.12, 513, 537, 40.7, DIG. 57; 425/129.1, 130, 133.1, 573

(56) References Cited

U.S. PATENT DOCUMENTS

| | | | | |
|---|---|---|---|---|
| 4,174,413 A | * | 11/1979 | Yasuike et al. ............ 215/12.2 |
| 4,526,821 A | * | 7/1985 | McHenry et al. ......... 206/524.6 |
| 5,914,138 A | * | 6/1999 | Swenson ..................... 425/130 |
| 6,063,325 A | * | 5/2000 | Nahill et al. ........... 264/328.12 |
| 6,099,780 A | * | 8/2000 | Gellert ........................ 264/255 |
| 6,187,241 B1 | * | 2/2001 | Swenson ..................... 264/255 |
| 6,350,401 B1 | * | 2/2002 | Gellert et al. ............... 264/255 |
| 6,440,350 B1 | * | 8/2002 | Gellert et al. ............ 264/328.1 |

* cited by examiner

Primary Examiner—Angela Ortiz
(74) Attorney, Agent, or Firm—Rines and Rines

(57) ABSTRACT

A novel technique for molding multi-layer polymer plastic articles having inner, outer and interior or core layers by controlling relative volumetric flow rates of the inner and outer layers to enable relative shifting of the position of the core, and also the relative thickness of the inner and outer layers in the molded articles; and with leading, and, where desired, trailing ends of the interior layer flow into the mold cavity substantially positioned on the zero gradient of the velocity profile of the flowing polymer streams.

28 Claims, 56 Drawing Sheets

PARTIALLY FILLED
AT TIME = D

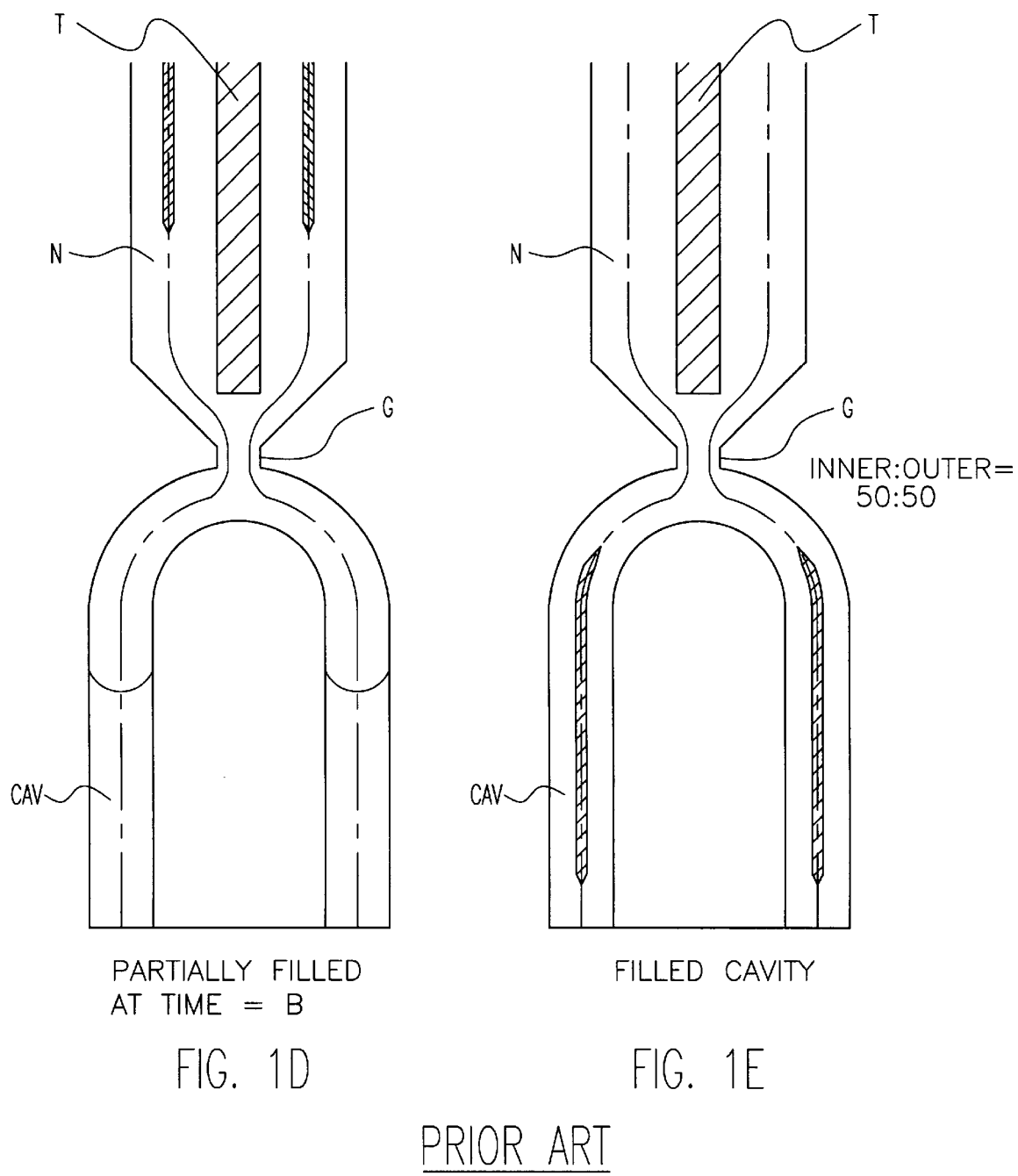
FIG. 1D — PARTIALLY FILLED AT TIME = B
FIG. 1E — FILLED CAVITY, INNER:OUTER= 50:50
PRIOR ART

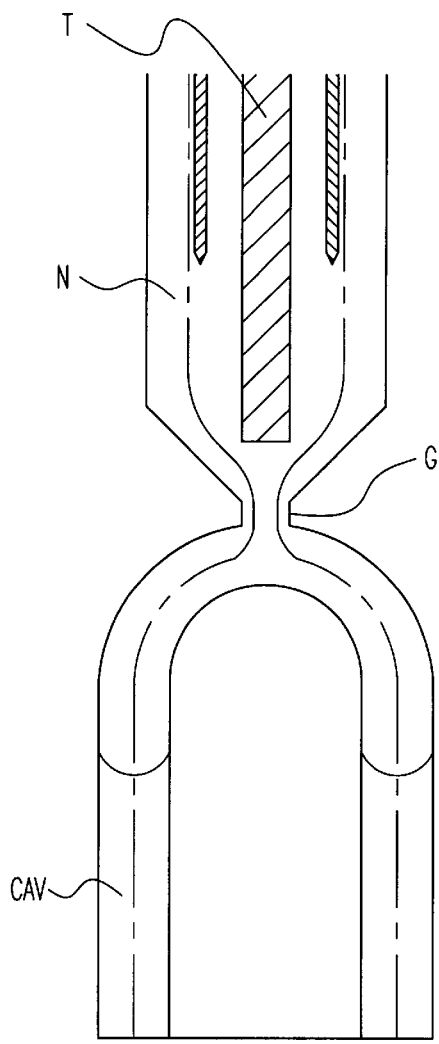
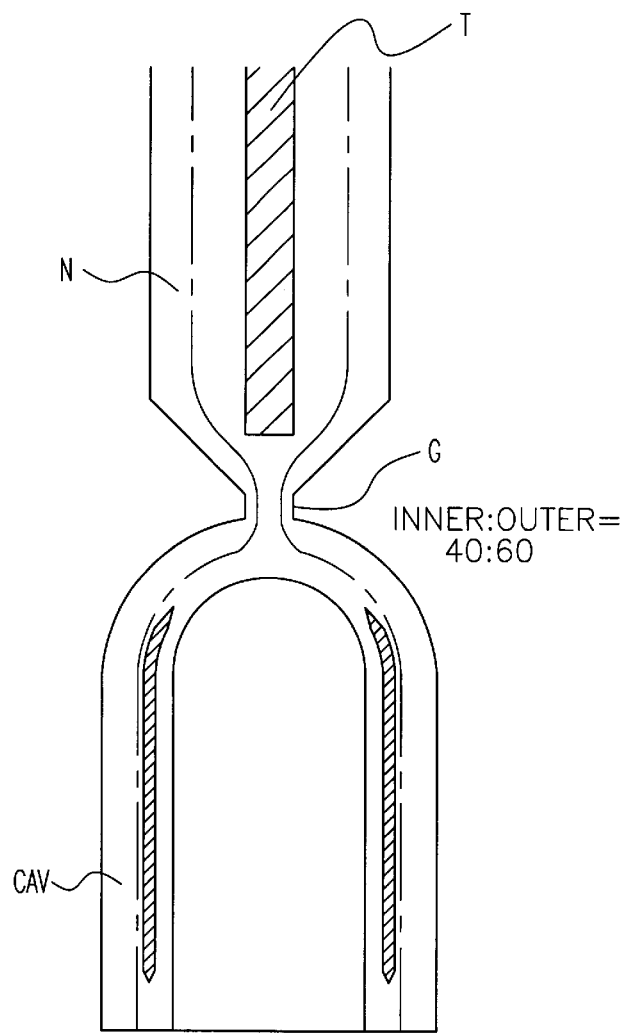
PARTIALLY FILLED
AT TIME = B
FIG. 2B
FILLED CAVITY
FIG. 2C

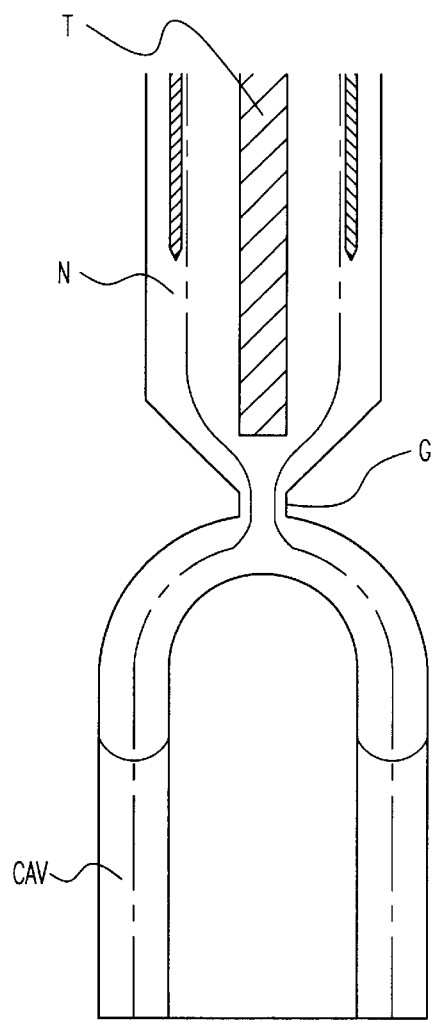
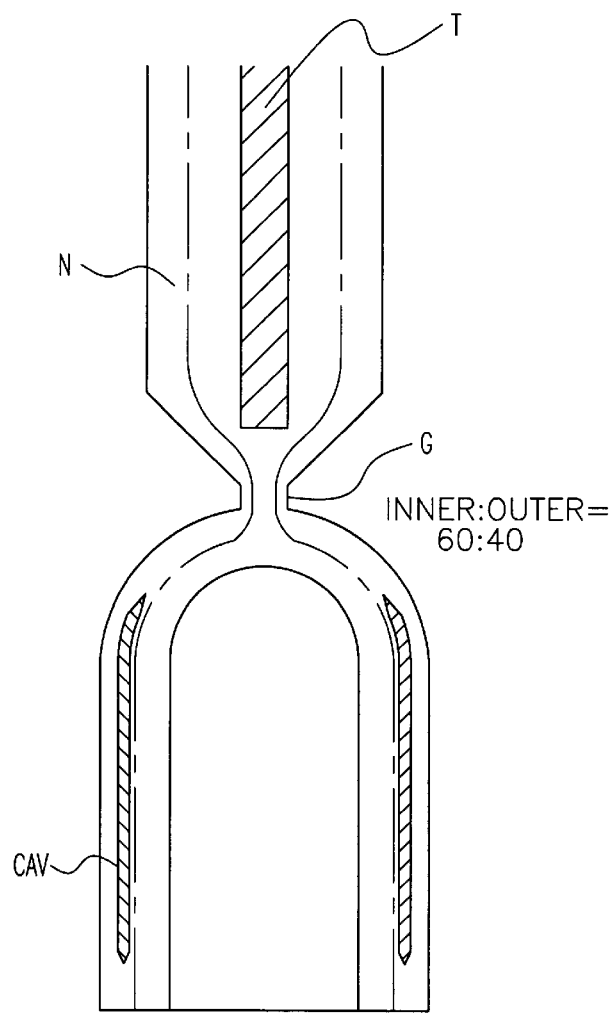
PARTIALLY FILLED
AT TIME = B
FIG. 3B
FILLED CAVITY
FIG. 3C

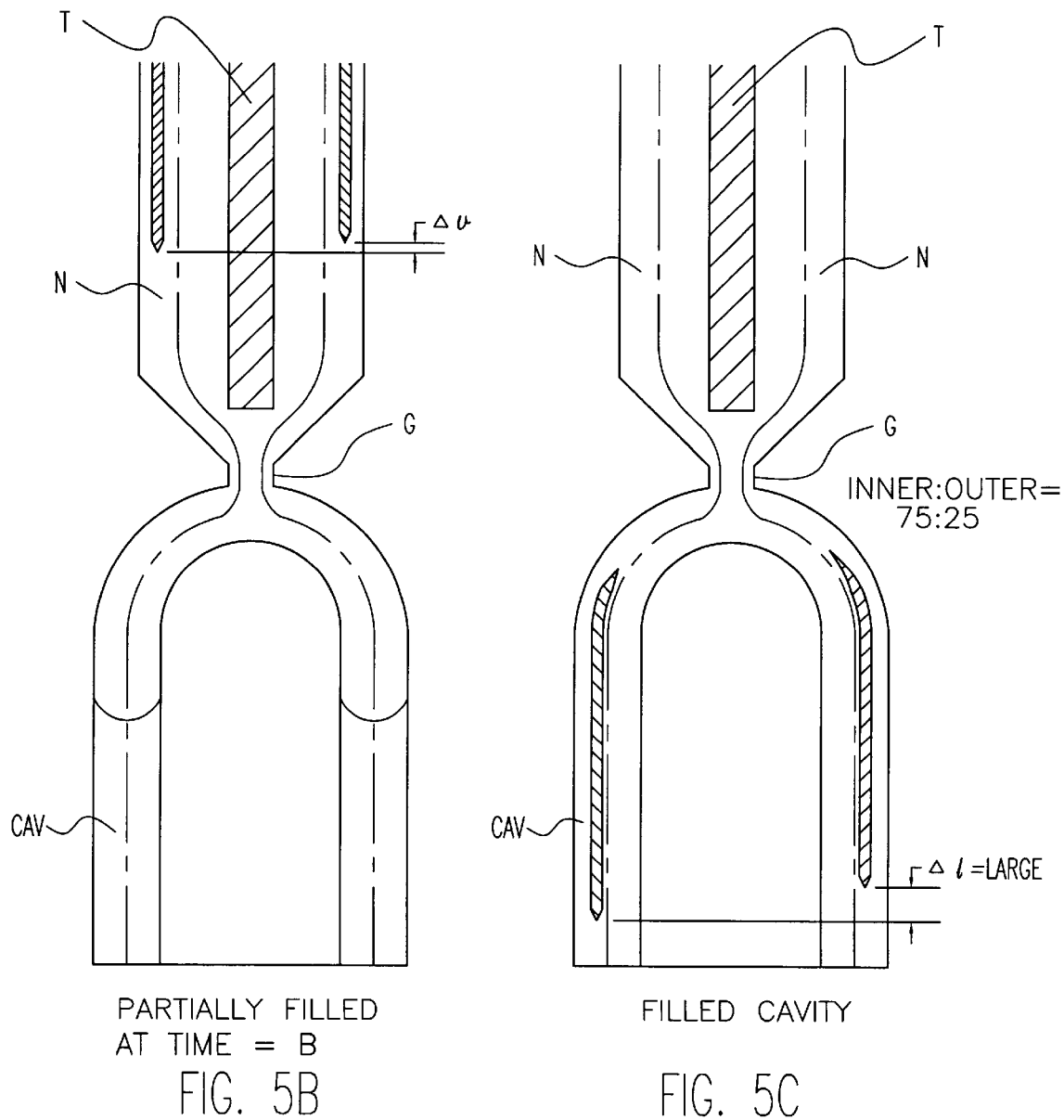
FIG. 5B — PARTIALLY FILLED AT TIME = B
FIG. 5C — FILLED CAVITY

PARTIALLY FILLED
AT TIME = B

FILLED CAVITY

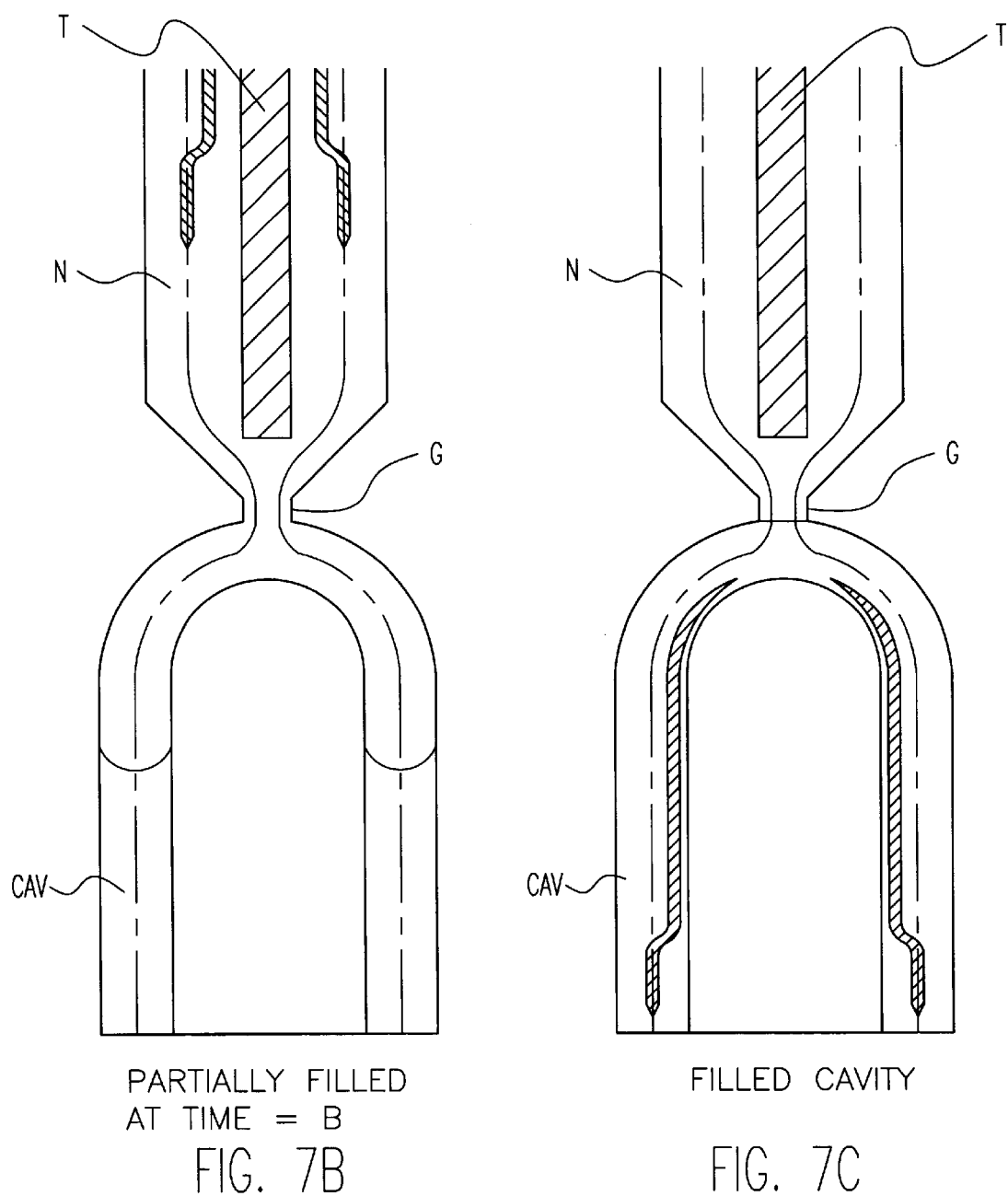
FIG. 7B — PARTIALLY FILLED AT TIME = B
FIG. 7C — FILLED CAVITY

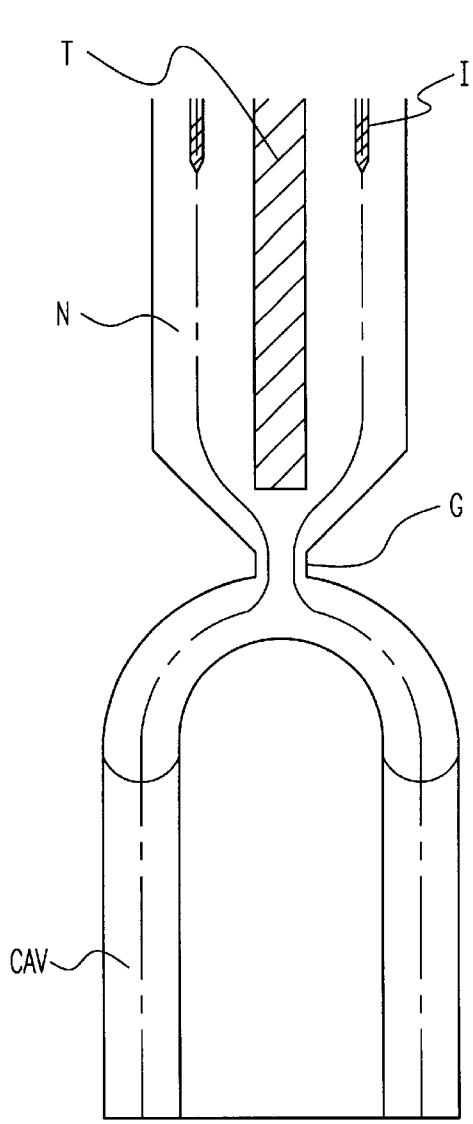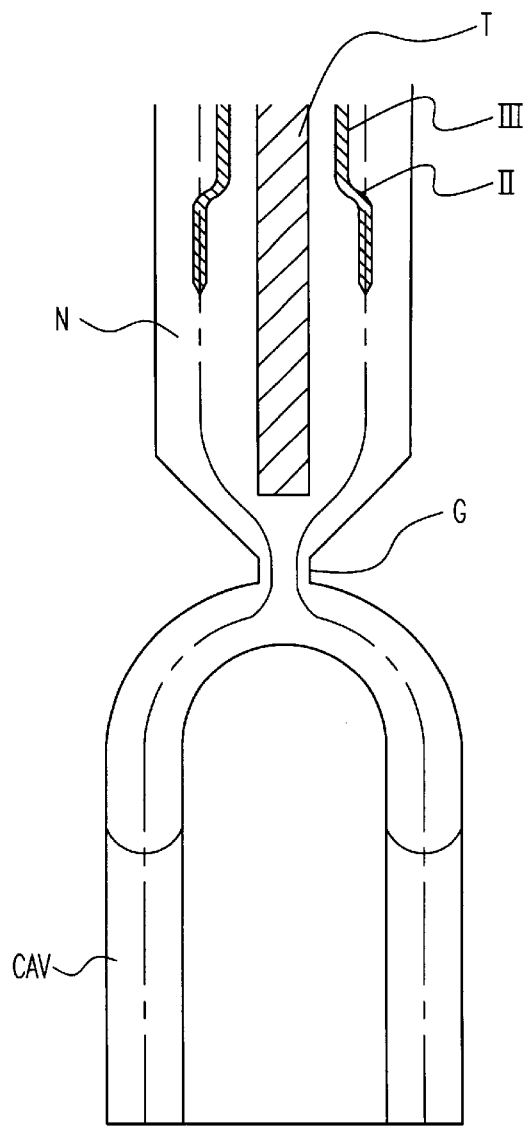
PARTIALLY FILLED AT TIME = A
FIG. 8A
PARTIALLY FILLED AT TIME = B
FIG. 8B

PARTIALLY FILLED
AT TIME = D

FILLED CAVITY

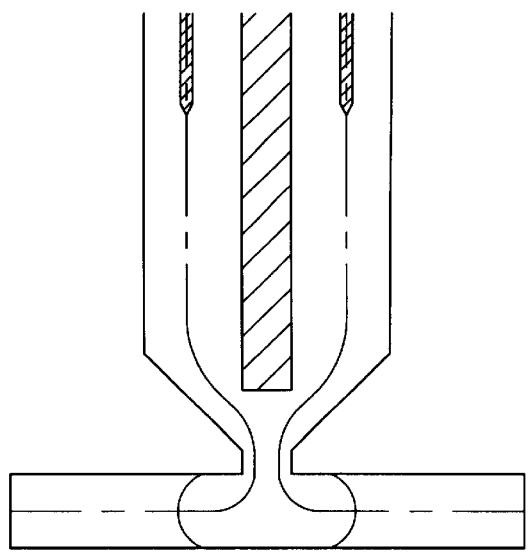 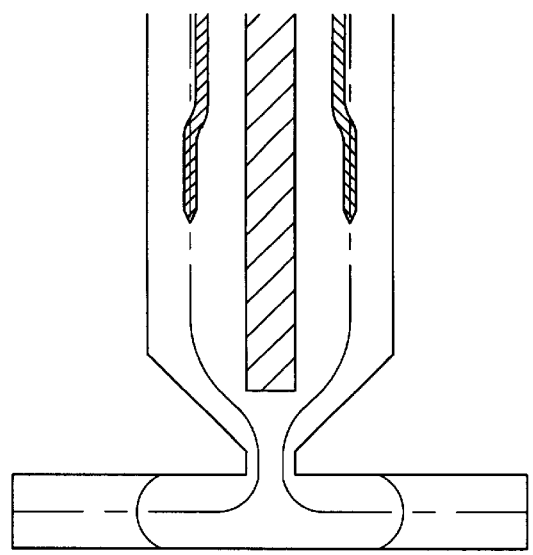
PARTIALLY FILLED
AT TIME = A
FIG. 8F
PARTIALLY FILLED
AT TIME = B
FIG. 8G

PARTIALLY FILLED
AT TIME = D

FILLED CAVITY

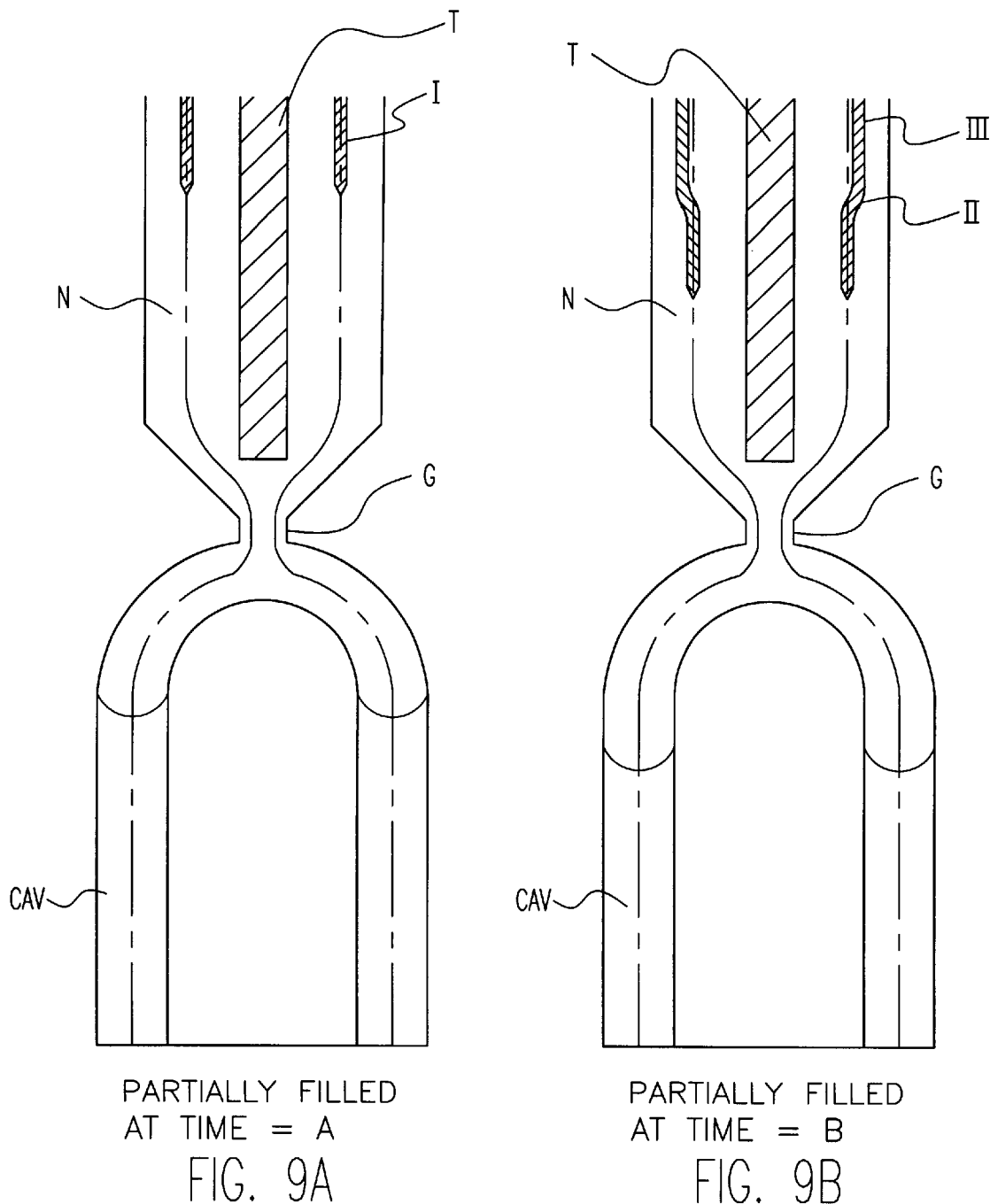
FIG. 9A — PARTIALLY FILLED AT TIME = A
FIG. 9B — PARTIALLY FILLED AT TIME = B

PARTIALLY FILLED
AT TIME = D

FILLED CAVITY

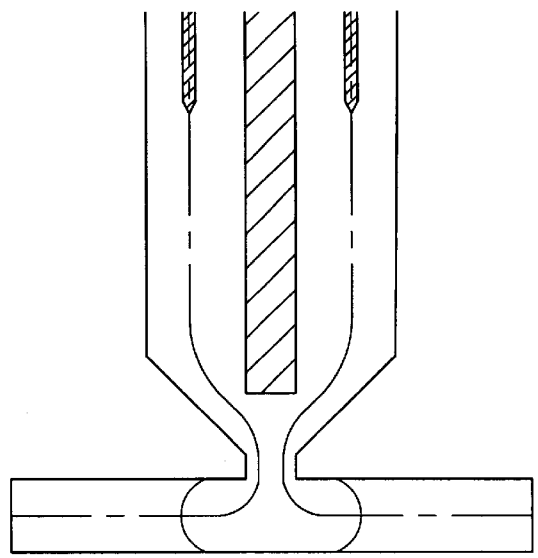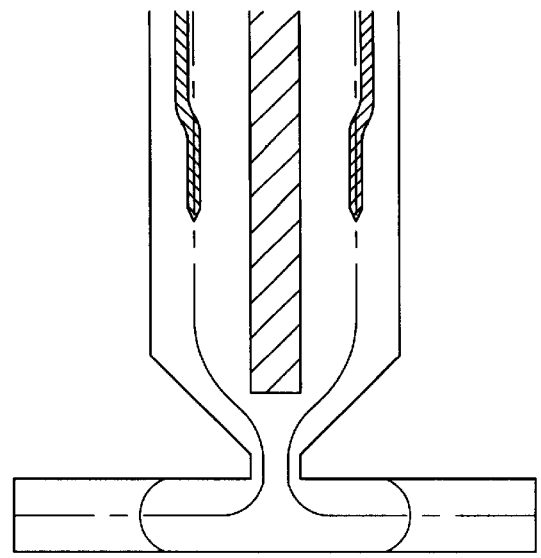
PARTIALLY FILLED
AT TIME = A
FIG. 9F
PARTIALLY FILLED
AT TIME = B
FIG. 9G

PARTIALLY FILLED
AT TIME = D

FILLED CAVITY

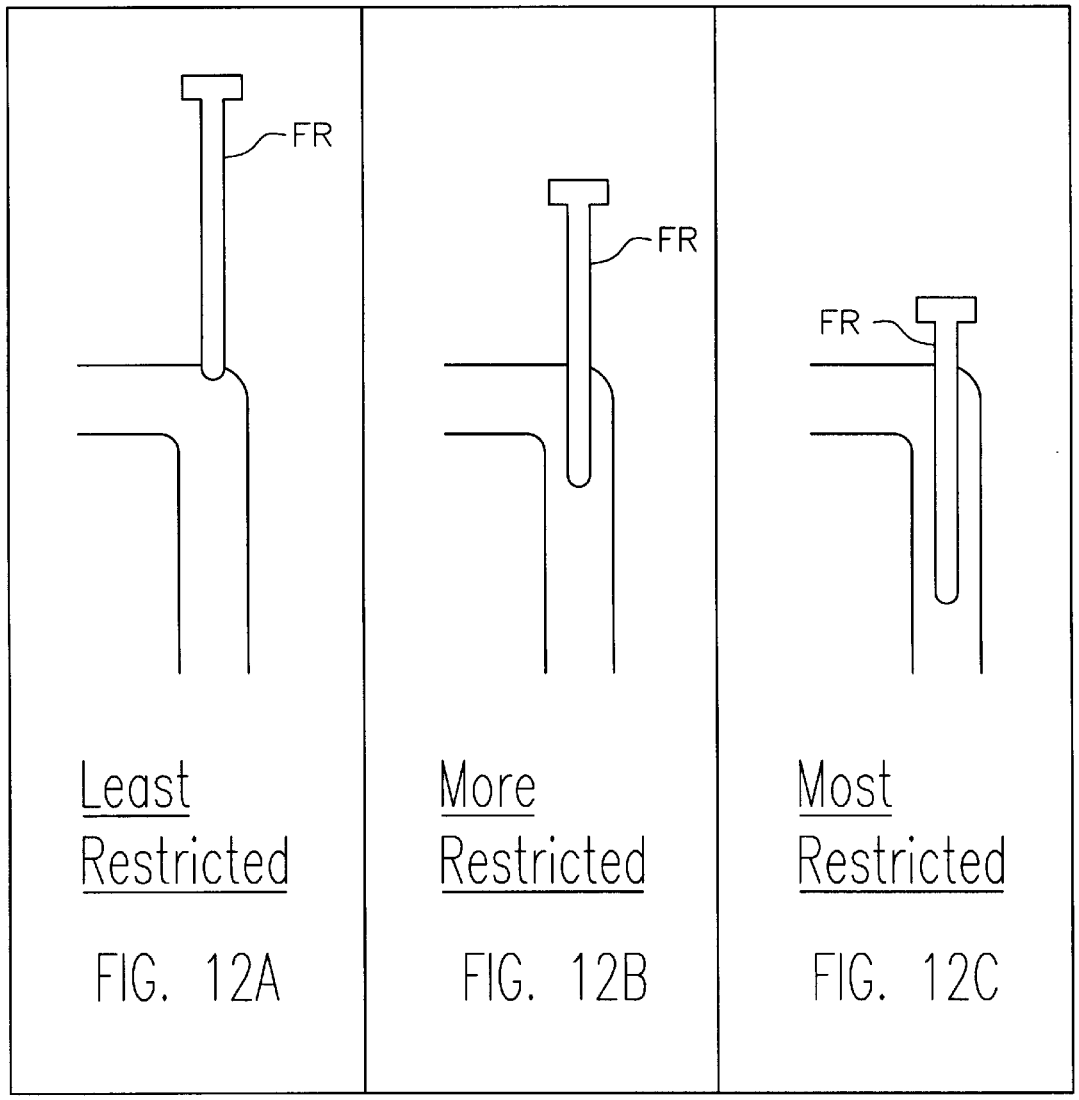

Least Restricted

Most Restricted

Nozzle Top View

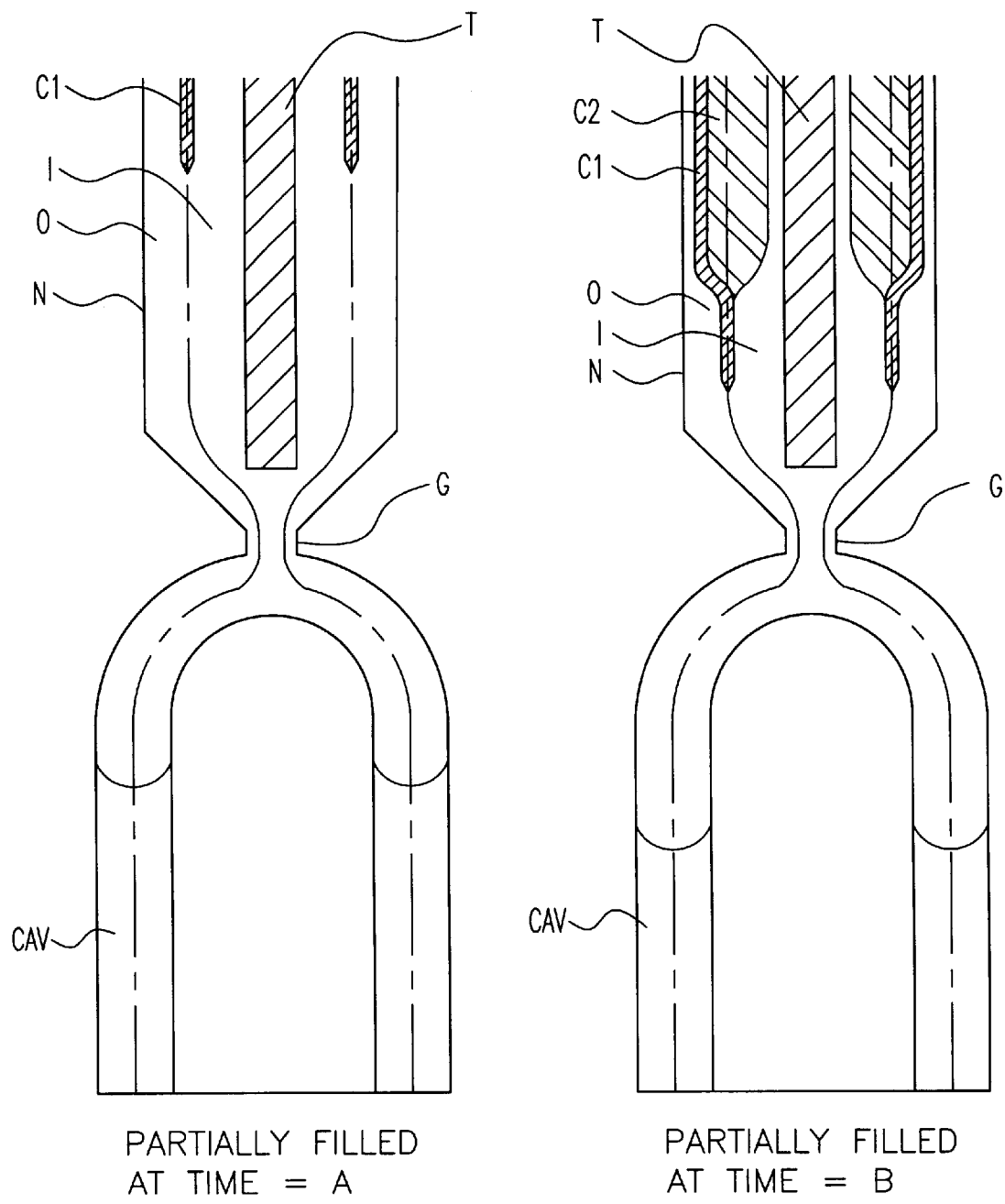

PARTIALLY FILLED
AT TIME = C

FILLED CAVITY

PARTIALLY FILLED
AT TIME = A

PARTIALLY FILLED
AT TIME = B

PARTIALLY FILLED
AT TIME = C

FILLED CAVITY

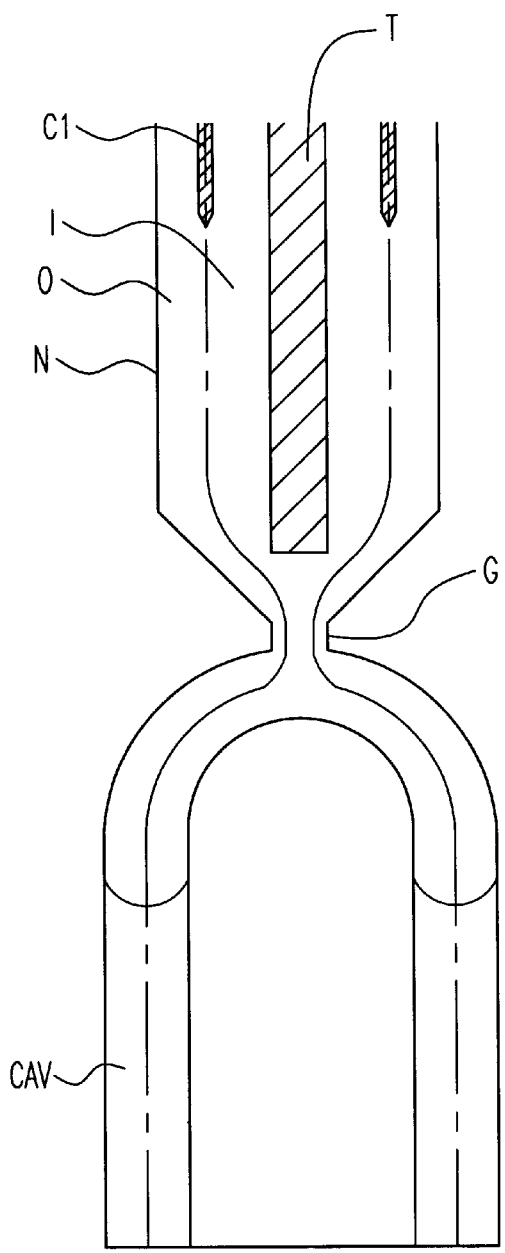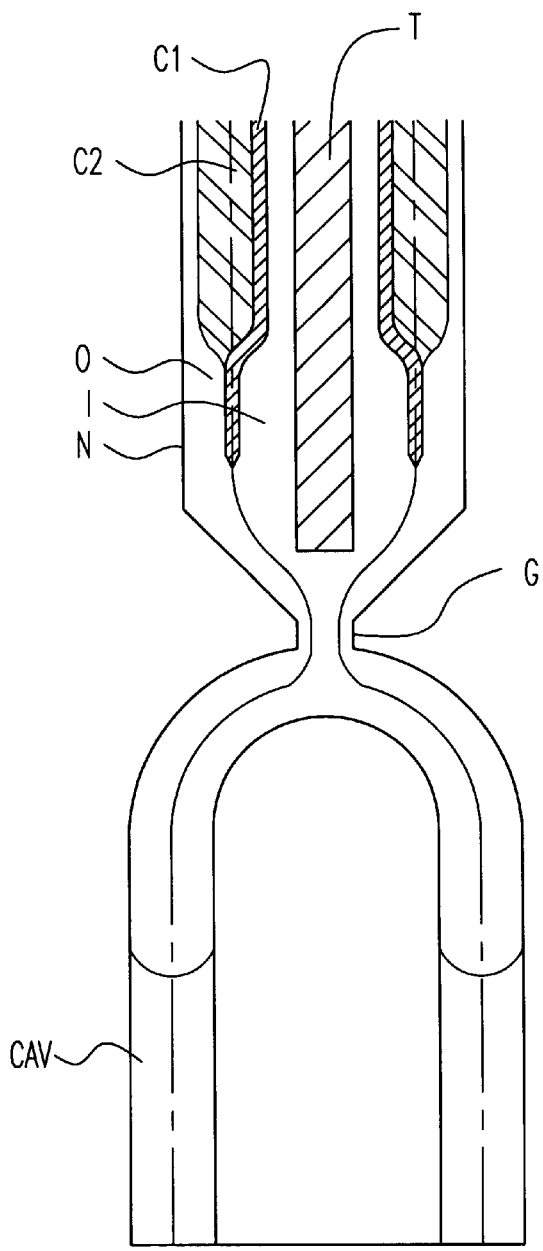
FIG. 19A — PARTIALLY FILLED AT TIME = A
FIG. 19B — PARTIALLY FILLED AT TIME = B

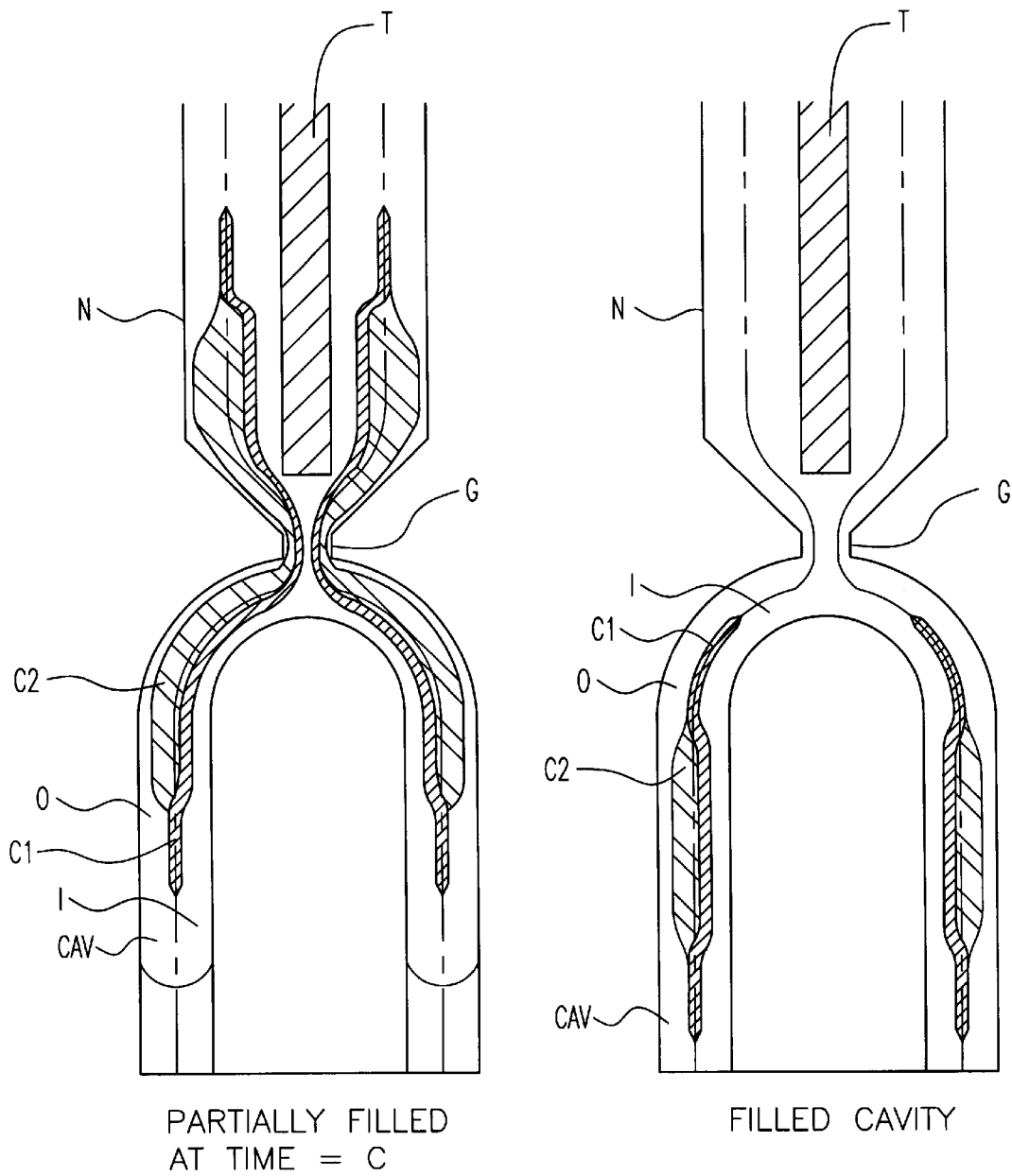

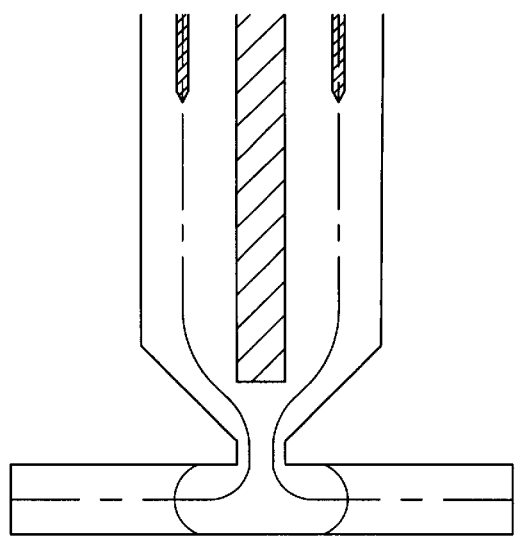 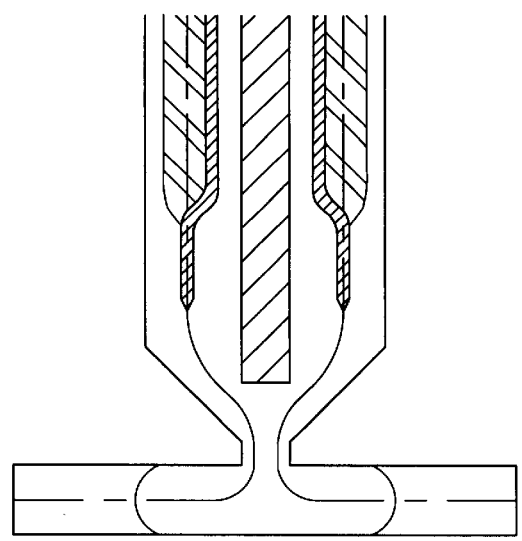
PARTIALLY FILLED
AT TIME = A
PARTIALLY FILLED
AT TIME = B
FIG. 20A
FIG. 20B

PARTIALLY FILLED
AT TIME = C

FILLED CAVITY

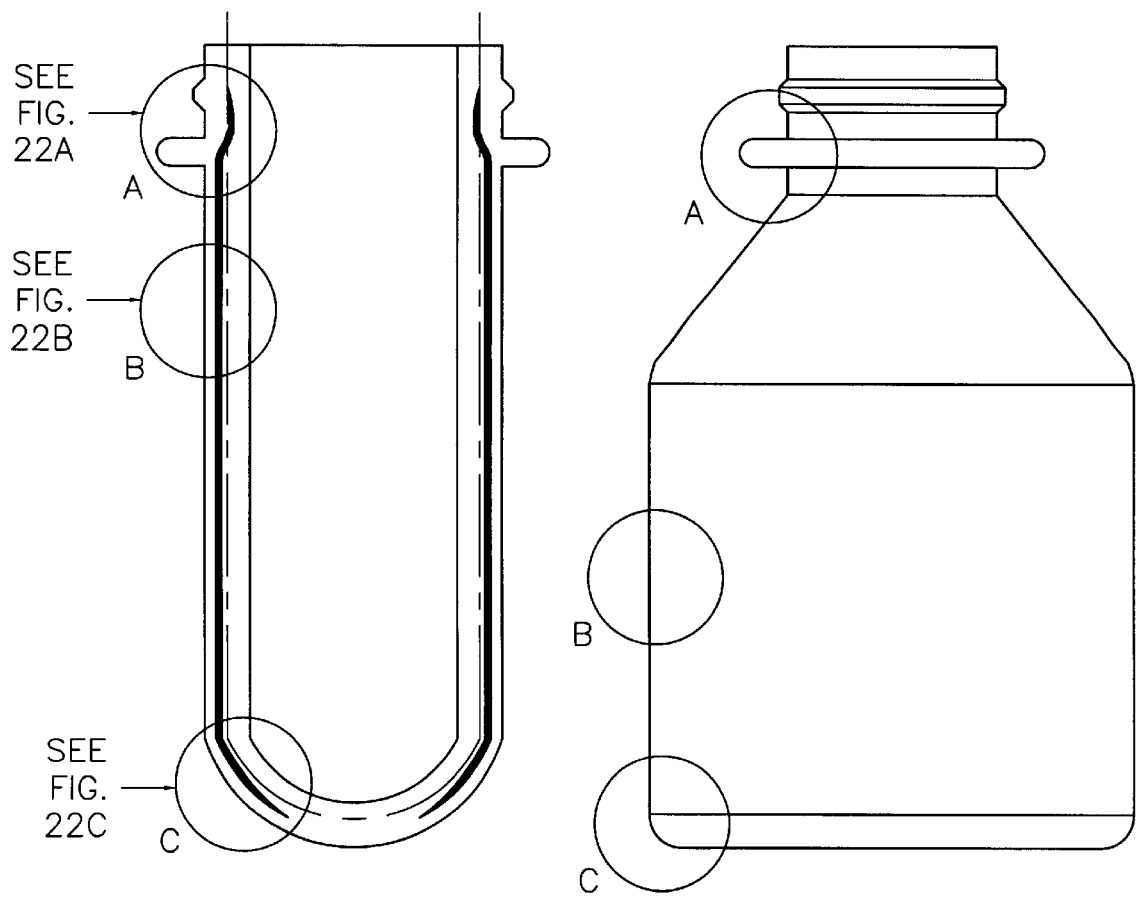
FIG. 22          FIG. 22D
   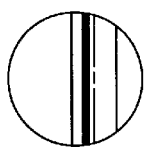   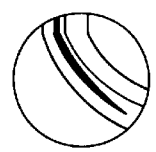
FIG. 22A      FIG. 22B      FIG. 22C

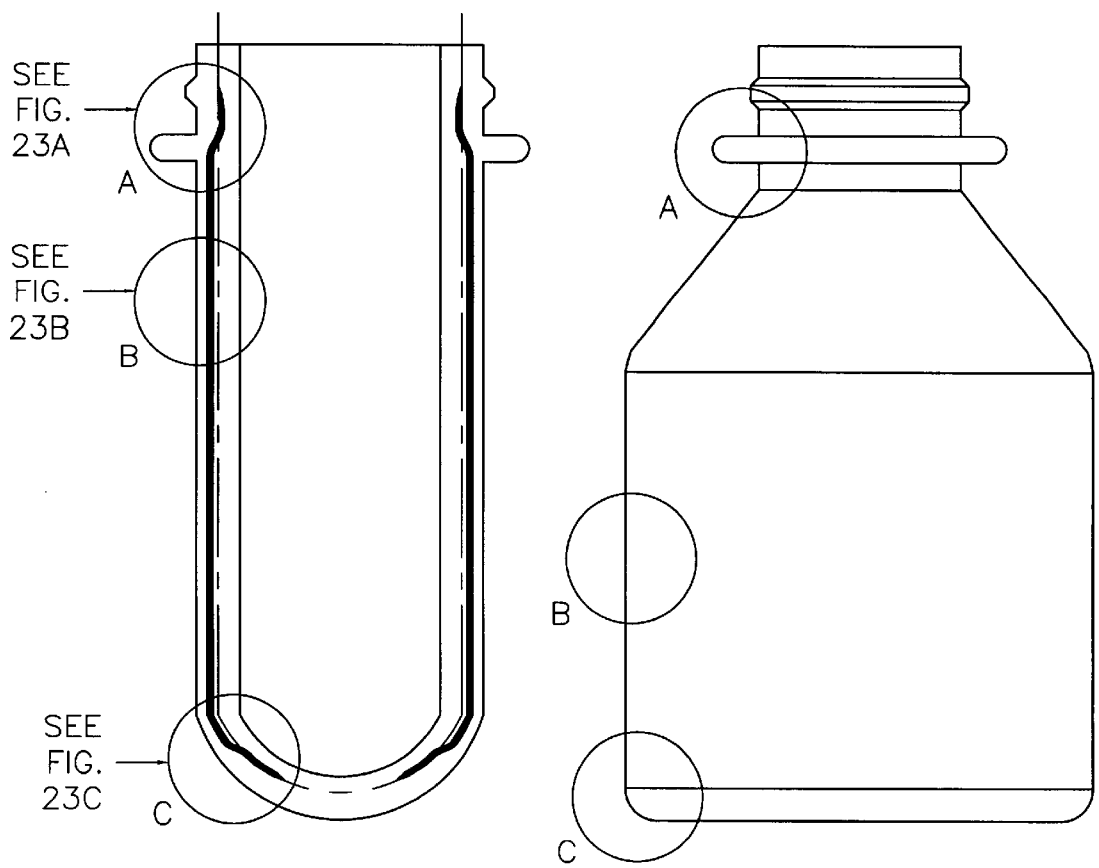
 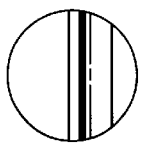 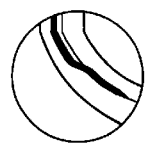
FIG. 23      FIG. 23D
FIG. 23A      FIG. 23B      FIG. 23C

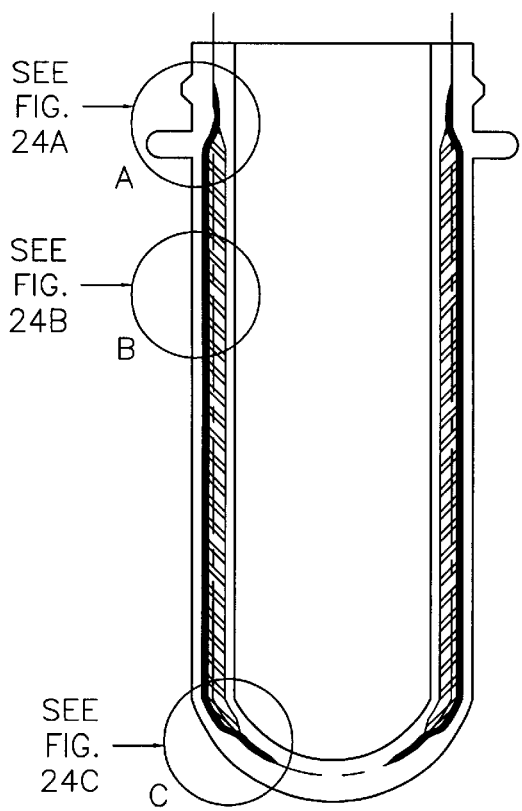
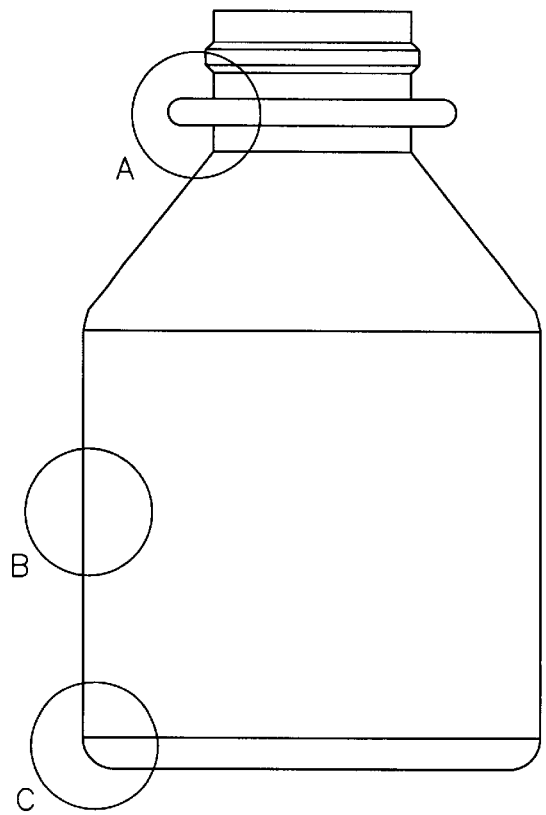
FIG. 24  FIG. 24D
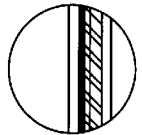
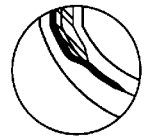
FIG. 24A  FIG. 24B  FIG. 24C

METHOD OF MOLDING MULTI-LAYER POLYMER PLASTIC ARTICLES WITH CONTROL OF RELATIVE SHIFTING OF THE CORE LAYER

FIELD

The present invention relates to the co-extrusion of pluralities of flowing polymer plastic streams through nozzle extruders and the like into injection molding and similar apparatus for forming multi-layer plastic articles in which an interior core is encased by inner and outer layers of the article; and, more particularly, to the control of relative volumetric flow rates of the layers for attaining greater flexibility in the properties and relative thickness and positions of the layers in the ultimate article. More specifically, the invention is especially, though not exclusively, useful with co-extrusion processes of the type described in my earlier U.S. Pat. No. 5,914,138, issued Jun. 22, 1999 For Apparatus For Throttle-Valving Control For The Co-Extrusion Of Plastic Materials As Interior Core Streams Encased By Outer And Inner Streams For Molding And The Like.

BACKGROUND OF INVENTION

A common problem in multilayer molding is the maintaining of a uniform penetration of the leading edge of the interior core layer, when that layer is not near the zero gradient of the velocity profile of the flowing polymer stream as it flows through a hot runner nozzle and/or into the mold cavity forming the molded article. Unlike the prior art tapered leading edge flow of, for example, systems of the type disclosed in U.S. Pat. Nos. 4,895,504 and 4,892, 699, my said earlier patent teaches the combining of the different flow streams of materials to achieve a velocity profile of the combined streams in the melt delivery system that is similar to the velocity profile of the combined stream in the injection mold cavity, thereby insuring uniformity in a resulting molded article.

This problem of maintaining uniform penetration of the leading edge of the interior core layer when it is not close to the zero gradient of the velocity profile becomes particularly severe when there is the requirement to form the multilayer article with the core layer not centered on the midplane of the article.

In two-material, three-layer preform molding, for example, it may be desirable to have a barrier or scavenger layer closer to either the inner sidewall or outer sidewall of a blow-molded container article, in order to enhance the barrier property of the container. In three-material, four-layer preform molding, this leading edge problem also occurs, particularly when the volumetric flow rate of one of the interior core layers is greater than that of the other interior core layer.

Another common current problem also arises in using post-consumer recycled plastic (PCR) in a molded article that consists of layers of two other polymers. Current art accomplishes this three-material combination by using apparatus and methods that create a 5-layer article. With such 5-layer technology, however, the molding cycle times are significantly longer than if the article had been molded of only one material. Such 5-layer molded articles, moreover, suffer delamination of the layers if the second polymer has low adhesion to the virgin skin layers and to the central PCR layer.

The present invention is directed to the solution of the above problems, and limitations, among others, in such prior art systems through a later-described technique for permitting changed or controlled variation of the relative volumetric flow rates of the inner and outer layers after the flow of the interior core layer stream has started.

OBJECTS OF INVENTION

A principal object of the present invention, accordingly, is to provide a new and improved method of and apparatus for molding multi-layer polymer plastic articles having inner, outer and interior or core layers that shall not be subject to such problems and limitations; but that, to the contrary, obviate such through the control of relative volumetric flow rates of the inner and outer layers in such a way as to shift the position of the core and control also the relative thickness of the inner and outer layers of the article.

Another object is to provide novel apparatus and methods to inject the leading edge of the interior core layer on the zero gradient of the combined velocity profile during the initial portion of the interior core layer flow, and then to change the relative volumetric flow rates of the inner and outer layers to cause the later or subsequent portion of the interior core flow to be offset from the zero gradient of the combined flow velocity profile.

An additional object is to provide novel apparatus and methods to restrict either the flow of the inner or of the outer layer volumetric flow rate in order to shift the interior core layer trailing portion inside or outside the 50% streamline through the nozzle and into the molded part.

Still a further object of the present invention is to provide a novel method and apparatus to produce an article of three materials molded into four layers.

Another object is to provide in such apparatus, novel operation wherein the leading edge of one of the interior core layers is injected on the zero gradient of the velocity profile of the combined stream before the start of flow of the other interior core layer.

Other and further objects will be described hereinafter and are more fully delineated in the appended claims.

SUMMARY

In summary, however, from one of its important aspects, the invention embraces a method for co-extruding multiple plastic materials as for injecting through a gate region into a mold cavity to produce a molded article, that comprises, co-extrusively flowing streams of plastic materials with at least one interior stream that is to serve as an interior core of a resulting molded plastic article within inner and outer streams of plastic material that serve as covering wall plastic material layers for the core; forcing the flowing streams to flow along concentric annular flow paths within and along a longitudinally extending tubular extruder nozzle to the cavity gate region; adjusting the flow streams initially to cause the core stream to start to flow at a region of substantially zero gradient in the transverse flow velocity profile of the extrusion; thereupon varying the relative volumetric flow ratio of the inner and outer layer streams after the zero-gradient flow of the core layer has started in order to offset the core layer flow from the zero-gradient and to shift the core layer closer to one of the inner or outer annular flow boundaries, thereby to produce a molded article wherein the major portion of the core layer is closer to one of the inner or outer article walls than the other.

Preferred and best mode designs and configurations are later described in detail.

DRAWINGS

The invention will now be described in connection with the accompanying drawings, FIG. 1A of which is a schematic longitudinal section of the type of nozzle described in my above-mentioned patent using a central longitudinal restrictor or throttle pin to force concentric annular flow of the injected plastic thereabout within the walls of the hollow extruder nozzle; and FIG. 1B is a graph illustrating resulting flow fraction and velocity profile curves across the annular channel within the nozzle of FIG. 1A for an inner flow-to-outer flow ratio of 50:50—the ordinate plotting the ratio of flow velocity-to-average velocity as a function of the radius of the annulus between the inner and outer nozzle wall, with the central solid line curve VP plotting said ratio and showing zero gradient for the core stream CF (shaded vertical strip), and the curve designated with a circle marker, plotting the flow IF between the radius and the throttle pin T from the inner to the outer wall, and the curve marked with a triangle, plotting the flow OF between the outer wall and the annular radius;

FIG. 1C is a graph showing the relative timing and proportions of volumetric flow rate of the combined inner and outer layer flows, the inner layer flow, and the interior core layer flow, with FIGS. 1D and 1E being similar to FIG. 1A, but showing partially and completely filled conditions of the mold cavity fed from the throttled nozzle for the conditions of FIG. 1B;

FIGS. 2, 2A, 2B and 2C correspond, respectively, to the showings of FIGS. 1B, 1C, 1D and 1E, but for an inner-to-outer flow ratio of 40:60;

FIGS. 3, 3A, 3B and 3C respectively correspond to FIGS. 2, 2A, 2B and 2C, but for an inner-to-outer flow ration of 60:40;

FIGS. 4 and 5 are velocity profile graphs similar to FIG. 2, for respective ratios of 25:75 and 75:25, with FIGS. 4A, B and C and FIGS. 5A, B and C corresponding to FIGS. 2A, 2B and 2C, respectively, but for such 25:75 and 75:25 ratios, respectively;

Figure 6:
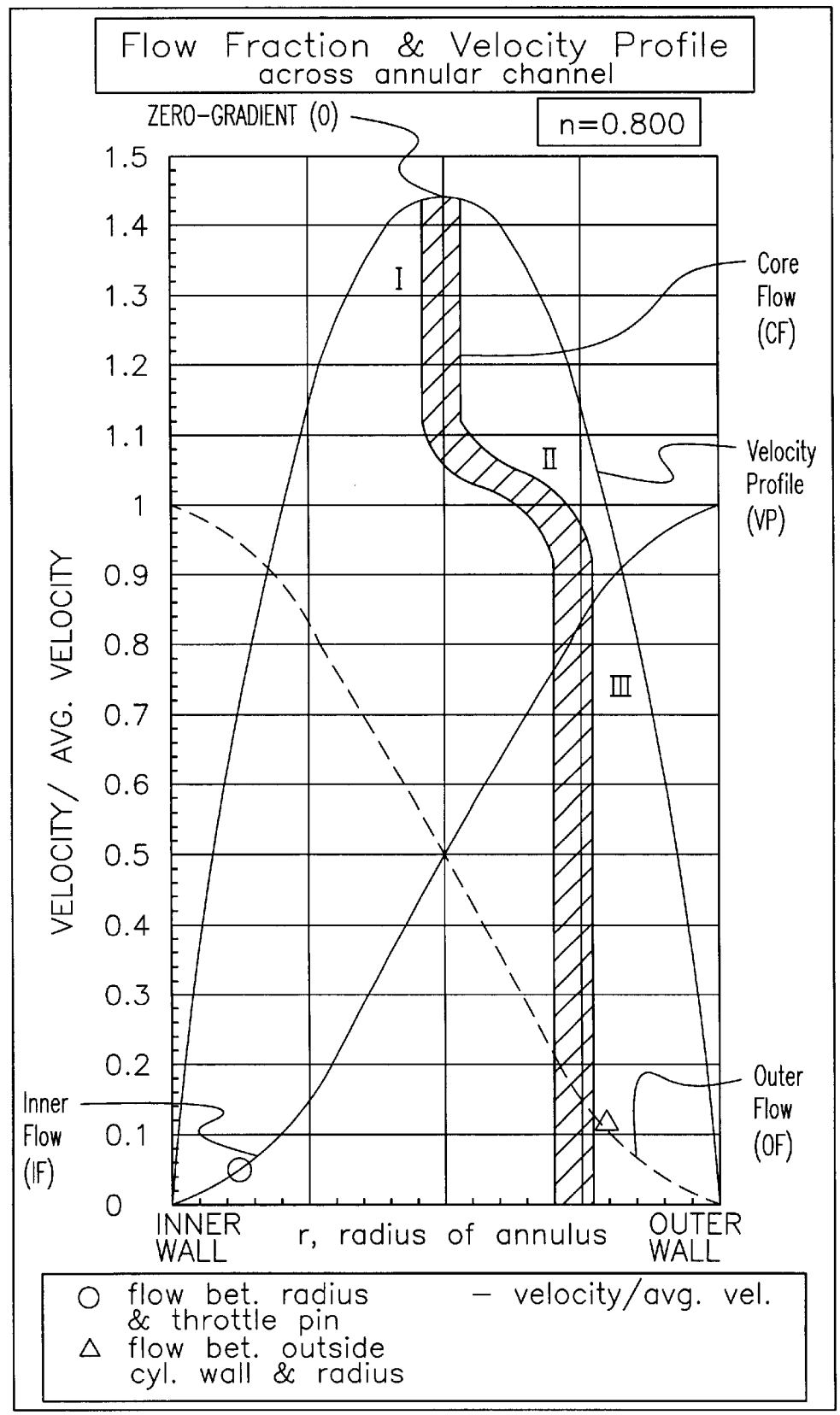
FIG. 6 is a flow fraction and velocity profile similar to FIGS. 1A, 2, 3, 4 and 5, but embodying the methodology of the present invention, with an initial portion of the core layer flow occurring for a 50:50 ratio, and the major flow occurring with 80:20 ratio to shift the core toward the outer wall, but without providing any leading-edge bias.
Figure 8:
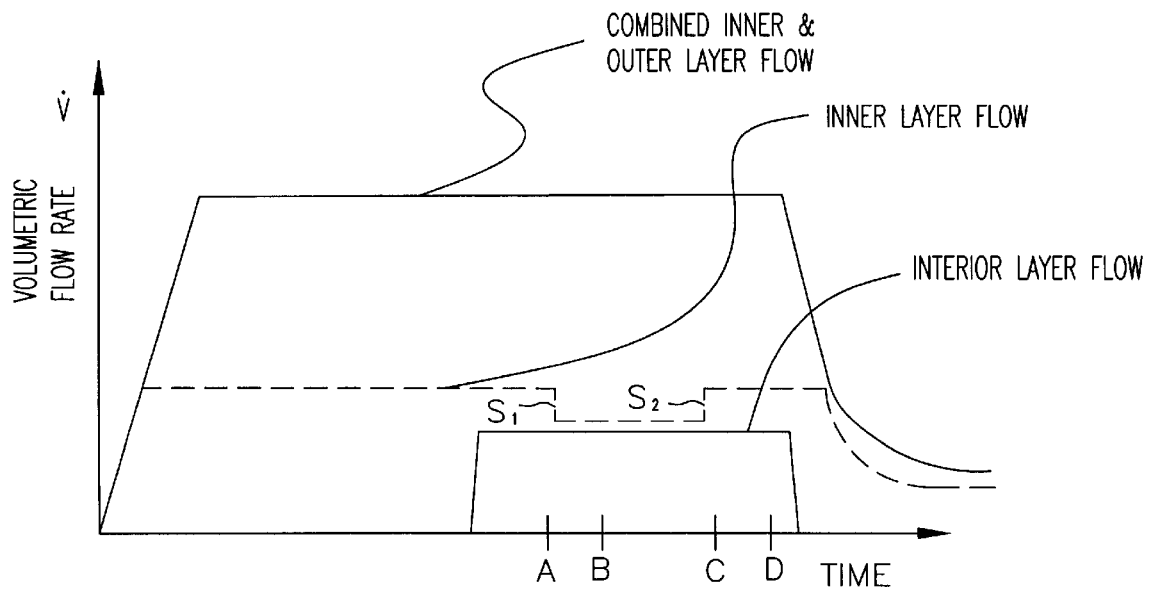
Figure 9:
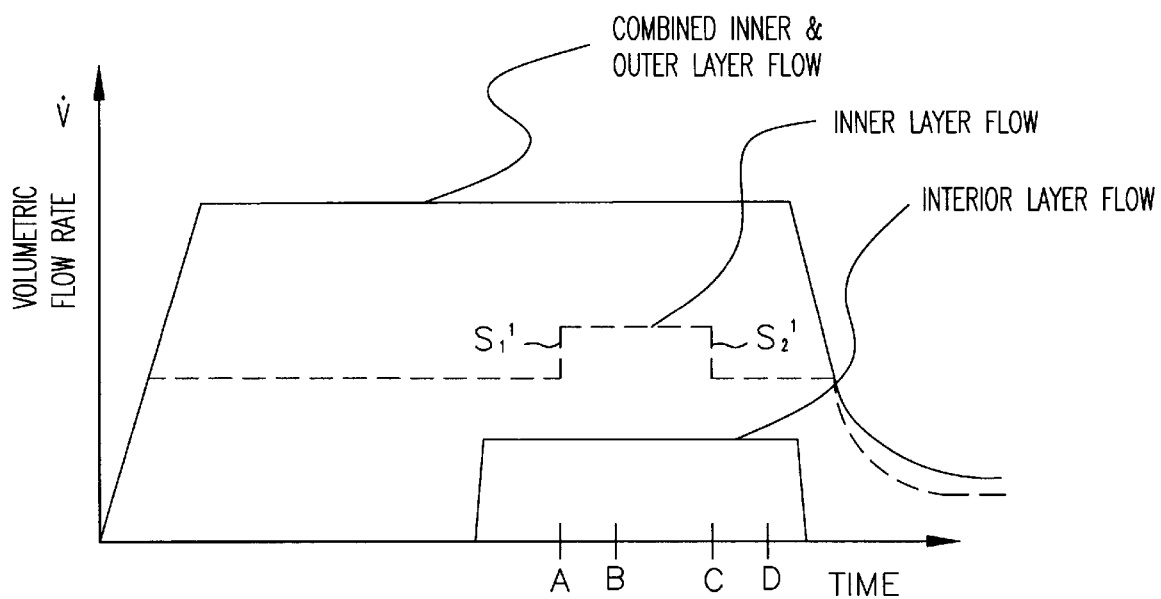
Figure 10A:
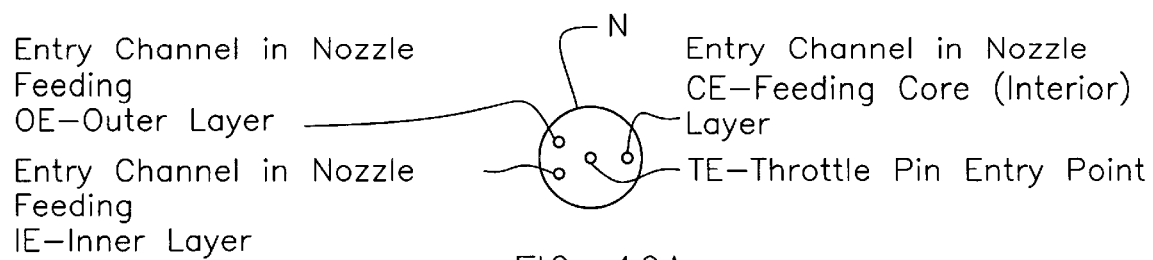
Figure 10B:
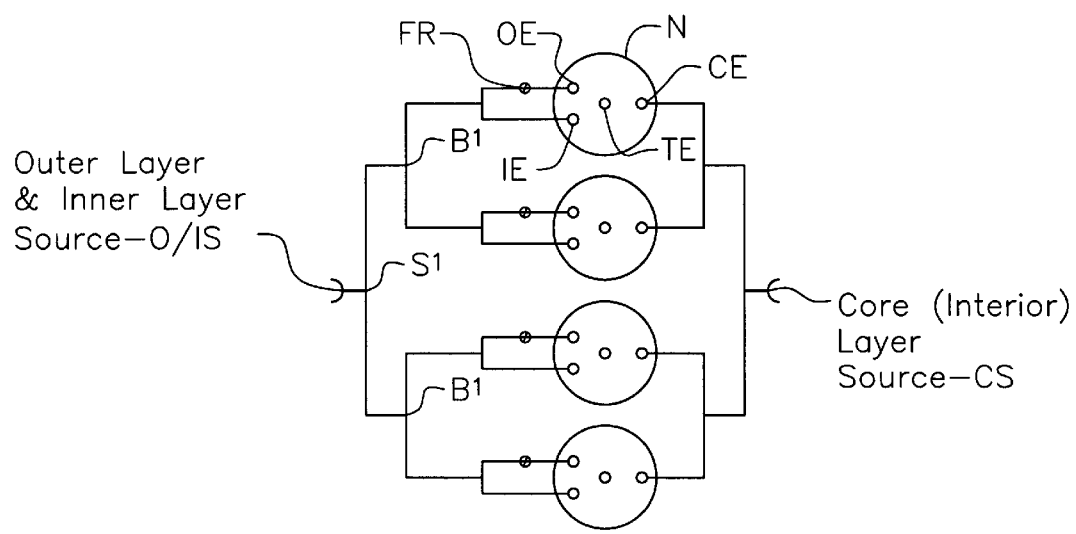
Figure 10C:
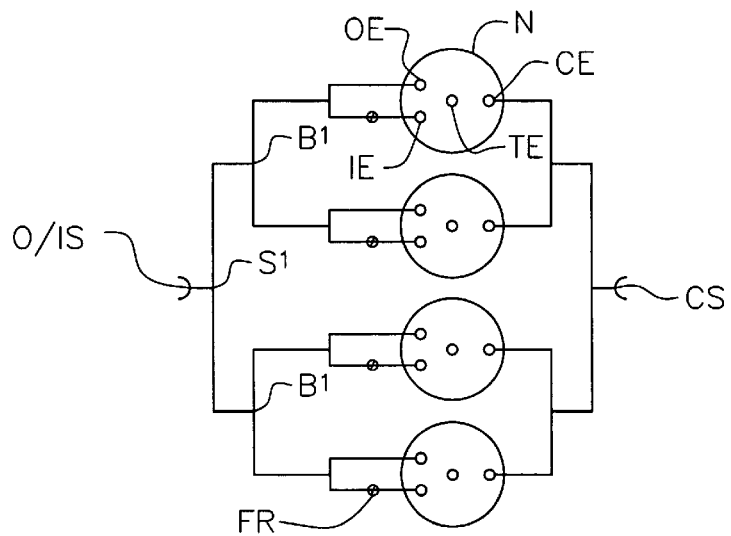
Figure 11A:
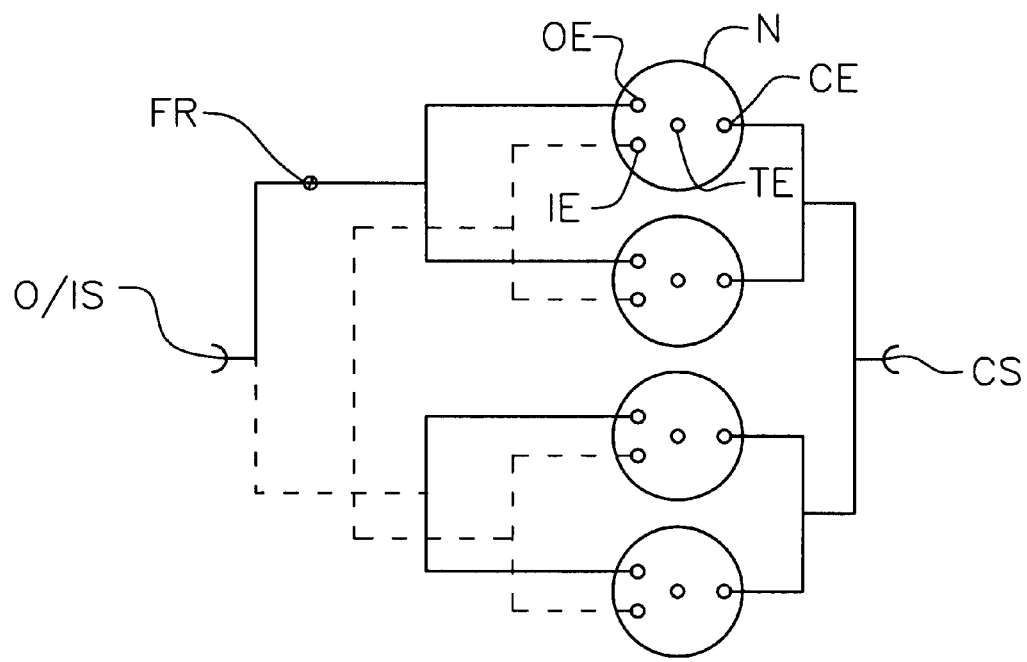
Figure 11B:
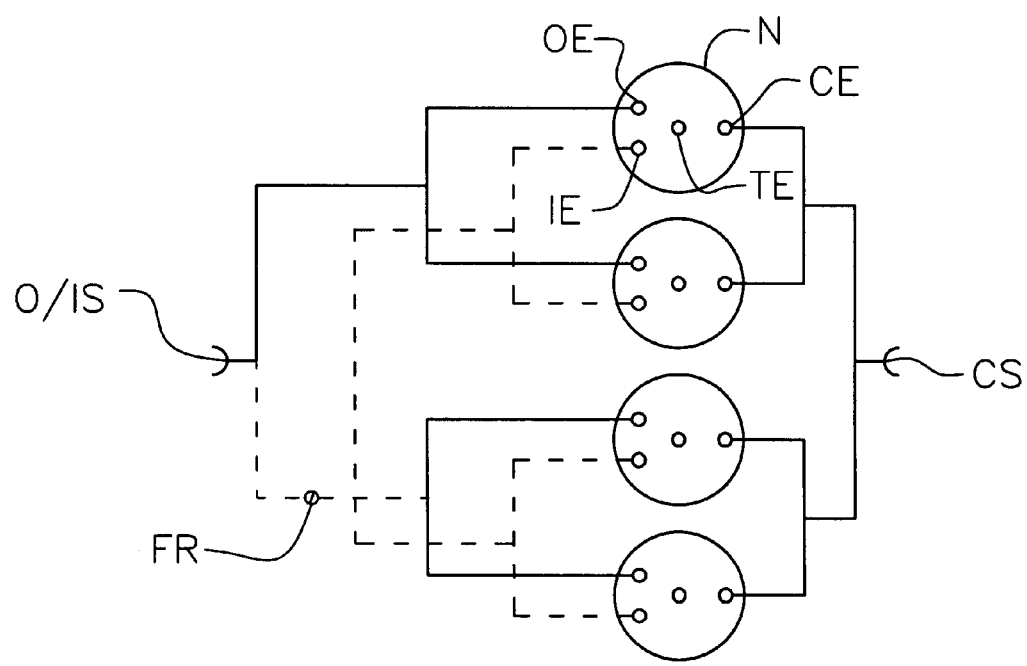
Figure 13:
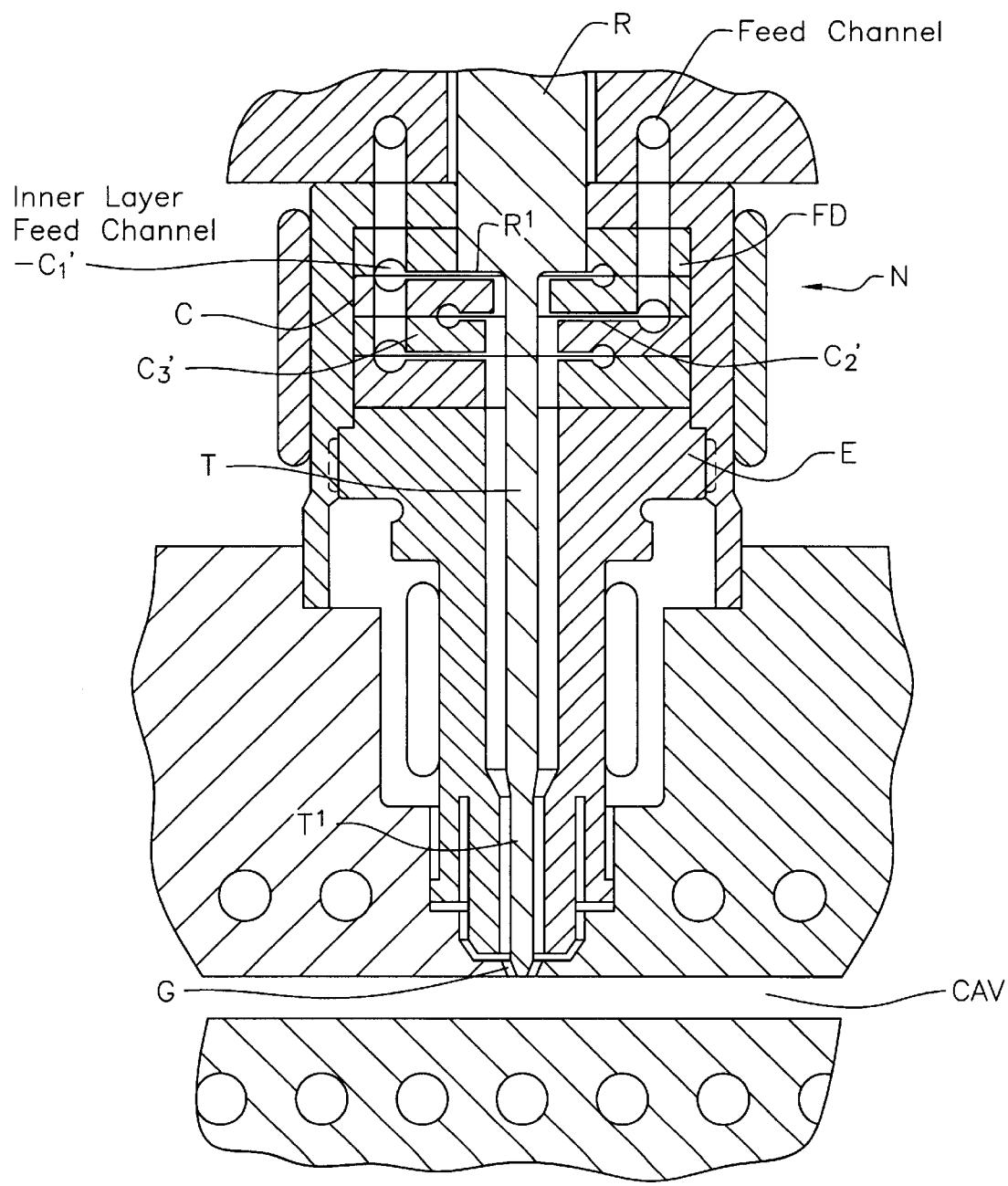
Figure 14:
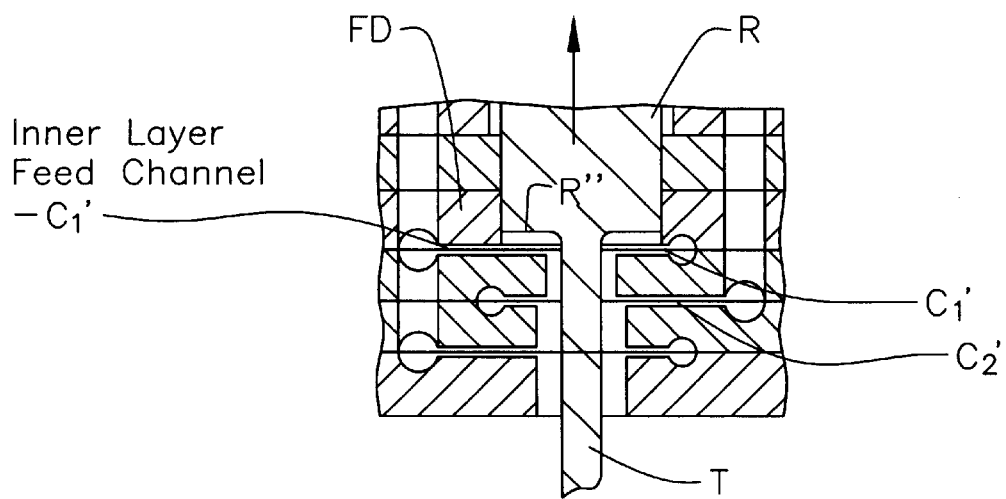
Figure 15:
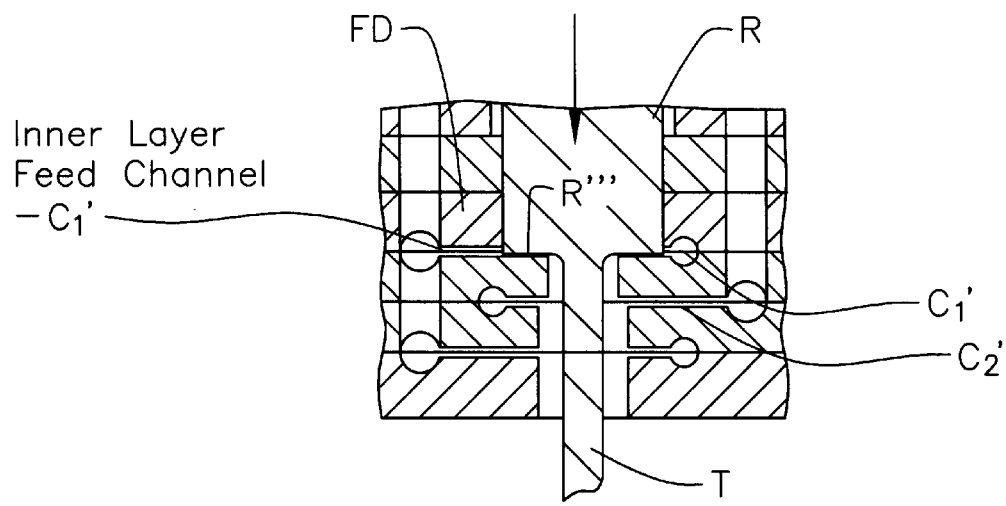
Figure 16A:
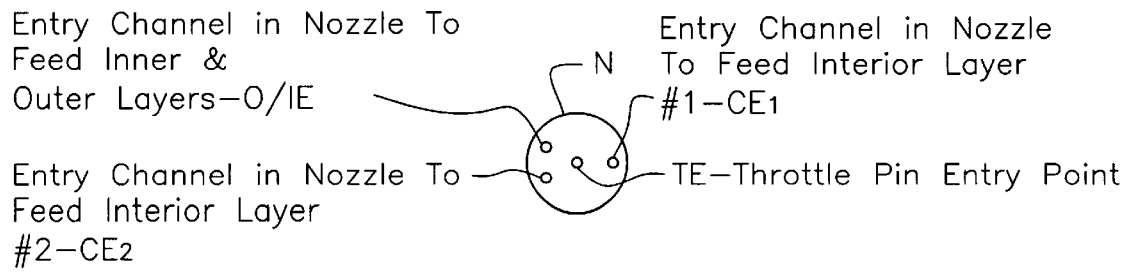

FIGS. 7, 7A, 7B and 7C correspond to respective FIGS. 6, 6A, 6B and 6C, illustrating the operation of the invention for the conditions converse to FIG. 6, wherein, after the initial 50:50 flow ratio, the inner flow-to-outer flow ratio is decreased without shifting the initial core layer leading edge, the core layer being shifted towards the inner layer;

FIGS. 8 and 9 are graphs similar to FIGS. 3A–6A for modifications wherein the core is shifted back before the end of the flow, as shown in FIGS. 8A, B, C and D for original core shifts towards and away from the inner wall; and, in FIGS. 9A, B, C and D, for original core shifts away from and towards the inner wall, respectively;

FIGS. 8E through 8I are respectively similar to FIGS. 8 and 8A–8D, but are designed for producing flat-shaped molded articles;

FIGS. 9E through 9I similarly correspond to FIGS. 9 and 9A–9D, but relate to molding flat-shaped articles;

FIGS. 10A–C are schematic top views of the inner, outer and core flow entry channels and flow restrictor controls for varying the inner/outer channel flow ratios for the core shifting effects of the invention;

FIGS. 11A and B are similar views with flow restrictor controls disposed in the most common channel feeding the respective outer and inner layers, FIGS. 12A, B and C are schematic views of pin-type flow restriction elements;

FIG. 13 is a cross-section of a preferred nozzle—flow control apparatus for the practice of the invention;

FIGS. 14 and 15 are enlarged cross-sections of varying flow control positions of operation of the nozzle of FIG. 13;

FIGS. 16A and B are similar to FIGS. 10A–C, but are directed to feed channels for three-material streams to each nozzle to form inner and outer annular covering layers.

Figure 17:
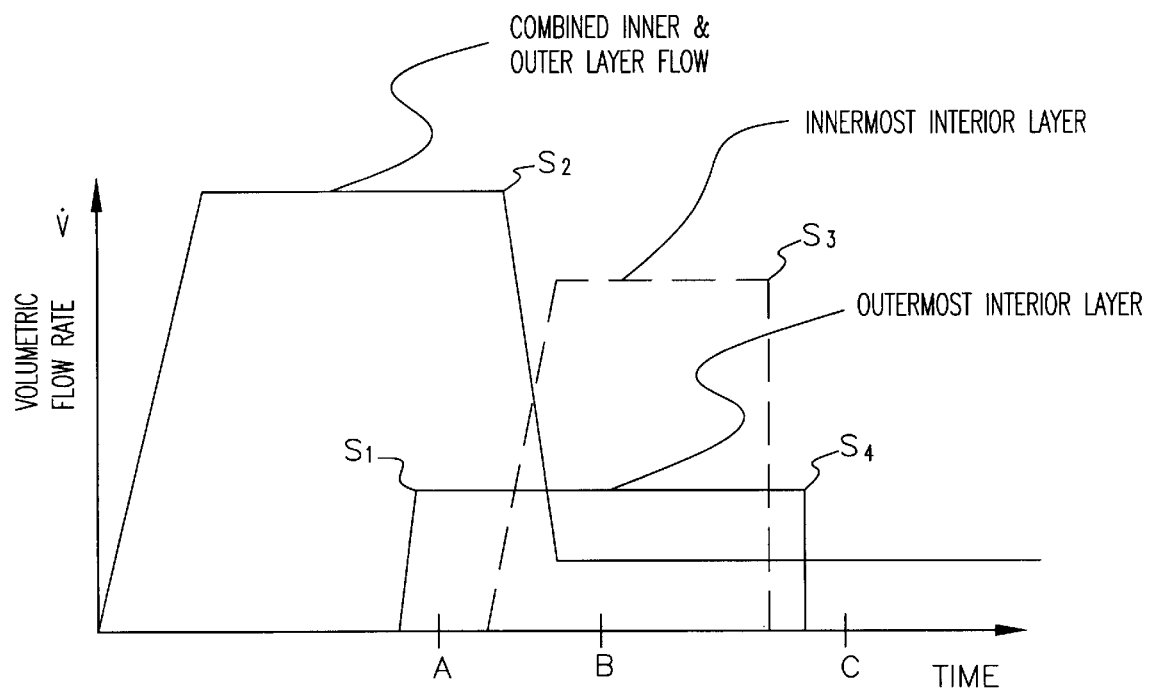
Figure 19:
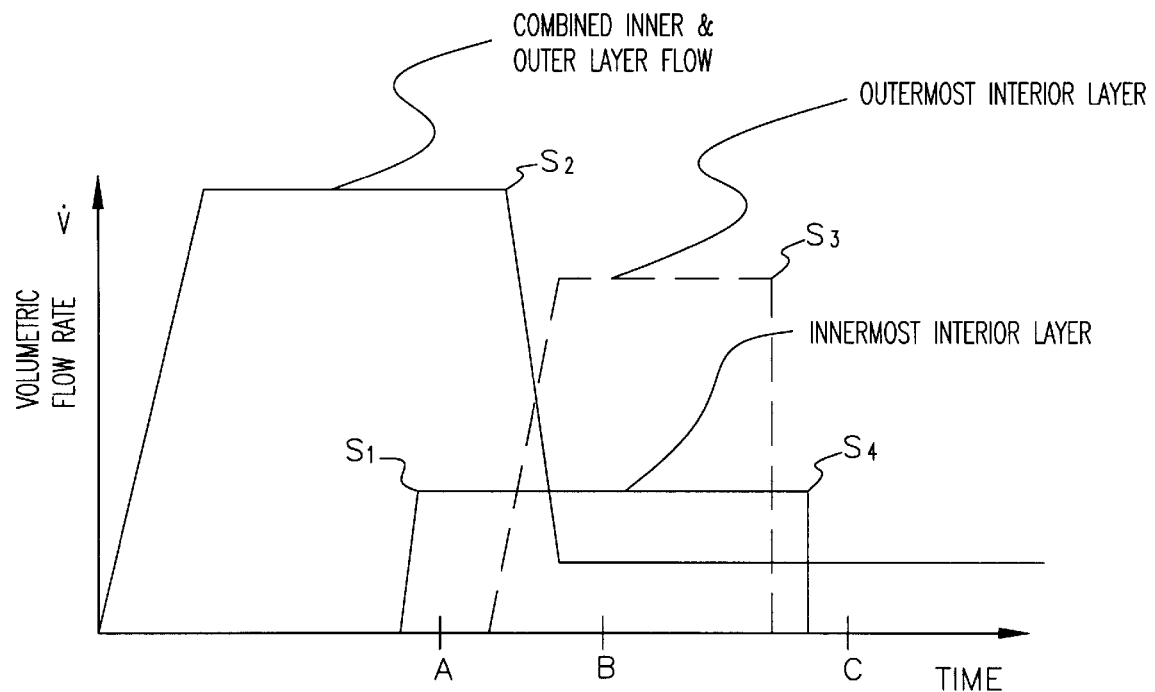
Figure 20:
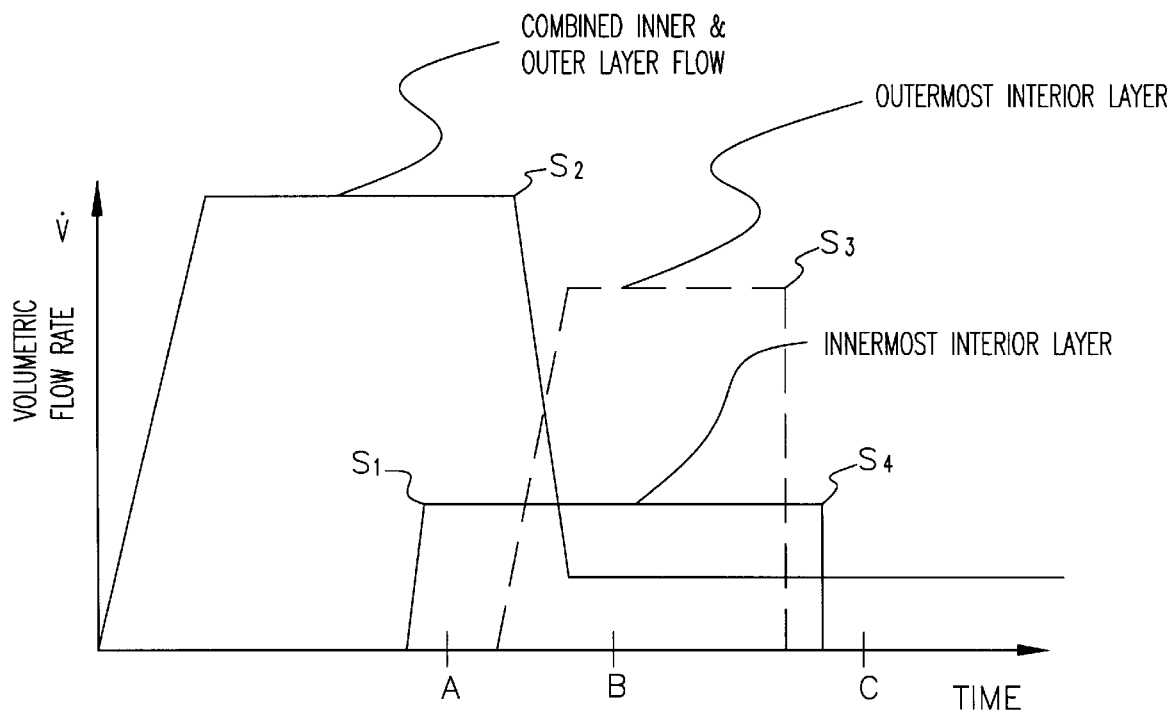
Figure 20C:
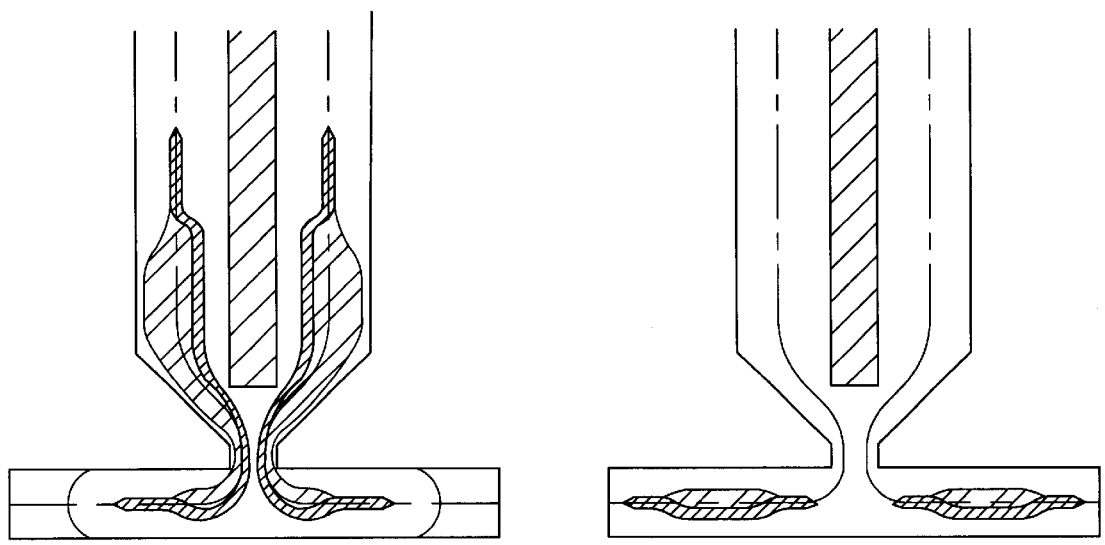
Figure 20D:
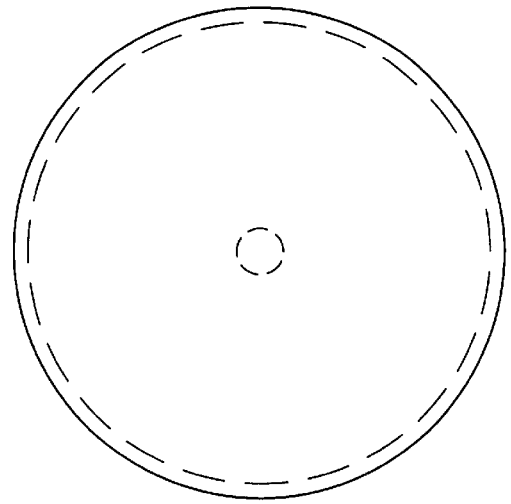

FIGS. 17 and 17A–D and 19 and 19A–D illustrate the adaptation of the techniques of the invention for producing three-material, four layered articles, and illustrating graphs in FIGS. 17 and 19 showing relative timing and proportions of volumetric flow rate of combined inner and outer layer flow, the innermost interior layer flow and the outermost interior layer flow of two different three-material, four layer flow systems.

FIGS. 18, 18A–D, FIGS. 20, and 20A–D are views similar respectively to FIGS. 17 and 17A–D and FIGS. 19 and 19A–D, but are directed to the molding of flat-shaped articles rather than cylindrical-shaped containers and the like.

FIGS. 21A, 22D, 23D and 24D show various exemplary types of containers that may be formed by the techniques of the invention from respective pre-forms 21B–C–D, 22, 23 and 24; respective enlarged cross-sectional segments A, B and C of which are illustrated in FIGS. 22A–C, 23A–C and 24A–C.

PREFERRED EMBODIMENTS OF THE INVENTION

In my before-referenced prior co-extrusion patent, at least two-polymer plastic materials are provided as a 3-layer combined flow stream; a first material L which forms the ultimate outer and inner molded covering layers of the ultimate molded product, article or part from the inner and outer flow stream layers (IL and OL), injected as annular streams; and a second material (I) which forms the middle, inner or interior core of the product formed from an injected concentric annular interior stream (IA) encased within the inner and outer annular stream layers of the covering material.

The preferred apparatus employs a multiple-plastic stream co-extruder as for injection molding cavities in which the extruder is internally provided therewithin and thereal-ong with a restrictor or throttle pin, rod or element that forces combined plastic materials streams, formed with an interior core stream encased in outer and inner stream layers, into corresponding concentric co-extensive annular flow stream layers that are ultimately split transversely in opposite directions into a cavity gated to the extruder, and with the core stream at a region of zero gradient in the transverse flow velocity profile within the extruder and cavity.

Figure 1A:
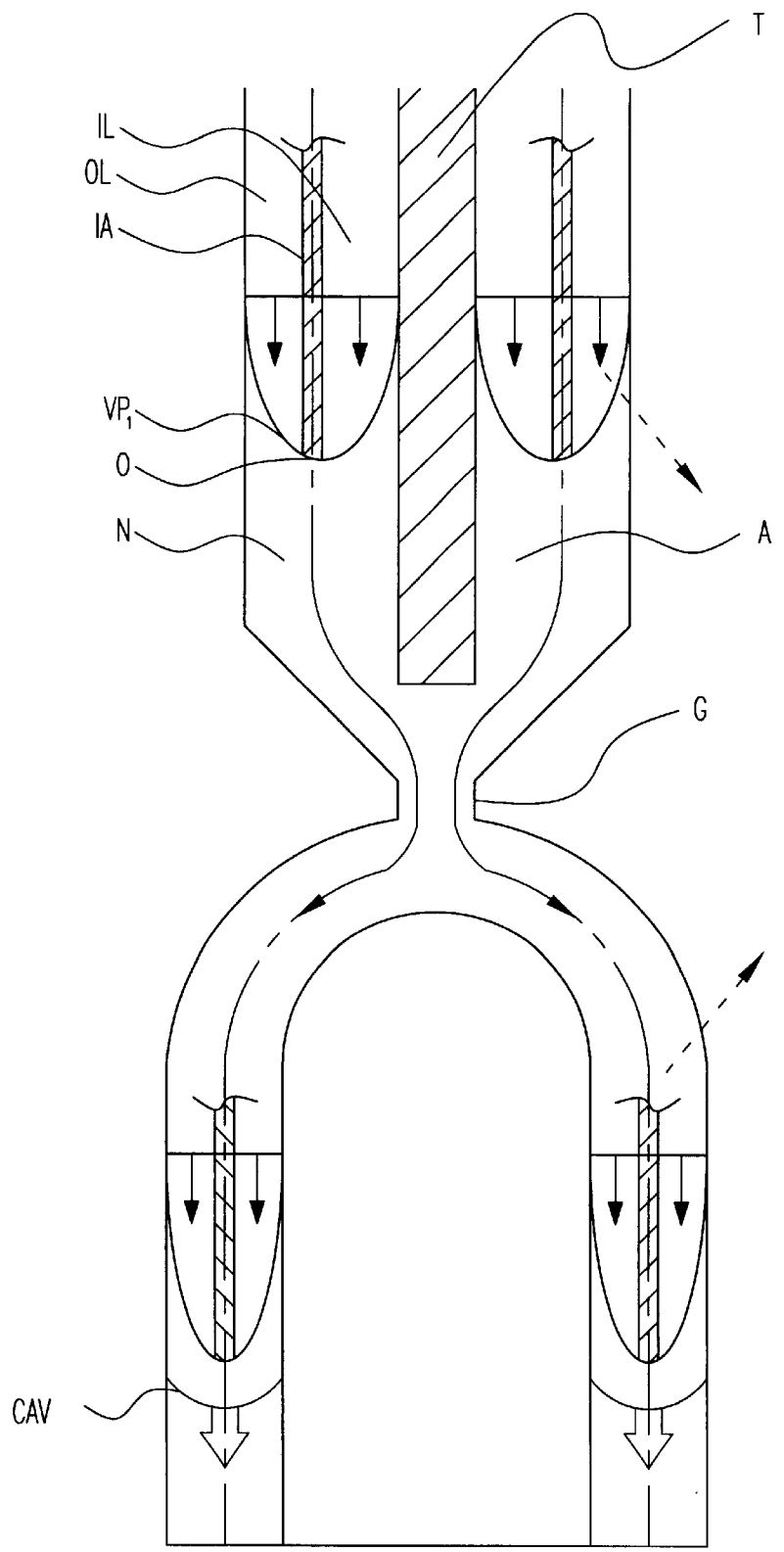

Referring to FIG. 1A, a schematic cross-sectional view of a longitudinally extending extruder nozzle N is shown provided with a central longitudinal throttle needle or pin acting as a flow restrictor T downstream of a combining section C, providing uninterrupted continual annular flow within the extruder of the concentric inner and outer annular stream layers IL and OL, with the encased interior annular core stream IA, and into gate G. The combined streams A are then, as before stated, laterally split and injected transversely in opposite directions into a molding cavity (CAV)—shown for illustrative purposes of shape suitable for molding cylindrical containers such as bottles or the like. As described in my said prior patent, other shaped cavity molds may also be used for other products, as may a wide variety of plastic materials be used, among them, for example, polyethylene, PET, and other plastic and polymer compositions, as later more fully described.

Figure 1B:
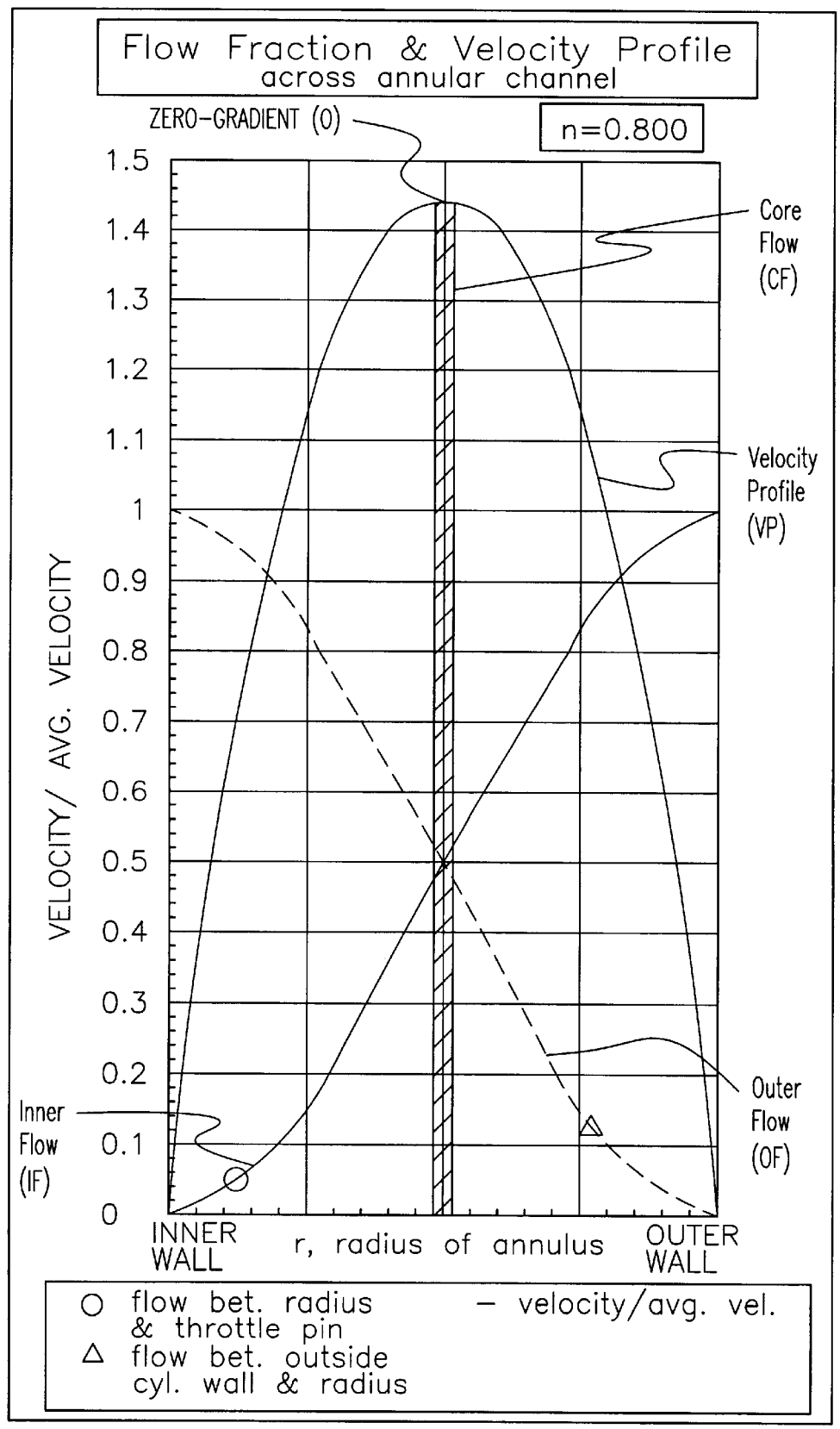

As further taught in my prior patent, it is highly desirable in many applications that, as shown in FIG. 1B, the core layer flows substantially on the zero-gradient velocity profile (O) in order to keep the leading edge of the core layer uniform 360-degrees around a periphery of the annular flow, to insure, as the flow enters the cavity, that the core layer is uniformly distributed in the cavity, with the highest point of the velocity typically on the center line of the flow; and wherein 50 percent of the material is on the inside of the streamline and 50 percent is outside the streamline, and the zero gradient occurs right on the 50-percent streamline.

Figure 1C:
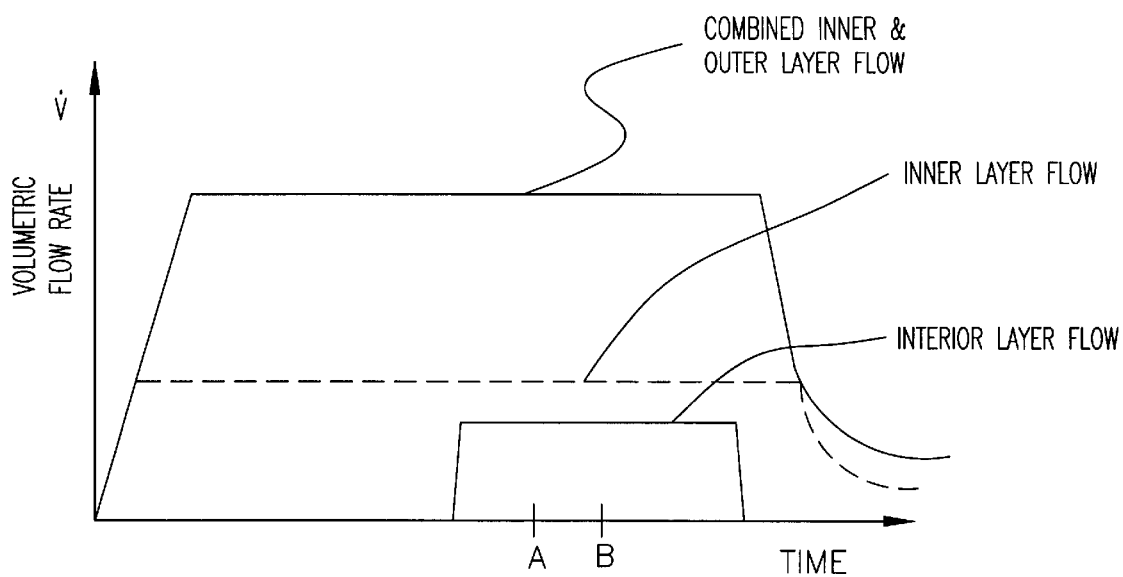

In FIG. 1C, a graph is presented plotting as a function of time, the volumetric flow rate of the combined inner and outer flow (top curve), the inner layer (IL) flow (dash-line curve) and the interior core layer flow (bottom curve) encompassing the times A and B, respectively representing a time after the start of the interior core layer flow, and an intermediate time before the leading-edge of the core layer has left the extruder to enter the mold cavity. FIG. 1D is a longitudinal section similar to FIG. 1A for the partially filled condition at time B, and FIG. 1E shows the completely filled cavity, demonstrating the distribution of the core layer extending most of the line length of the flow in the cavity and having a uniform leading edge at a 180-degree section of the cavity and with the core layer placed on the 50% streamline in the middle of the molded article.

My earlier patent also provided for moving the throttle or restriction pin to vary the percentage of the outer layer material in the inner annular flow layer vs. the outer annular flow layer of the combined flow stream downstream of the combining area. Changing the relative volumes of the outer layers shifts the position of the core (interior) layer in the mold cavity to produce a part with controlled outer layer thickness on both surfaces of the molded article or part. If the outer layer flow is biased toward either the inner or outer annular flow layers, the outer layer thickness in the molded part will be similarly biased on the corresponding surface molded from the biased annular layers. Material from the inner annular flow layer forms the surface layer of the part molded by the cavity wall opposite the gate into the cavity and the material from the outer annular flow layer forms the surface layer of the part molded by the cavity wall adjacent to the gate.

The use of a movable throttle valve pin is typically appropriate in cases where it is the advantageous to vary, during each injection, the relative percentage of the outer layers material in the inner annular flow layer vs. the outer annular flow layer. For cases where the relative thickness of the layer on both surfaces of the molded part can remain in fixed proportion to each other, the embodiment uses a non-moving throttle valve pin.

A typical injection time-line for such three-layers molded articles is as follows:

| Time, Seconds | Action |
|---|---|
| 0 | Close mold |
| 0.1 | Start injection of inner and outer layer material at substantially 50:50 ratio |
| 0.2 | |
| 0.3 | |
| 0.4 | |
| 0.5 | |
| 0.6 | |
| 0.7 | |
| 0.8 | |
| 0.9 | |
| 1.0 | Start injection of interior layer material on zero-gradient of velocity profile |
| 1.1 | |
| 1.2 | |
| 1.3 | |
| 1.4 | |
| 1.5 | |
| 1.6 | |
| 1.7 | |
| 1.8 | |
| 1.9 | |
| 2.0 | Finish interior layer injection on zero-gradient of velocity profile |
| >2.0 | Finish injection of inner and outer layer material |

It has now been discovered that if, instead of changing the relative percentages of inner and outer annular layer volumes of materials to obtain unequal covering thicknesses, as described in my earlier patent, one starts the flow process with the inner layer-to-outer layer volume flow being equal (ratio of 1), this will start the initial portion of the interior or core layer flow, along the desired zero-gradient velocity profile; and then, during the continued flow, the ratio of inner-to-outer layer flow may be changed to effect core layer shifting as later more fully described.

In accordance with the present invention, the core layer flow is thus started on the zero-gradient velocity profile, with the inner layer in the combined flow and the outer layer in the combined flow both having the same volumetric flow rate at the time the core material layer is introduced. Shortly after so introducing the core layer to create the leading-edge of the core layer, the invention enables the changing of the ratio of inner layer-to-outer layer flow, advantageously to place the remaining portion—preferably about 90 to 95 percent of the core layer that is flowing into the cavity—to be shifted towards the outside boundary wall or towards the inside boundary wall of the molded article. In this way, the advantages of knowledge of the zero-gradient velocity profile is combined with the advantageous shifting of the position of the core layer to enhance the function of the molded article—the shifting of the volumetric flow of the inner layer vs. the outer layer, causing the shift of position of the core layer.

As earlier described, FIG. 1B shows operation with the type of nozzle described in my above-referenced patent, employing a throttle pin adjustment such as to produce substantially a 50:50 inner flow (IF)-to-outer flow (OF) ratio, placing the leading-edge of the interior layer flow IL on the zero gradient of the combined velocity profile, and enabling the absence of any leading edge bias in the molded article due to flow velocity.

Figure 2:
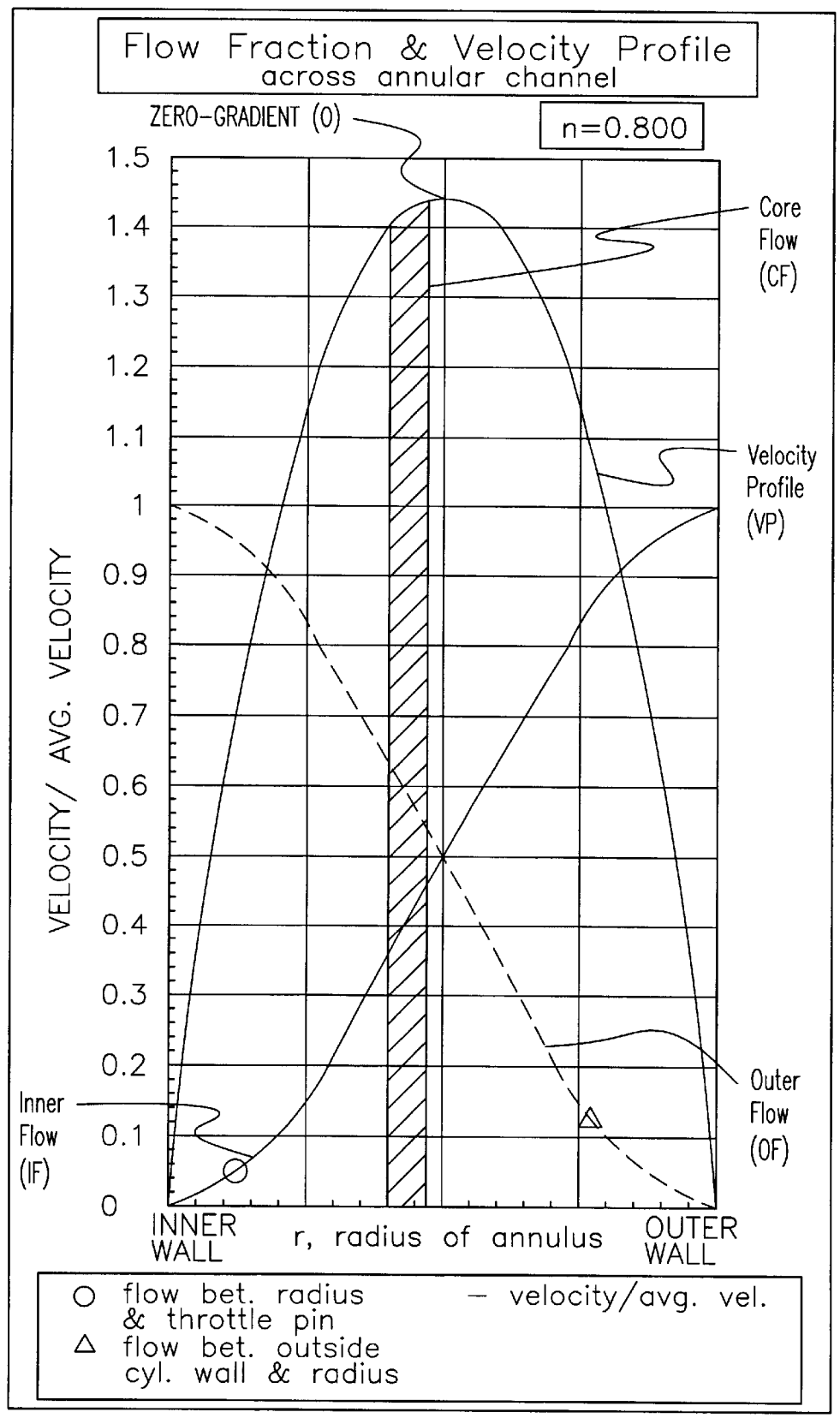

FIG. 2 is an operation showing similar to FIG. 1B wherein the throttle pin adjustment has been positioned to achieve an inner flow-to-outer flow ratio of 40:60, rather than the 50:50 ratio of FIG. 1B, placing the leading-edge of the interior layer IL near the zero gradient of the combined velocity profile. This produces a small, but acceptable leading edge bias in the molded article, as also explained in my earlier patent.

Figure 2A:
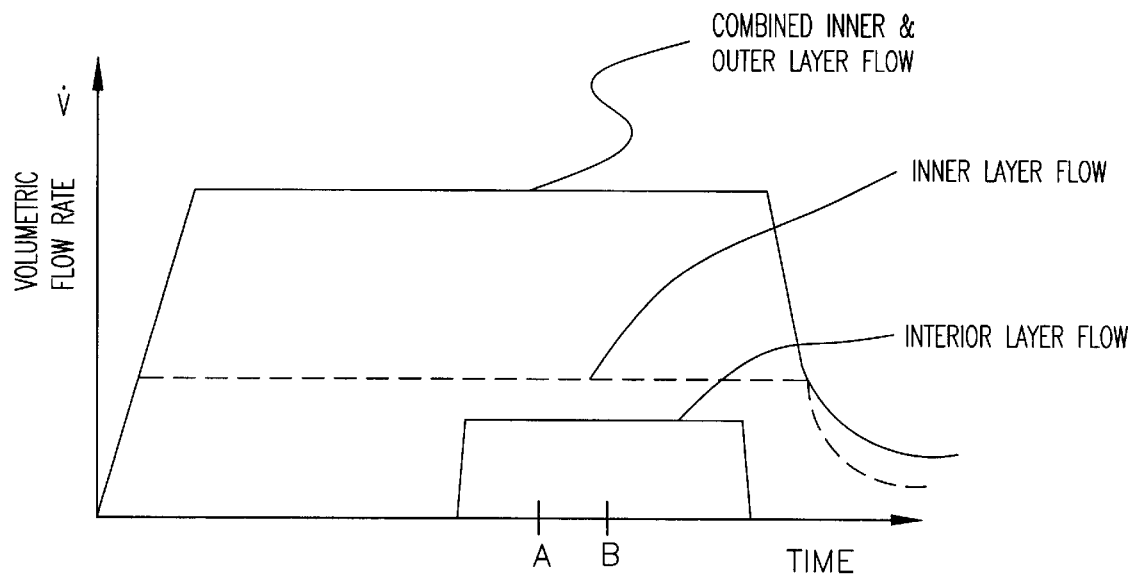

FIG. 2A presents the same type of volumetric flow rate graph for the operation of FIG. 2 as described in connection with FIG. 1C for the operation of FIG. 1B; and FIGS. 2B and 2C illustrate partially filled nozzle-cavity flow conditions at time B and for complete cavity filling, respectively.

Figure 3:
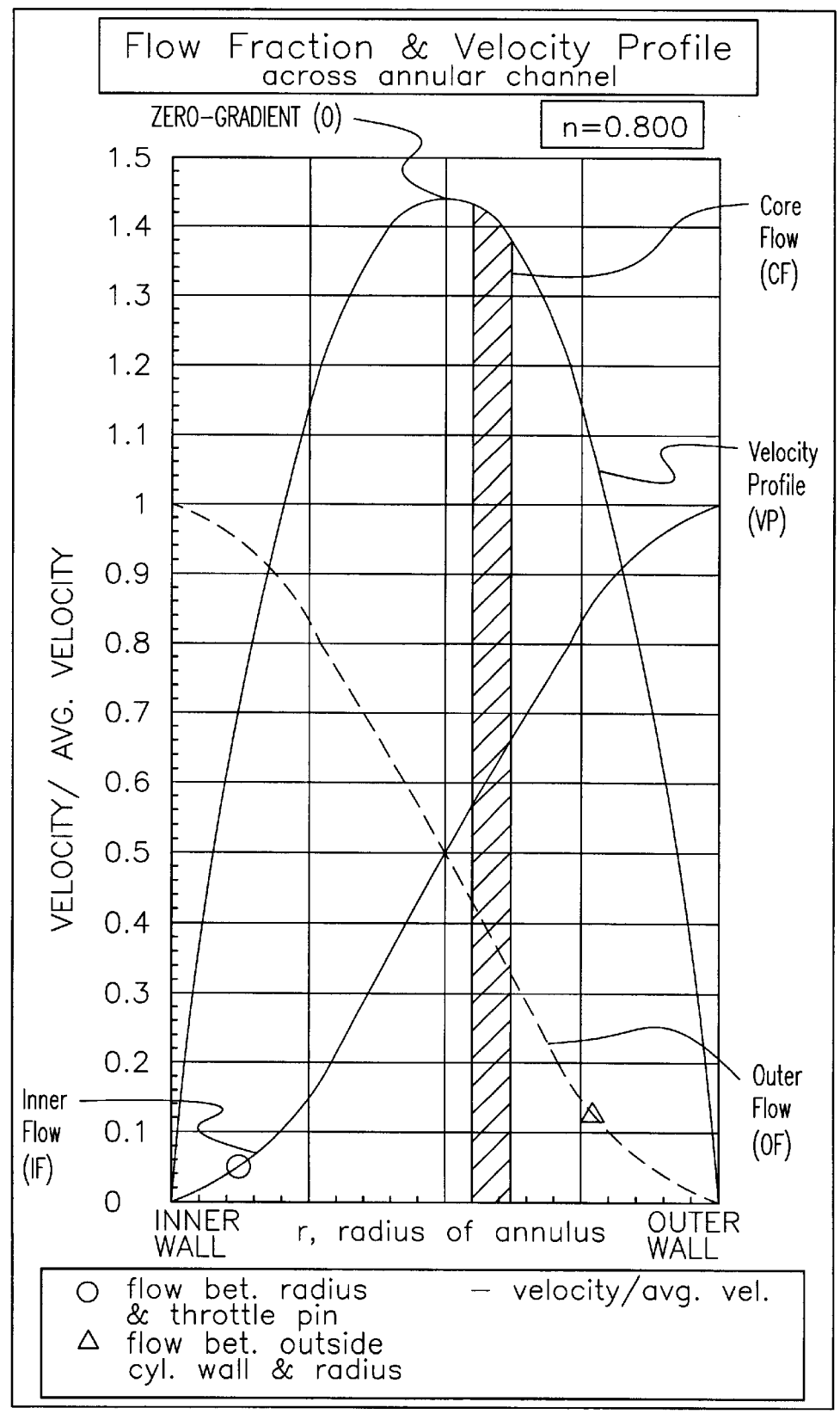
Figure 3A:
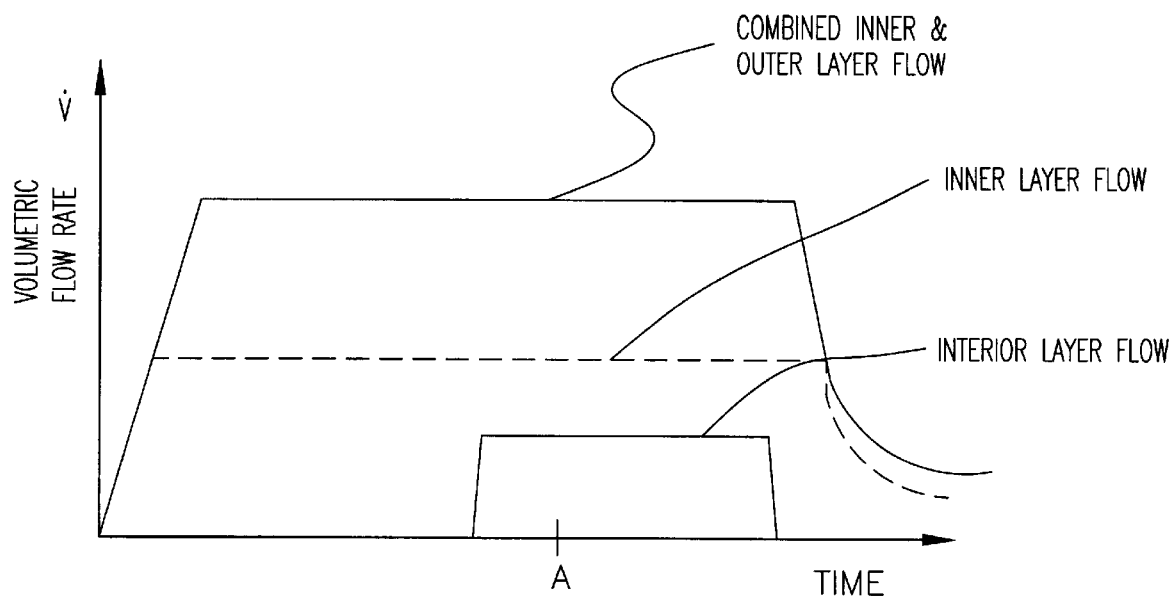

FIG. 3 illustrates similar operation but showing the ratio of inner flow-to-outer flow as 60:40, as opposed to FIG. 2. Again, as disclosed in my previous patent, the core layer (CF) remains close to the zero gradient, producing only a small but acceptable leading edge bias, this time towards the outer wall. Thus, though shifting the core layer either toward the inner wall or toward the outer wall approximately 10 percent of the wall thickness, a reasonable and acceptable leading edge bias is still maintained. FIGS. 3A, B and C, correspond respectively to FIGS. 2A, B and C, above explained, but are directed to the operation of FIG. 3.

Figure 4:
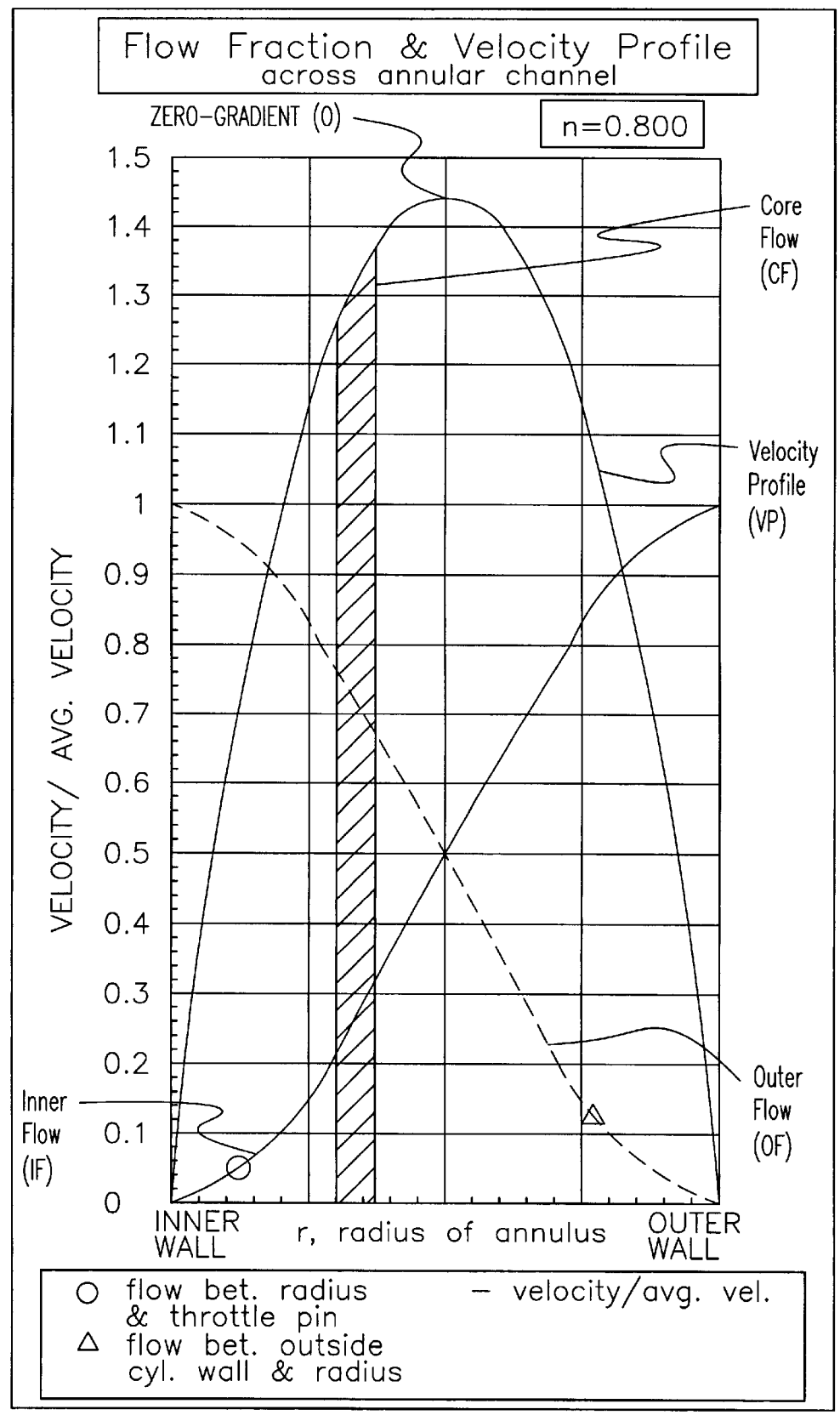
Figure 4A:
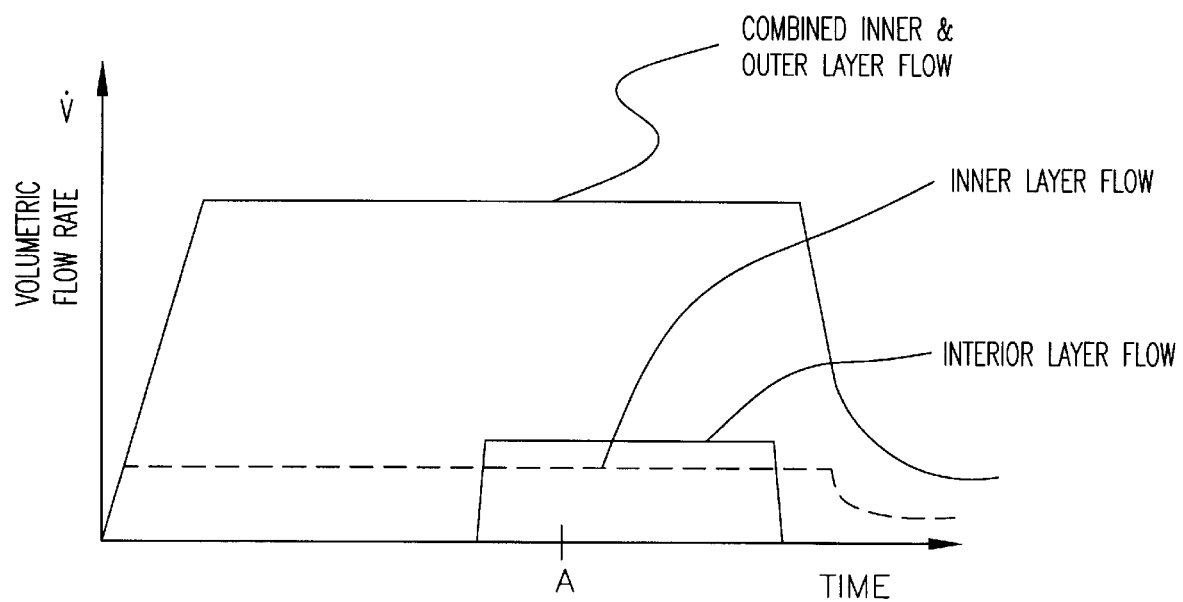
Figure 4B:
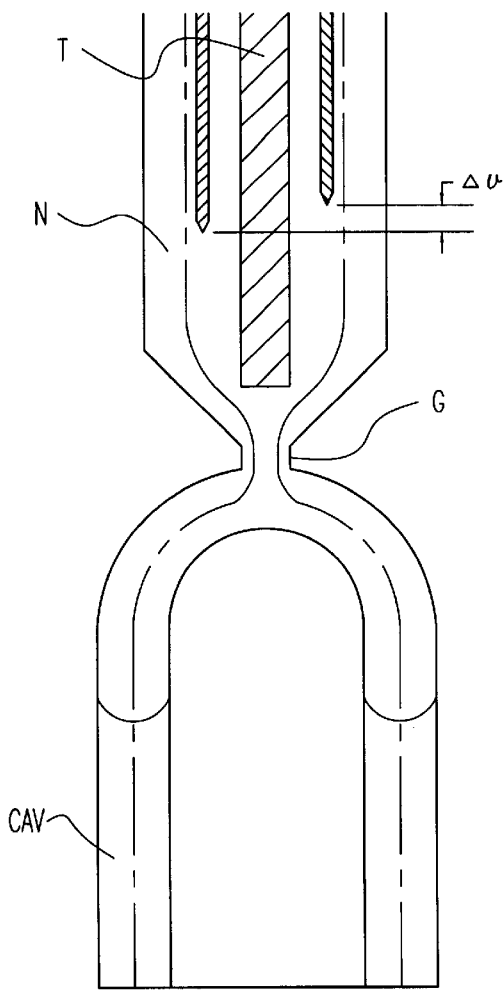
Figure 4C:
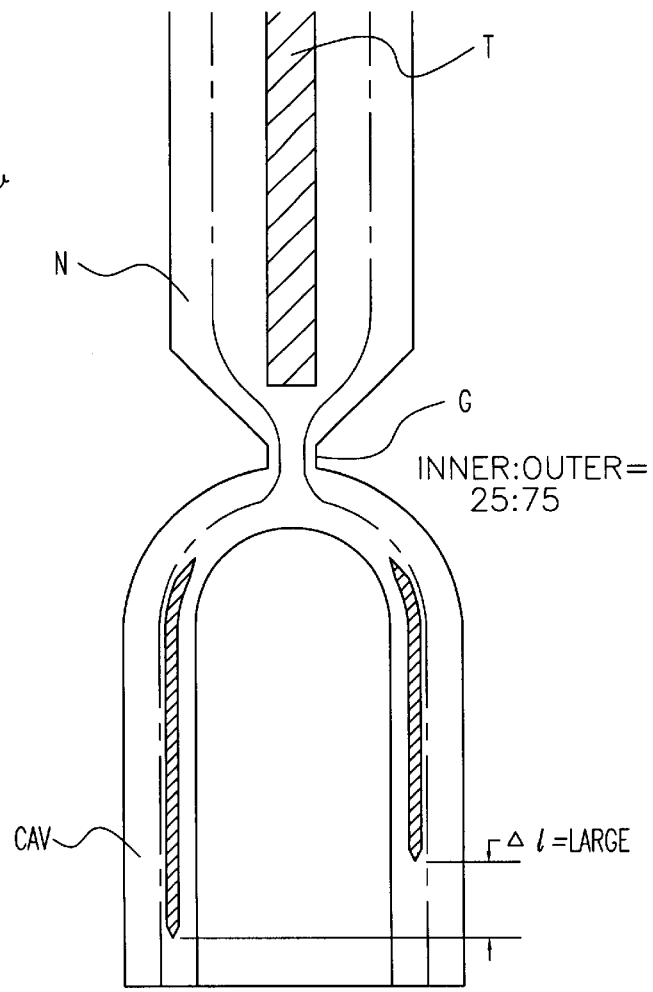

In FIG. 4, however, a condition is shown for a flow ratio adjustment of 25:75, inner flow-to-outer flow, wherein the core layer flow CF is now well offset away from the zero gradient of the combined velocity profile, resulting in a velocity distribution bias of the core layer that produces a large leading edge bias that creates an unacceptable molded article. In FIGS. 4A, B and C, corresponding to the type of showings in respective FIGS. 2A, B and C, the operation for the conditions of FIG. 4 are similarly presented.

Figure 5:
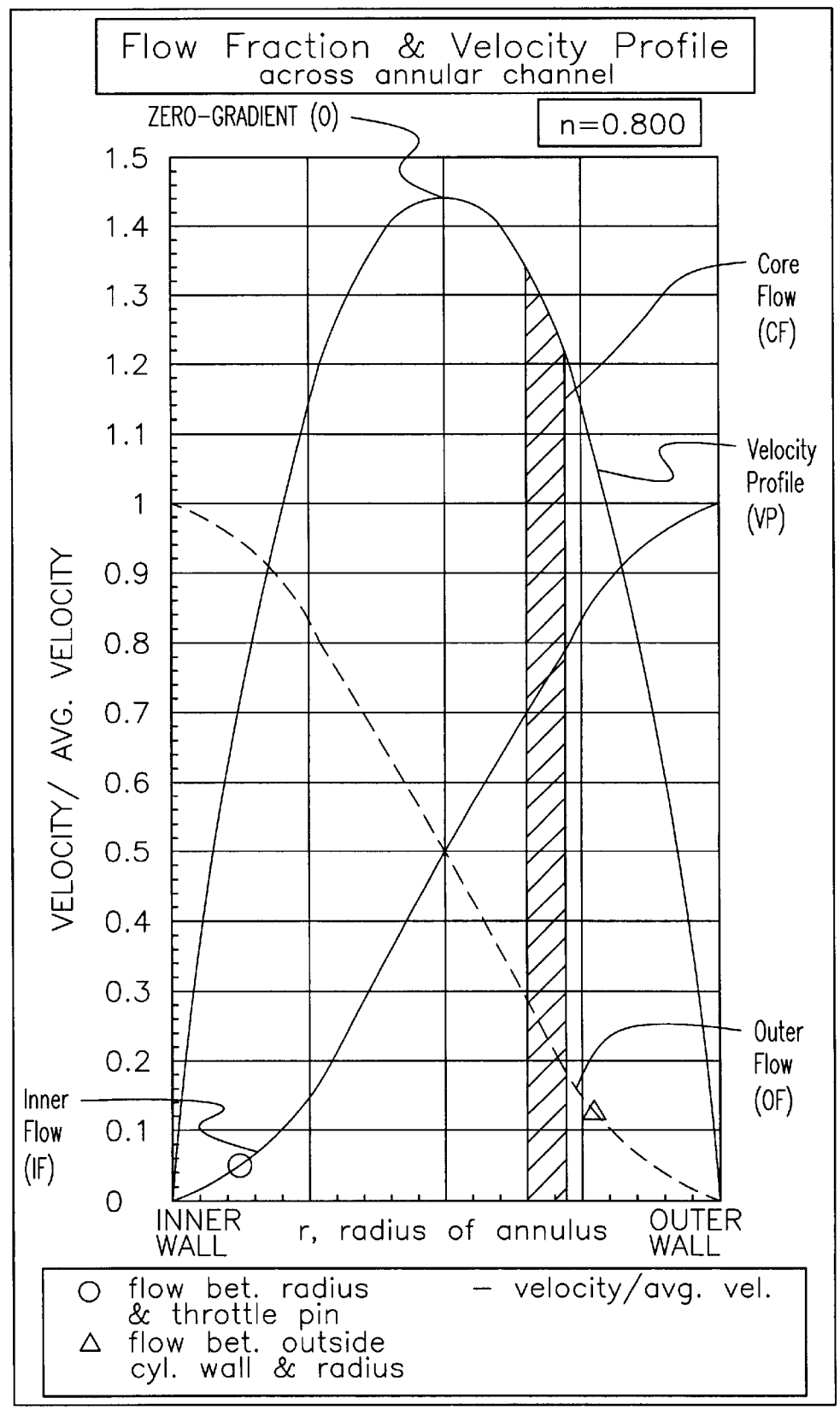
Figure 5A:
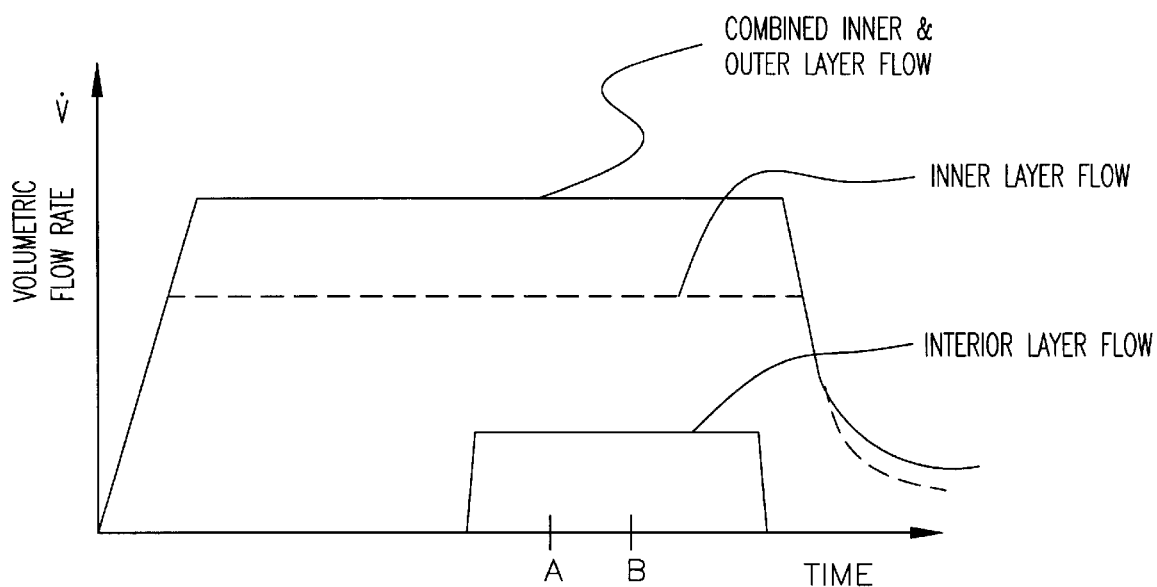

FIG. 5 shows the case where the inner-to-outer flow is 75:25, again illustrating the bias created in the molded article; and FIGS. 5A, B and C correspond to FIGS. 2A, B and C, respectively, but illustrate the conditions of FIG. 5, with a flow $\Delta v$ (FIG. 5B) producing a large bias $\Delta l$ (FIG. 5C).

As before stated, however, in accordance with the discovery underlying the present invention, the core layer may indeed be shifted for useful purposes without having the resulting molded article suffer an unacceptable leading edge bias caused by the velocity bias. The critical operational requirement for achieving this novel result is graphically illustrated in FIG. 6, and involves, as earlier discussed, that necessity for employing an initial throttle pin adjustment or other flow restrictor adjustment that ensures that the initial portion of the core or interior layer flow occurs when the inner flow (IF)-to-outer flow (OF) is in a substantially 50:50 ratio to place the interior core layer leading edge on the zero gradient of the combined velocity profile, as at region I in FIG. 6. After that flow is well-established at I—(of the order of a flow of a few, preferably about 5, percent ($\pm$) of the core material that is to be flowed for the molding of the article), then it has been found that a subsequent throttle pin adjustment or other flow-restrictor adjustment at region II, as in the case of FIG. 6, increases the inner flow-to-outer flow ratio, resulting in shifting the interior core layer leading edge. The resulting molded article—in this case, having about an 80:20 ratio with the majority of the core layer flow length III in the molded article extending closer to the outer wall—will not produce a leading-edge bias caused by velocity bias, and will still enable the production of the uniform leading edge on the molded article, but with the majority (say 95%) of the core layer length shifted toward the outer wall, as for purposes earlier and also hereinafter discussed.

One of such purposes for positionable core layers is as barrier layers, where a humidity sensitive barrier layer may be required within the molded article such as a cylindrical bottle container or the like. There may be advantage to shifting the barrier layer towards the outside walls of the container, away from the liquid content and thus at a lower relative humidity environment that can enhance the performance of the barrier layer and even require less volume of barrier material in order to provide the same barrier effect to the contents. Another illustration is for use of oxygen scavenging layers, the scavenging capacities of which may be increased by being in a higher relative humidity and/or being closer to the contents as opposed to being close to the outside wall. A thicker container outer layer, moreover, would permit less oxygen permeation than if the outer layer were thinner, slowing down oxygen transfer from the outside to the scavenging layer. The scavenging capacity of a scavenging layer closer to the contents would also remove residual oxygen left in the contents of the container during the filling process.

While the invention is useful with all kinds of polymers, polyethylene terephthalate (PET) is highly desirable for container skin materials; nylons and ethylene vinyl alcohols are useful for barrier properties; scavenger materials include products such as BP-Amoco "Amasorb", and compounds of heavy metals like cobalt with MXD6 nylon, or ethylene vinyl alcohol, wherein the cobalt makes the nylon or alcohol reactive to oxygen, as in chemical scavenging reaction therewith, rather than allowing oxygen permeation through the materials; and combinations, such as the above, will provide both barrier and scavenger properties. The incorporation of metal powders in the polymer can provide electromagnetic energy barrier layers, as well. Through the technique of the invention, indeed, any desired position of the core layer and of the relative thicknesses of the inner and outer layers of the article can readily now be obtained through this novel control of relative volumetric flow rates of the inner and outer layers above explained.

Figure 6A:
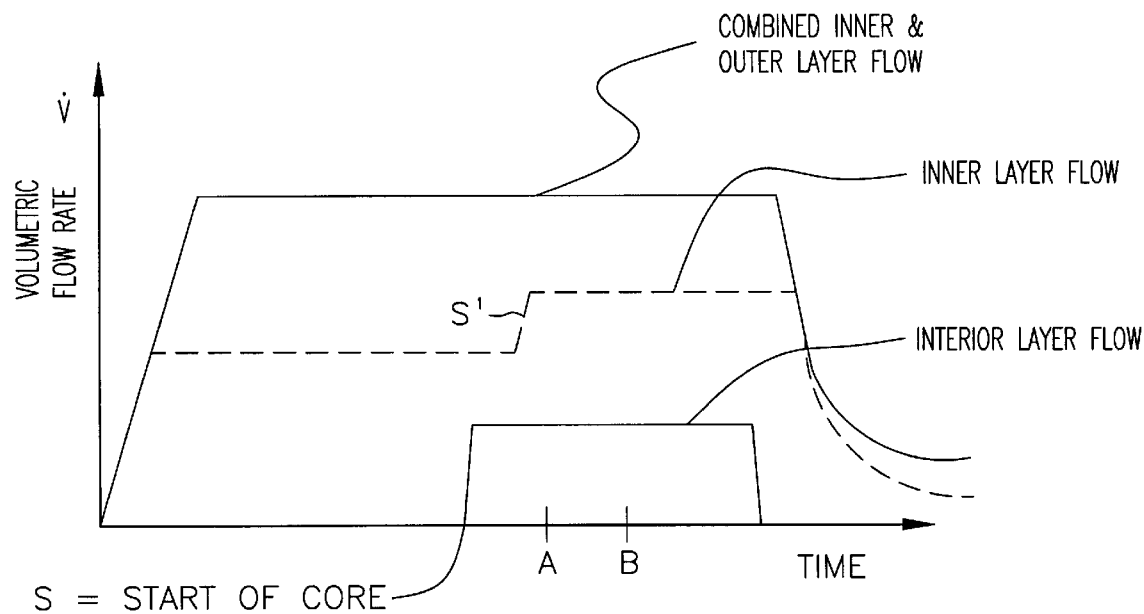
FIGS. 6A, 6B and 6C are similar to respective FIGS. 5A, 5B and 5C but describe the operational conditions of the invention as reflected by FIG. 6.
Figures 6B, 6C:
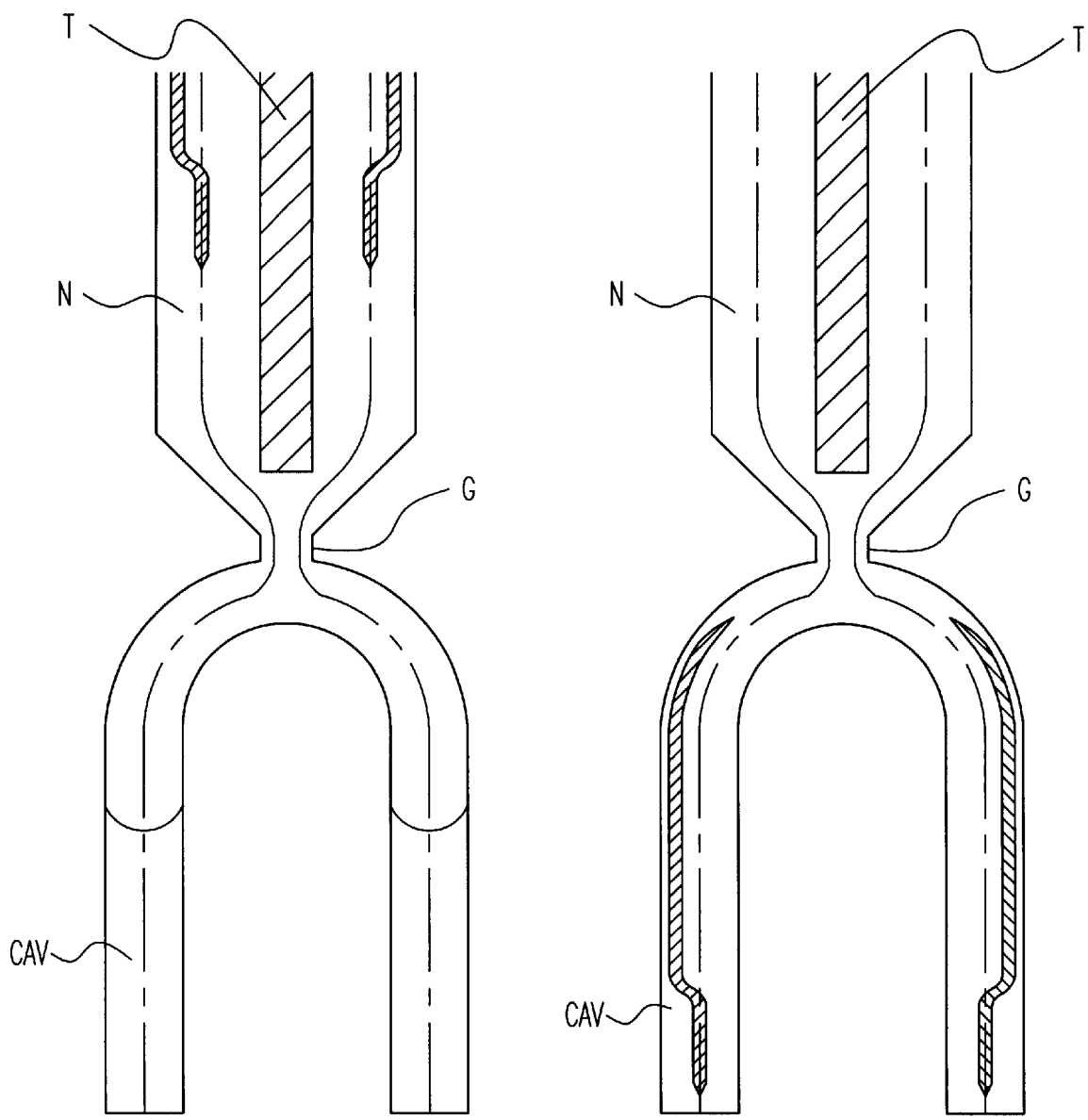

This is illustrated in the graph of FIG. 6A, where the inner layer flow increase (step $S^1$ in the dash-line curve) occurs after the start S of the core flow with 50:50 inner layer-outer layer flow to the left of $S^1$; at time A. As shown in the filled cavity of FIG. 6, though nearly all the core length is shifted towards the outer wall, no leading-edge bias exists in the article, and where the leading edge remains on the zero gradient.

Figure 7:
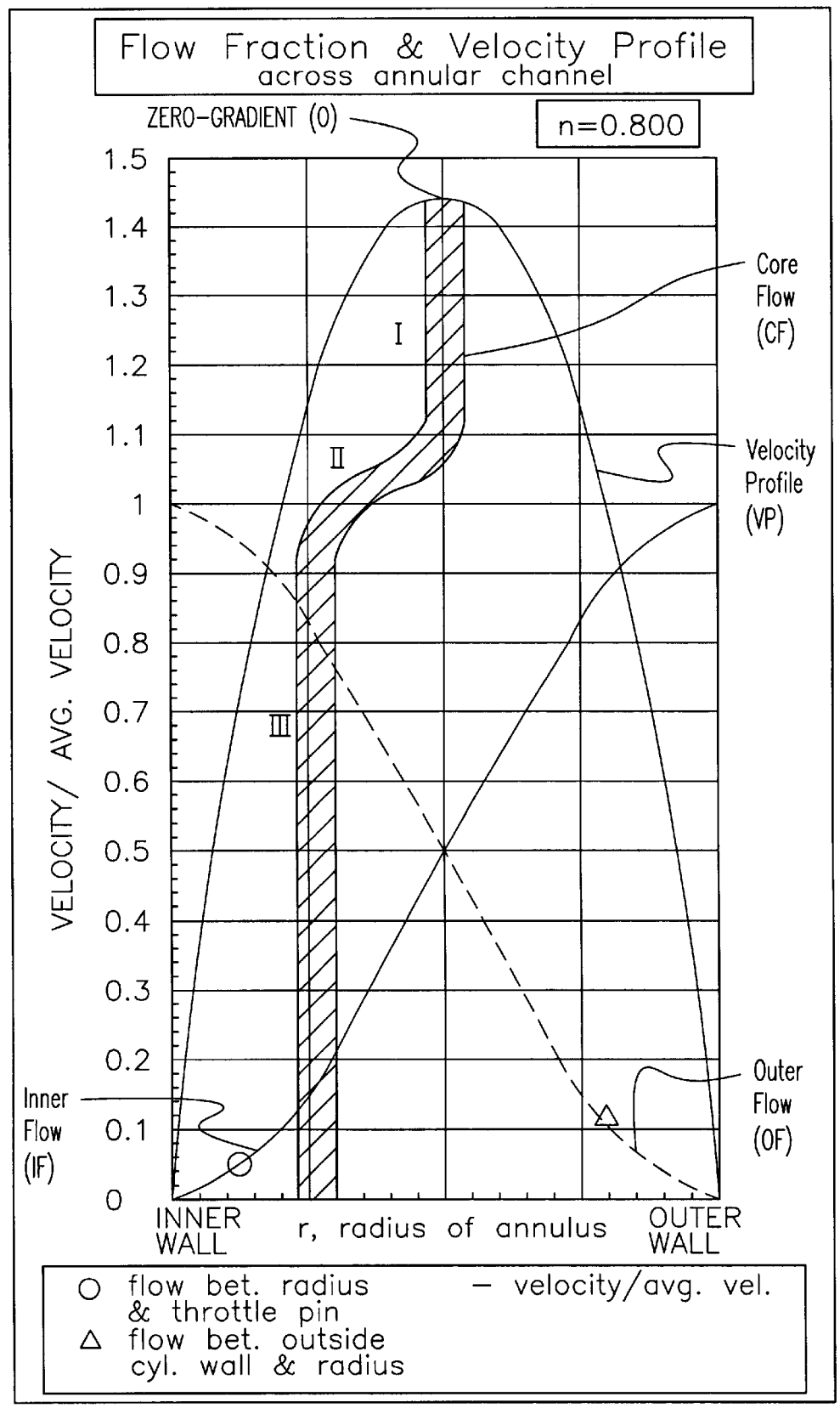
Figure 7A:
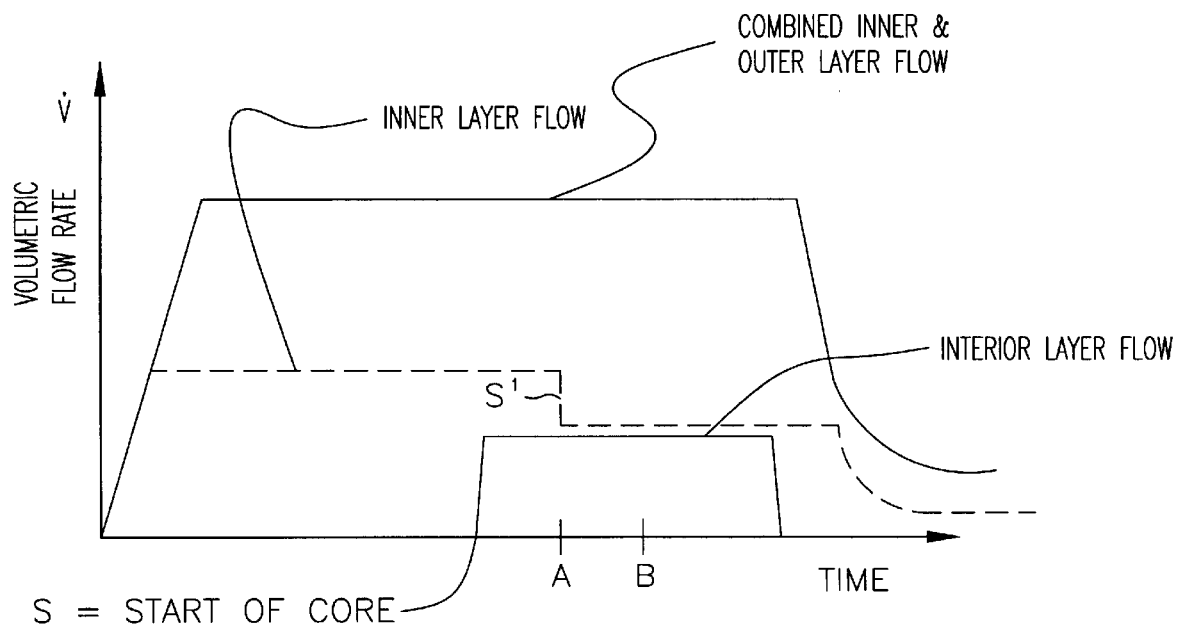

The converse of the operation of FIGS. 6A, B and C, is shown in FIGS. 7A, B and C, where, after the initial portion I of the interior core layer flow occurs during an inner flow-to-outer flow ratio adjustment of substantially 50:50, placing the core layer leading edge on the zero gradient of the combined velocity profile, the throttle pin or other flow restrictor is then adjusted to decrease the inner flow-to-outer flow ratio, again without shifting the interior layer leading edge—this time resulting in a molded article with the bulk of the core layer shifted toward the inner wall in the same ratio of 80:20, and again with no leading edge bias caused by velocity bias (FIG. 7C).

A typical injection time-line for systems of the invention such as those of FIGS. 6 and 6A–C and 7 and 7A–C is as follows:

| Time, Seconds | Action |
|---|---|
| 0 | Close mold |
| 0.1 | Start injection of inner and outer layer material at substantially 50:50 ratio |
| 0.2 | |
| 0.3 | |
| 0.4 | |
| 0.5 | |
| 0.6 | |
| 0.7 | |
| 0.8 | |
| 0.9 | |
| 1.0 | Start injection of interior layer material substantially on zero-gradient of velocity profile |
| 1.1 | Change ratio of inner layer: outer layer flow rates |
| 1.2 | |
| 1.3 | |
| 1.4 | |
| 1.5 | |
| 1.6 | |
| 1.7 | |
| 1.8 | |
| 1.9 | |
| 2.0 | Finish interior layer injection (trailing edge offset from zero-gradient of velocity profile) |
| >20 | Finish injection of inner and outer layer material |

The invention, moreover, provides not only for shifting the core layer to one side or the other of the article, such as a hollow container, and for relatively varying the thickness of the inner and outer layers, but also for enabling the shifting of the core layer back into another position of the article. Examples of this are shown in FIGS. 8A 8B, 8C and 8D for the operation graphically represented in FIG. 8 and in FIGS. 9A–9D for the operation graphically represented in FIG. 9.

Figures 8C, 8D:
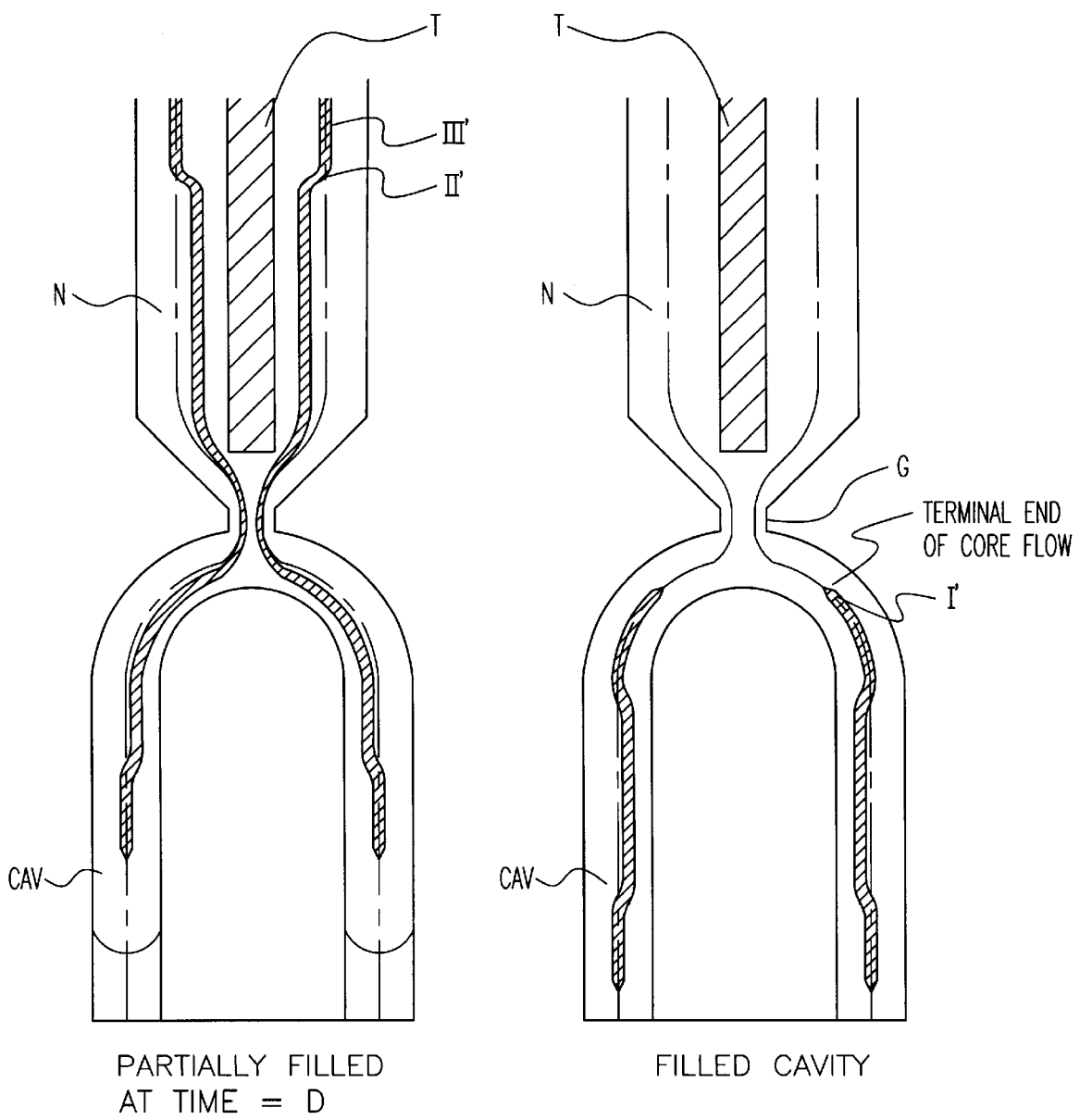
Figure 8E:
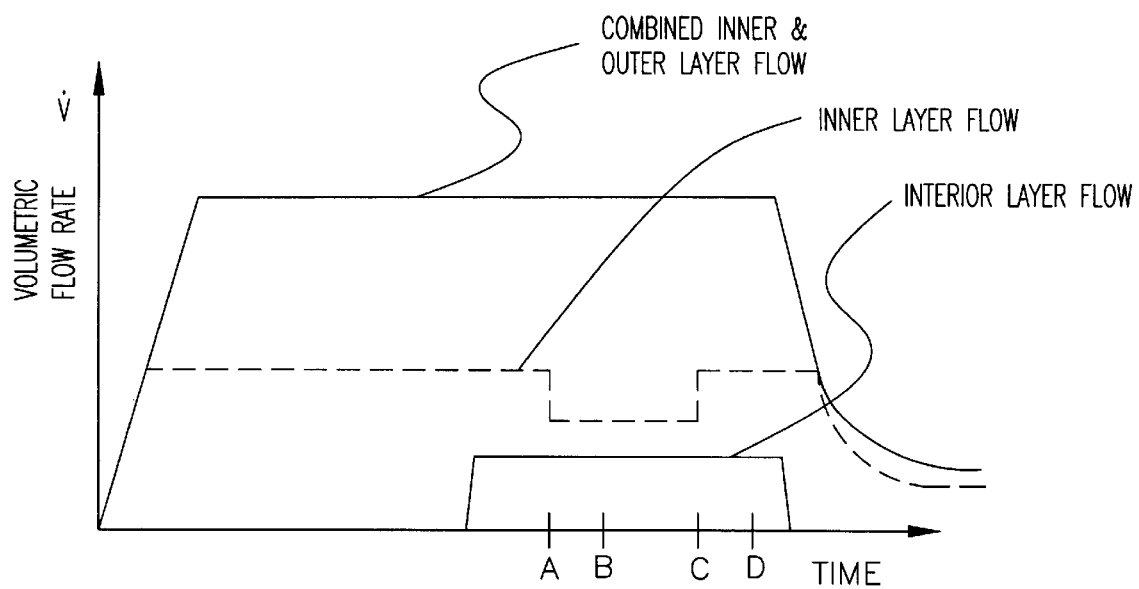
Figure 8H:
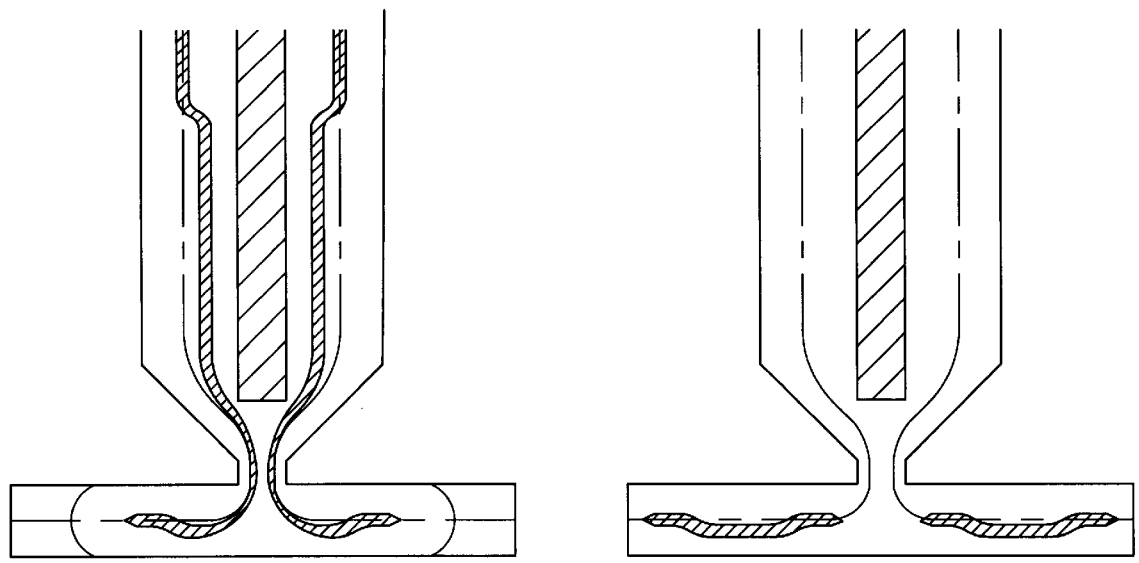
Figure 8I:
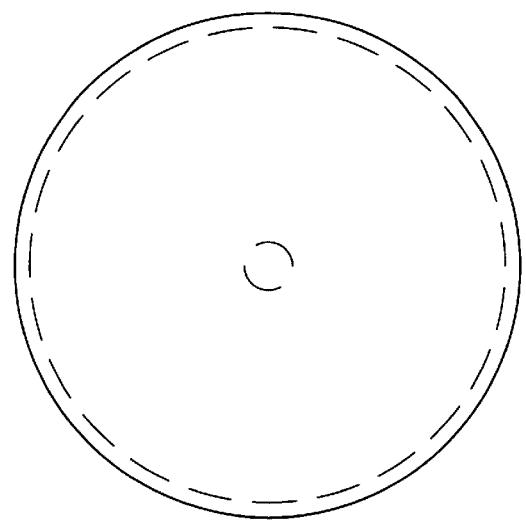

Turning first to FIGS. 8 and 8A–D, in accordance with this embodiment of the invention, the flow starts at zero-gradient velocity profile (I in FIG. 8A—top curve in FIG. 8); shifting the core layer toward the inside wall (II–III in FIG. 8B) by decreasing the inner layer flow (at $S_1$ in FIG. 8, between times A and B); and, near the end of the flow (between times C and D), increasing the inner layer flow back to equality with the outer layer flow ($S_2$ in FIG. 8) to shift the core layer (at II' in FIG. 8C) back to the zero-gradient profile (at III' in FIG. 8C), thereby producing the shape shown in FIG. 8D.

A useful purpose for the operation of FIG. 8 resides in structural considerations, wherein there may be a highly stressed portion of the molded article that can cause mechanical failure, such as delamination of the article, with the barrier or core layer positioned closer to the inside wall. Secondly, it can be important to control the thickness and shape of the terminal end of the core flow—the last portion of the molded article to freeze or solidify. Injection molding of the hot plastic into the cold cavity causes the molded article to freeze or solidify from the inner surfaces toward the interior layer, and it is advantageous to control the final flow of the material entering the cavity along the 50-percent streamline.

FIGS. 8 and 8B–D thus illustrate the shifting of the majority of the core flow towards the inside boundary wall, with both the leading-edge and also the trailing or terminal end on the zero gradient.

While the invention has heretofore been illustrated in connection with molding bottle or cylindrical-shaped container applications, the techniques of the invention are useful for molding other shaped articles or objects as well, including, as a further illustration, flat-shaped molded articles. FIGS. 8E–I illustrate such a flat-shaped molded article application, with the views corresponding respectively to the above-described FIGS. 8 and 8A–8D for a hollow bottle or the like.

Figures 9C, 9D:
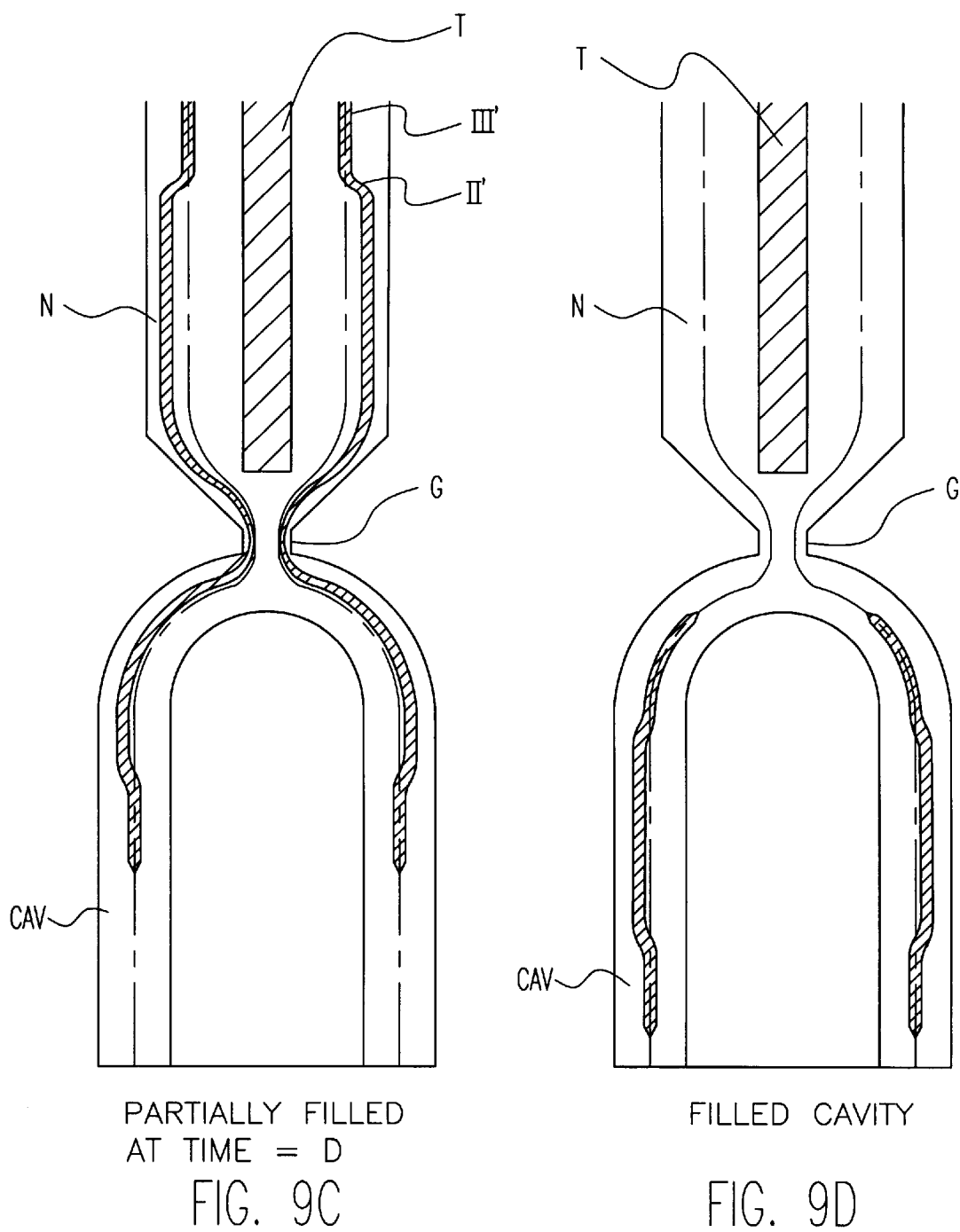
Figure 9E:
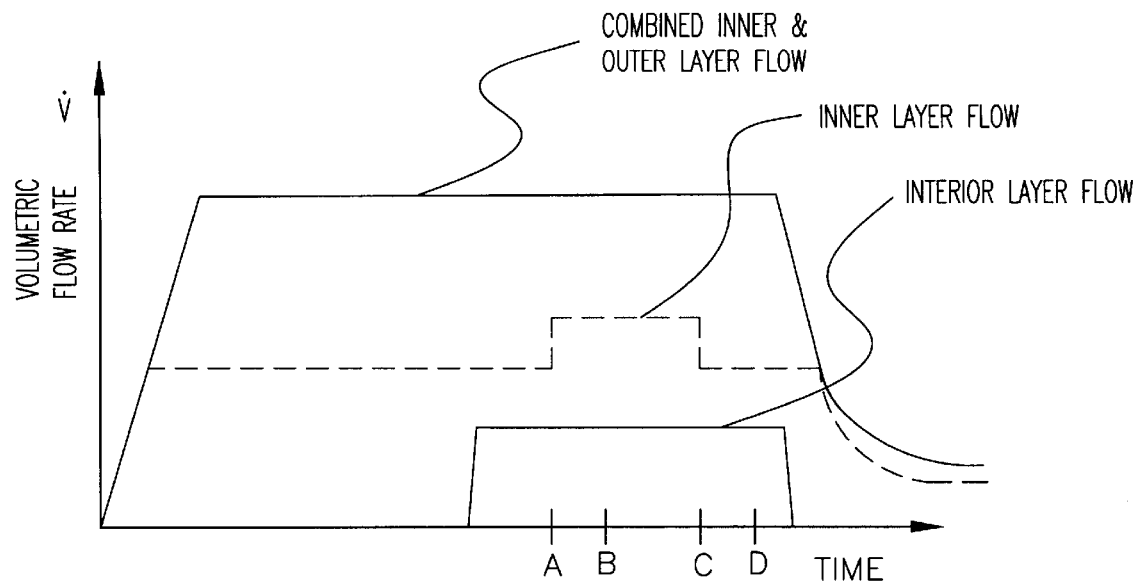
Figure 9H:
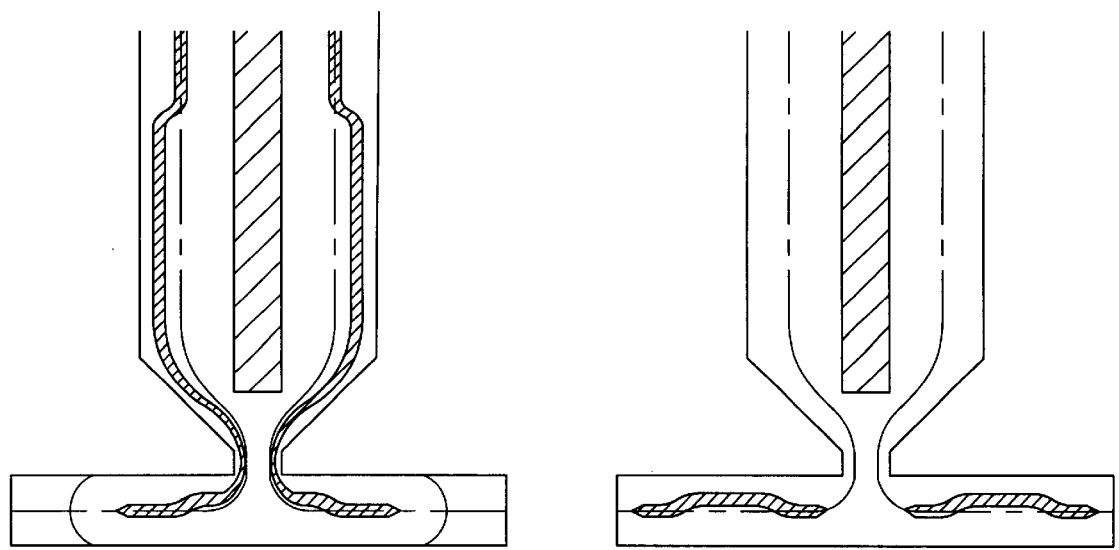
Figure 9I:
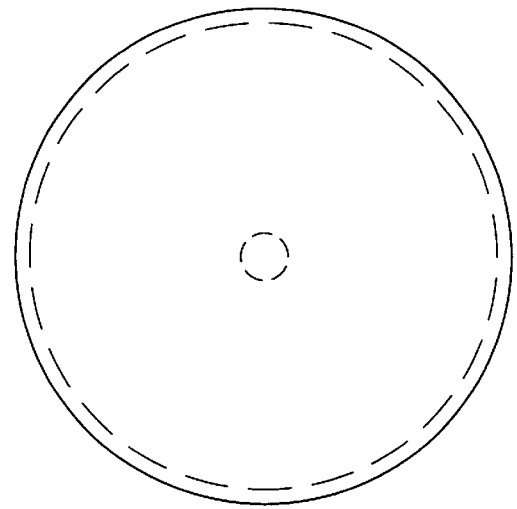

Similarly, in the embodiment of the invention shown in FIGS. 9 and 9A–9D, the flow starts at zero-gradient velocity profile (I in FIG. 9A—top curve in the graph of FIG. 9); shifting the core layer toward the outside wall (II–III in FIG. 9B) by increasing the inner layer flow (at $S_{1^1}$ in FIG. 9, between times A and B); and, near the end of the flow (between times C and D), decreasing the inner layer flow back to equality with the outer layer flow ($S_{2^1}$ in FIG. 9) to shift the core layer (at II' in FIG. 9C) back to the zero-gradient profile (at III' in FIG. 9C), thereby producing the shape shown in FIG. 9D.

FIGS. 9–9B–D thus illustrate the shifting of the majority of the core flow towards the outside wall, with both the leading-edge and also the trailing or terminal end on the zero gradient.

A useful injection time-line for the systems of FIGS. 8, 8A–D, 9 and 9A–D follows:

| Time, Seconds | Action |
|---|---|
| 0 | Close mold |
| 0.1 | Start injection of inner and outer layer material at substantially 50:50 ratio |
| 0.2 | |
| 0.3 | |
| 0.4 | |
| 0.5 | |
| 0.6 | |
| 0.7 | |
| 0.8 | |
| 0.9 | |
| 1.0 | Start injection of interior layer material substantially on zero-gradient of velocity profile |
| 1.1 | Change ratio of inner layer: outer layer flow rates |
| 1.2 | |
| 1.3 | |
| 1.4 | |
| 1.5 | |
| 1.6 | |
| 1.7 | |
| 1.8 | |
| 1.9 | Return ratio of inner: outer layer flow rates to substantially 50:50 |
| 2.0 | Finish interior layer injection substantially on zero-gradient of velocity profile |
| >20 | Finish injection of inner and outer layer material |

FIGS. 10A–C are schematic views looking from the top of the nozzle N, illustrating the entry flow channels or ports feeding the inner, outer and core or interior layer flows (IE, OE, and CE, respectively) from their respective sources (FIGS. 10B and C), and surrounding a central throttle pin entry point TE. This flow channel arrangement is shown embodied in FIGS. 10B and 10C with an array of four nozzles, fed initially from an outer and inner layer source O/IS and a core or interior layer source CS, respectively, in a balanced three-layer flow system. The outer and inner layer plastic flow from the source O/IS is split at $S^1$ into two matched flow streams, and then branched at $B^1$ to feed the entry channels for the outer layer OE and inner layer IE of each of the upper and lower pairs of nozzles, in parallel. Similarly, the core layer source CS branches to feed the core channels CE of the two pairs of nozzles and with balanced feed.

Flow restrictor controls, such as well-known electrically, hydraulically or even manually operated valves, are substantially illustrated in FIG. 10B at FR, placed in each of the outer layer feed channels and synchronously operated to vary the relative ratio of outer and inner layer flow at preselected times, for the previously described flow shifting purposes of the invention. Similarly, in FIG. 10C, the same controls can be effected with the flow restrictor controls FR disposed in the inner layer feed channels within each nozzle or in each final channel feeding material to the inner layer in each nozzle. Thus, in the embodiments of FIGS. 11A and B, the flow restriction control is shown inserted in the most common feed channel feeding the outer layer and the inner layer, respectively, for changing such flow ratios.

Schematic views, showing a simple but effective way of operating pin-type flow restrictors in a feed channel are shown in FIGS. 12A, B and C for three different positions. FIG. 12A illustrates the least restricted position with the restrictor pin barely inserted into the flow channel; and FIGS. 12B and 12C illustrate more and most flow-restricting positions, respectively. These may be effected, as before indicated, in the most common channel of the runner system (FIGS. 11A and B), or, if desired, in a least common channel to the nozzle (FIGS. 10B and C) and elsewhere, as desired. Again, as earlier stated, the restrictor insertion and withdrawal control may be automatically effected in well-known manner, electrically or hydraulically, for example, with timing control of the position of each with respect to start or the end of the flow—all as intended to be schematically represented at FR.

Turning, now, to specific practical designs for such nozzle channel flow and restriction structures, reference is made to FIG. 13 which illustrates a cross-section of a preferred hollow nozzle extruder construction of the form described in my said earlier U.S. Pat. No. 5,914,138 (FIG. 16 thereof), in which flow from a manifold is effected through a flat disc 3-layer flow combining area C-FD surrounding a central longitudinally movable throttle valve pin T-T$^1$, and wherein annular flow is combined and gated into a mold cavity CAV. The flat disc structure FD comprises four flat discus surrounding the throttle pin T and forming the inner flow channel wall C' for the inner layer of the combined flow stream. Flow channels $C_1'$, $C_2'$, $C_3'$ etc. are created between the three mating planar surfaces of the discs FD, as also explained in said patent, uniformly to disperse each flow layer to produce a uniform flow of the respective material flowing from each channel into the area of combination C. In this manner, each layer of the combined flow stream is uniformly annularly disposed as it flows from the combining means through the extruding throttle nozzle and gate G into the cavity CAV. The movable throttle valve pin T-T$^1$, under control of an upper adjusting restrictor-control rod R, which is also, in a sense, part of the throttle pin structure as well, varies the percentage of the outer layer material in the inner annular flow layer versus the outer annular flow layer of the combined flow stream downstream of the combining area C. As before explained, changing the relative volume of the outer layers shifts the position of the core (interior) layer for the previously described purposes of the present invention.

In the embodiment above FIG. 13, the restrictor rod R axially movable within the nozzle inner housing E, is shown at $R^1$, just at the inner layer feed channel $C^{1\prime}$. This is a neutral position with disc channels $C^{1\prime}$, $C_2'$, etc. opened to balance inner layer flow with respect to the outer layer flow for the purposes of the initial core layer flow in accordance with the principles of the invention. In the enlarged views of FIGS. 14 and 15, the throttle valve T has been adjusted by the rod R to an elevated position R'', to increase the inner flow rate with respect to the outer layer flow rate for the core shifting control purposes of the invention—the least flow-restricted position; whereas, in FIG. 15, more restriction (most) is illustrated at R'''.

Figure 16B:
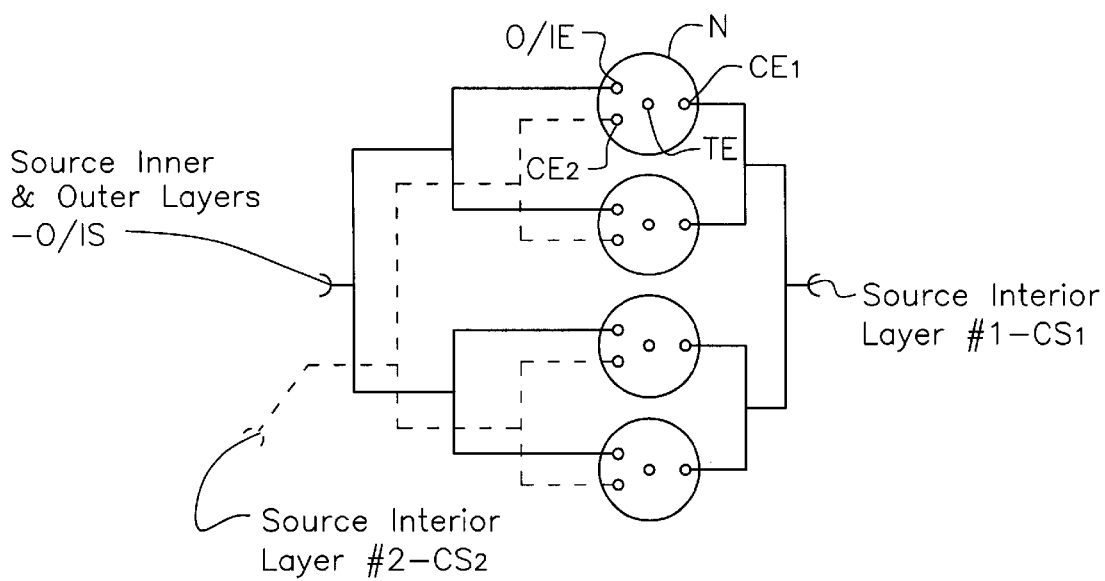

A schematic feed channel diagram similar to FIGS. 10A–C, but for the specific annular layer flow of the nozzle of FIGS. 13, 14 and 15 when used for 3-material polymer plastic streams, is illustrated in FIGS. 16A and 16B. The inner and outer stream is divided within the nozzle to form the inner and outer annular covering layers. In this case, the source O/IS of the inner and outer layer flows, is again branched into the nozzle entry feed channels, but a first interior layer source CS branchfeeds the entry channel $CE_1$, and, as shown by the dash lines, a second interior layer source $CS_2$ branch-feeds the entry channel $CE_2$. The first interior layer stream (#1) is thus directed within the nozzles N to form the interior annular layer adjacent the inner layer. The second interior layer stream (#2) is directed within the nozzle to form the interior annular layer adjacent the outer layer.

As earlier mentioned, the techniques of the present invention are not restricted in the numbers of materials and layers to be molded, though illustrating two-material, three-layer pre-form molding examples; it having been previously noted that the invention is also quite useful, for example, in three-material, four-layer pre-form molding as well. Such an application is shown in FIGS. 17 and 17A–D and FIGS. 19 and 19A–D for molding hollow container articles or objects, and in FIGS. 18 and 18A–D and FIGS. 20 and 20A–D for flat-shaped articles, respectively.

In connection with the adaptation of the invention for molding of three materials to form a four-layer object, typical applications would be for a plastic container composed of two interior layers; one layer would usually be selected for its gas barrier for gas scavenger properties, and the other interior layer would be selected for some other property such as a structural layer or a recycled layer. The gas barrier and/or gas scavenger property still requires that the leading edge of this one of the two interior layers be uniform in its penetration around the circumference of the molded object. This uniform penetration can be achieved by starting the flow of this one interior layer before starting the flow of the second interior layer, so that the leading edge of this first-flowing interior layer starts on the zero gradient of the velocity profile. Subsequent initiation of the flow of the second interior layer offsets the later-flowing portions of the first interior material from the zero gradient, but the uniform leading edge is established by the initial flow of the first interior layer on the zero gradient.

Figures 17C, 17D:
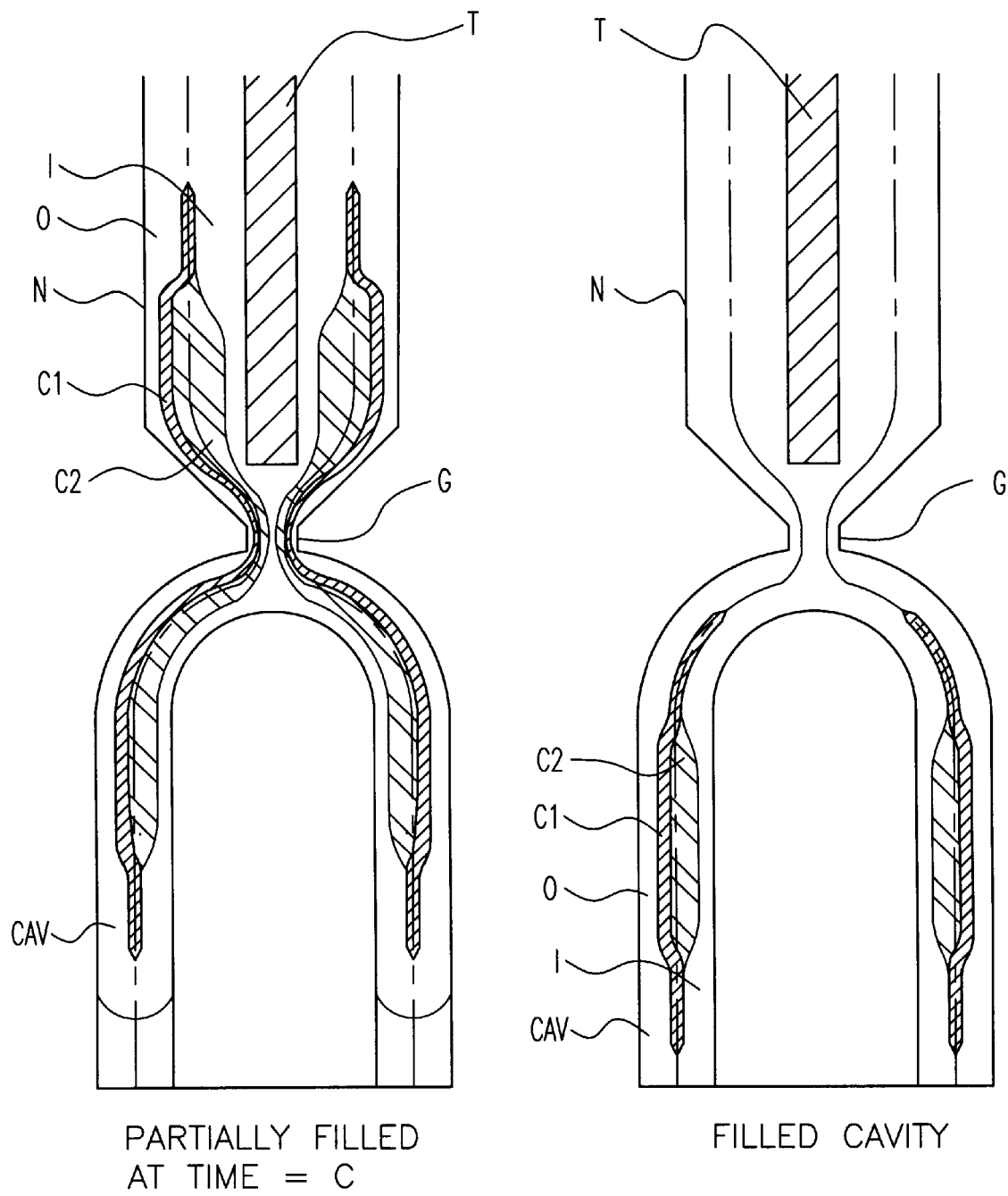

In FIG. 17, the first-flowing interior layer C1 (in this case the outermost interior layer in the molded object) starts to flow at time S1. The second-flowing interior layer C2 (in this case the innermost interior layer) starts flowing at time S2 which also corresponds with the reduction of the flow rate of the combined inner and outer layer flow. FIG. 17A shows the flow in the nozzle and partially-filled cavity at time A of FIG. 17; this time being between the time S1 and S2. The first-flowing interior layer C1 leading edge is on the zero gradient of the combined flow velocity profile, thus assuring its uniform penetration in the molded object. FIG. 17B shows the partially filled cavity at time B of FIG. 17. The leading edge of the first-flowing interior layer C1 remains on the zero gradient, while the later-flowing portions of the first-flowing interior layer are moved off the zero gradient by the second-flowing interior layer C2, and are closer to the wall of the extruder. FIG. 17C shows the position of the flows in the nozzle and cavity at time C of FIG. 17. The second-flowing interior layer has ceased flowing at time S3, thereby allowing the final flow portion of the first-flowing interior layer to return to the zero gradient just before its flow is terminated, S4. FIG. 17D shows the filled cavity when the trailing edge of the first-flowing interior layer has been injected into the cavity by the continued flow of the combined inner and outer layer flow after time C, of FIG. 17. The filled cavity shows the first-flowing interior layer closer to the outer wall in the portions of the filled cavity corresponding to the simultaneous flow of the second-flowing interior layer.

FIGS. 19, 19A, 19B, 19C, and 19D are similar to FIGS. 17 and 17A–D in concept, except that, in this example, the first-flowing interior layer C1 is the innermost interior layer and the second-flowing interior layer C2 is the outermost interior layer. All other features are similar to the case of FIGS. 17 and 17A–D, but in the filled cavity, the first-flowing interior layer is closer to the inside wall of the molded part in portions of the cavity corresponding to the simultaneous flow of the second-flowing interior layer.

In both the embodiments of FIGS. 17, 17A–D and 19 and 19A–D, C2 is shown terminating before the termination of C1 in order to allow the final portion of C1 to flow along the zero gradient of the velocity profile. It should be understood, however, that it is within the scope of this invention that C1 may also terminate before or simultaneously with the termination of C2 if the desired properties of the molded object are enhanced by such a termination sequence.

The operational graphs of FIGS. 17 and 19 show a reduction in the flow rate of the combined inner and outer layer flow at time S2, corresponding to the start of the flow of the second-flowing interior layer. The thickness of each of the flowing layers is directly proportional to the volumetric flow rate of each layer relative to the total volumetric flow rate of each layer relative to the total volumetric flow rate of all the layers during the time when all layers are simultaneously flowing. The proximity of the innermost interior layer and outermost interior layer to the respective inner and outer walls of the molded article or object is changed by having the flow rate of the combined inner and outer layer be greater or lesser during the time when all layers are simultaneously flowing.

Such relative thickness and position of each of the interior layers is chosen to enhance the properties of the final molded object. For example, if one of the interior layers is a gas scavenger, the chosen position of the gas scavenger layer may typically be the innermost interior layer C1 of FIGS. 19 and 19A–D in order to reduce the permeation rate of gas through the outer layers of the container into the scavenger, and to increase the rate of gas scavenging from the contents of the container. Such a position, indeed will extend the shelf life of the container contents if the purpose of the scavenger layer is to absorb gas permeating from the atmosphere exterior to the container. As another example, the position of outermost interior layer C1 of FIG. 17 can enhance the performance of a humidity-sensitive gas barrier layer, such as the before-mentioned EVOH or MXD6 nylon, by moving such barrier layer away from the 100% relative humidity of the contents of a beverage that is to fill the container to a position in the wall that is closer to the lower relative humidity of the atmosphere surrounding the container.

A typical injection time-line for molding such three-material, four-layer articles wherein the leading edge of the first interior layer is established substantially on the zero-gradient of the velocity profile, and then a second interior layer is injected and its injection is finished before the first interior layer injection is finished, as shown in FIGS. 17, 17A–D and 19 and 19A–D, follows:

| Time, Seconds | Action |
| --- | --- |
| 0 | Close mold |
| 0.1 | Start injection of inner and outer layer material at substantially 50:50 ratio |
| 0.2 | |
| 0.3 | |
| 0.4 | |
| 0.5 | |
| 0.6 | |
| 0.7 | |
| 0.8 | |
| 0.9 | |
| 1.0 | Start injection of interior layer material substantially on zero-gradient of velocity profile |
| 1.1 | Start injection of second interior layer material and reduce combined flow rate of inner and outer material |
| 1.2 | |
| 1.3 | |
| 1.4 | |
| 1.5 | |
| 1.6 | |
| 1.7 | |
| 1.8 | |
| 1.9 | Finish injection of second interior layer material |
| 2.0 | Finish injection of first interior layer material substantially on zero-gradient of velocity profile |
| >20 | Finish injection of inner and outer layer material |

As previously described, other-shaped objects or articles may also be molded by the techniques of the invention, including the flat-shaped articles of earlier mentioned FIGS. 18 and 18A–D and 20 and 20A–D.

Exemplary articles, ports or products formable with the above-described techniques of the present invention are shown in FIGS. 21A through 24C.

Figure 21A:
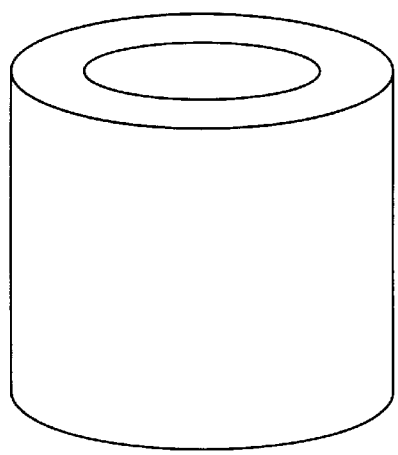
Figure 21B:
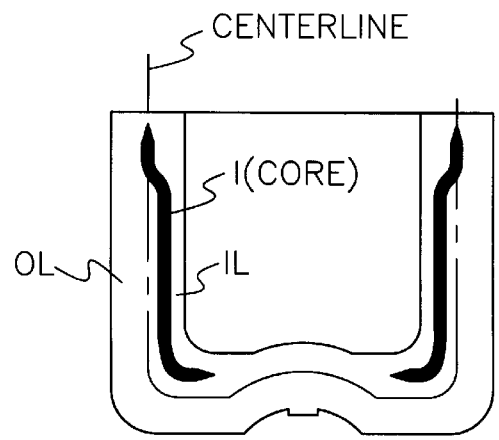

FIG. 21A depicts a plastic molded cylindrical hollow container having an open top and a closed bottom. FIG. 21B shows the cross-section of the container through its axial center line (shown dashed), wherein the interior layer has a leading edge on the centerline of the molded wall, this centerline corresponding to the zero-gradient of the velocity profile during the flow of plastic into the mold cavity which formed the part—for example as in the forming process of FIGS. 7A–C. While the interior layer leading edge substantially is on the part wall centerline, the other portions of the interior layer are offset from the centerline toward the inner wall surface of the article.

Figure 21C:
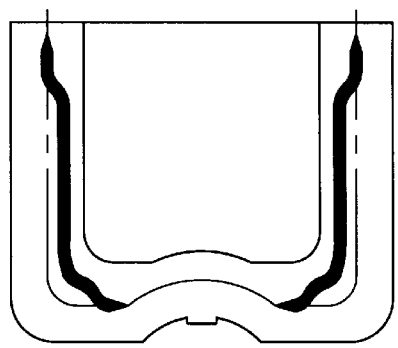
Figure 21D:
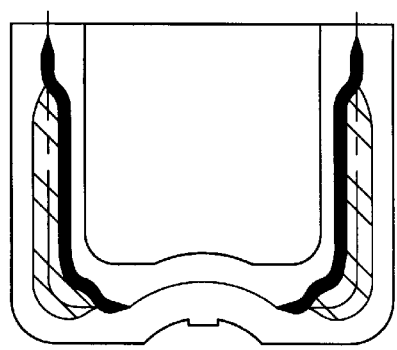

Variants are illustrated in FIGS. 21C and D; with the trailing edge of the interior layer being substantially on the part centerline in FIG. 21C, and with an additional interior layer in FIG. 21D (see FIG. 19B, for example) having a leading edge that does not extend as far as the leading edge of the other interior layer and has a trailing edge that terminates father from the gate than the other interior layer. What is not depicted, but is possible, are molded articles wherein the leading edge of one interior layer extends beyond the leading edge of the other interior layer, and wherein the trailing edges of both interior layers terminate approximately at the same distance from the gate.

As another example, FIG. 22D illustrates a blow-molded hollow container formed from the multilayer article of FIG. 22. Cross-sections of segments A, B and C of FIGS. 22 and 22D are show on enlarged scales in FIGS. 22A, 22B and 22C, respectively. FIG. 22 shows a molded preform having the leading edge of its interior layer on the wall centerline and other portions of its interior layer offset from the centerline toward the outer wall surface (as in FIGS. 6A–C). In the wall section in the finish portion of the article as illustrated wherein the leading edge of the interior layer is substantially on the centerline of the wall, and another portion of the interior layer is offset from the centerline toward the outer wall surface. The wall cross-section of a segment of the container sidewall is shown in FIG. 22B wherein the interior layer is offset from the centerline toward the outer wall surface; and FIG. 22C shows the cross-section of a segment of the container base wherein the interior layer trailing edge terminates offset from the article centerline.

In the blow-molded container of FIG. 23D, the molded pre-form of which is depicted in FIG. 23, the trailing edge of the interior layer is substantially on the wall centerline, as distinguished from the pre-form of FIG. 22. FIGS. 23A and 23B are similar to before-discussed FIGS. 22A and 22B, respectively, but with the variations of FIG. 23. FIG. 23C is the cross-section C of a segment of the base of the container of FIG. 23D wherein the trailing edge of the interior layer terminates substantially on the wall centerline.

Figure 18:
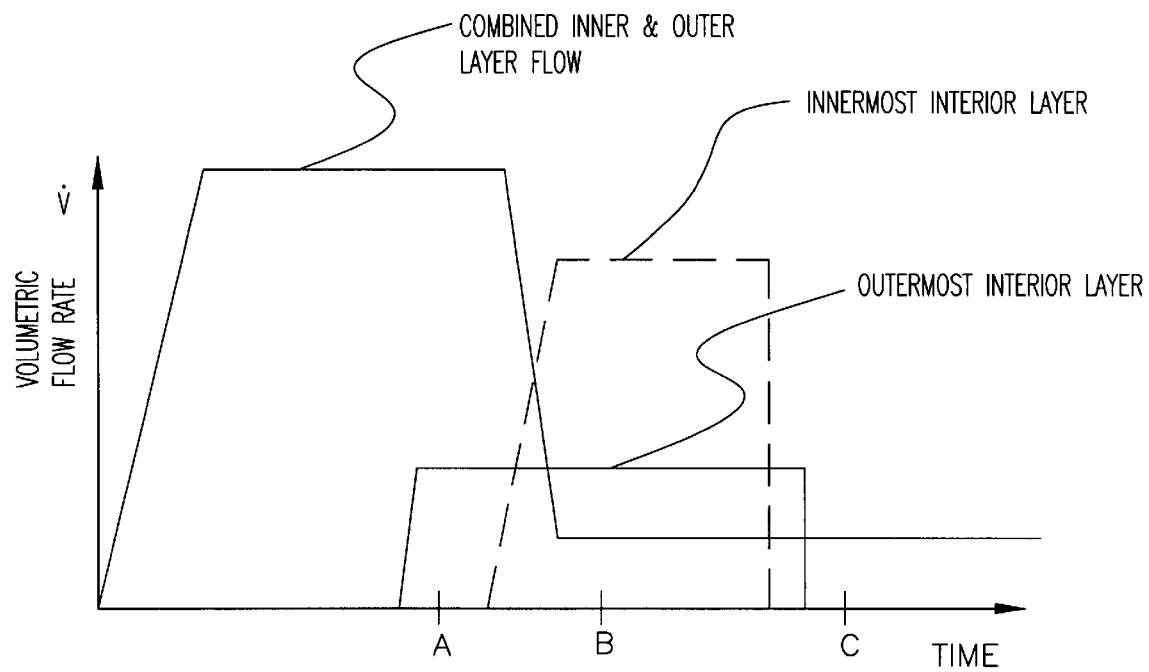
Figures 18A, 18B:
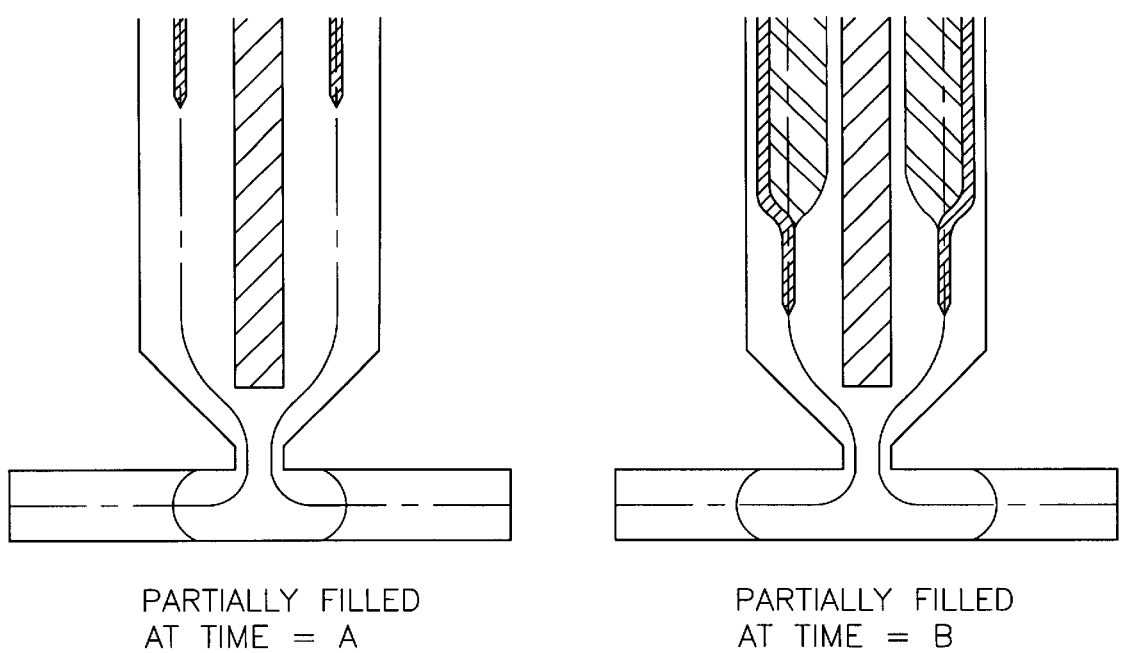
Figure 18C:
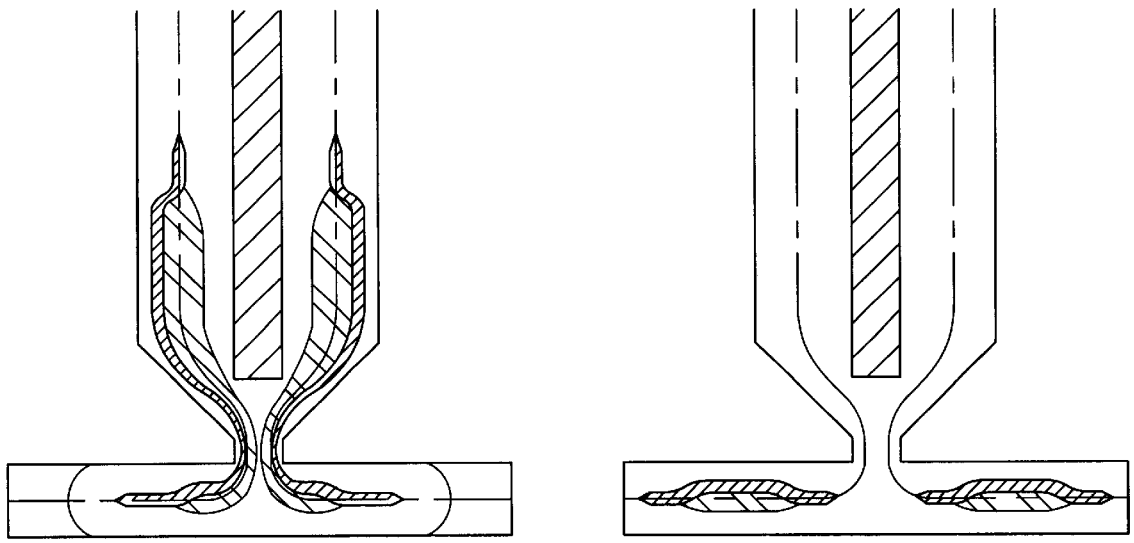
Figure 18D:
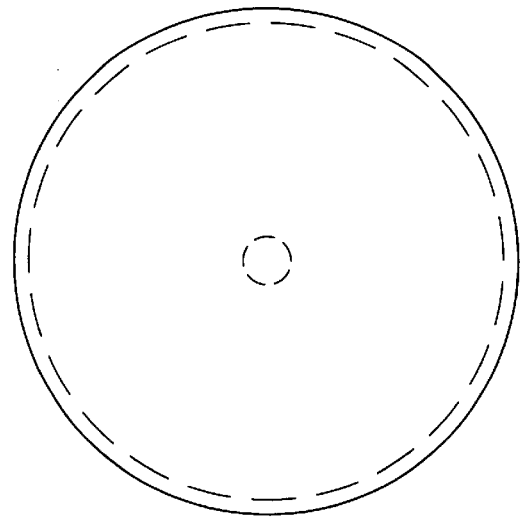

Still another modification is presented in the cross-section of a four-layer molded article and FIG. 24 that can be blow-molded into the container of FIG. 24D (see FIGS. 17–19). The leading and trailing edges of one interior layer are substantially on the part centerline and extend beyond the leading and trailing edges of the other interior layer as shown, more specifically in FIGS. 24A and 24B, respectively. What is not depicted, but is possible, are four-layer molded articles for blow-molding wherein the leading edge of the first interior layer extends beyond the leading of the second interior layer and wherein the trailing edges of both interior layers terminate approximately the same distance from the gate. An additional undepicted article is one wherein the trailing edge of the second interior layer extends beyond the trailing edge of the first interior layer and wherein the leading edge of the first interior layer extends beyond the leading edge of the second interior layer.

The previously discussed layer distributions of FIGS. 21B, 21C or 21D, moreover, can also be molded into articles similar to pre-form of FIG. 22 for blow-molding into containers similar to FIG. 22D. Similarly, the layer distribution of FIGS. 22, 23 and 24 can also be molded into articles similar to FIG. 21. Additionally, any of these depicted layer distributions can be molded into articles of other shapes, such as flat plates, (see FIGS. 18 and 20), concave discs, lids and closures for containers, and other shapes limited only by the imagination of one skilled in the art.

Other signs of flow control devices may also be employed, and other further modifications will also occur to those skilled in this art, such being considered, however, to fall within the spirit and scope of the invention as defined in the appended claims.

What is claimed is:

1. A method for co-extruding multiple polymer plastic materials as for injecting through a gate region into a mold cavity to produce a molded article, that comprises, co-extrusively flowing streams of polymer plastic materials with at least one interior stream that is to serve as an interior core of a resulting molded plastic article within inner and outer streams of plastic material that serve as covering wall plastic material layers for the core; forcing the flowing streams to flow along concentric annular flow paths within and along a longitudinally extending tubular extruder nozzle to the cavity gate region; adjusting the flow streams initially to cause the core stream to start to flow at a region of substantially zero gradient in the transverse flow velocity profile of the extrusion; thereupon varying the relative volumetric flow ratio of the inner and outer layer streams after the zero-gradient flow of the core layer has started, in order to offset the core layer flow from the zero gradient and to shift the core layer closer to one of the inner or outer annular flow boundaries, thereby to produce a molded article wherein the major portion of the core layer is closer to one of the inner or outer article walls than the other.

2. The method of claim 1 wherein the relative thickness of the inner or outer layers is correspondingly varied substantially in said ratio.

3. The method of claim 1 wherein, prior to the termination of the extrusion, the flow ratio of the inner and outer layers is varied to shift the terminal end of the interior core stream back along substantially said zero gradient.

4. The method of claim 1 wherein the inner and outer stream ratio is varied after a few percent of the core layer stream flow has initially flowed.

5. The method of claim 1 wherein the adjusting of the flow stream initially causes the inner and outer streams to start to flow with substantially equal volumetric flow rates.

6. The method of claim 1 wherein said forcing is effected by disposing a longitudinal pin within and along the extruder to force the combined streams into said concentric annular flow paths.

7. The method of claim 1 wherein the relative volumetric flow ratio of the inner and outer streams is controlled by relatively restricting the respective flow channels of the streams within the extruder.

8. The method of claim 7 wherein the timing of said relative flow restricting is controlled to coincide with one or both of (1) a short time after the start of the flow of the core stream, and (2) near the termination thereof.

9. The method of claim 7 wherein the timing of said relative flow restricting is controlled intermediate the flow of the streams to the mold cavity.

10. The method of claim 7 wherein the relative flow restricting is effected by inserting a flow restrictor into the inner or outer flow stream within the extruder.

11. The method of claim 7 wherein the inner, outer and core layer flow streams are fed into respective entry channels in the extruder nozzle from respective material sources, and the flow restrictor is inserted into one of either a source flow channel, or near a nozzle entry channel.

12. The method of claim 11 wherein a plurality of similar nozzles are similarly simultaneously fed from respective material sources, with flow restrictors inserted near corresponding inner or outer layer entry flow channels in each nozzle or in common feed channels from said sources.

13. The method of claim 1 wherein the inner and outer layer streams are fed from the same plastic material source and the plastic core material stream from a different source, and the annular co-extensive streams of the core material stream encased by the inner and outer layer streams are combined near said gate region and laterally injected in opposite transverse directions into the mold cavity.

14. The method of claim 13 wherein the molded article thereby formed is a hollow plastic container in which the interior core layer encased by inner and outer container walls is of material that serves as a barrier layer for such purposes as resisting the flow of gases through the container walls and/or scavenging oxygen.

15. The method of claim 1 wherein a three-material plastic article is to be molded comprising inner and outer layers and two interior or core layer materials and wherein the inner and outer layer material streams are divided within the nozzle to form the inner and outer annular covering wall layers, one of the interior layer streams being directed within the nozzle to form an interior annular layer adjacent said inner layer, and the other interior stream being directed within the nozzle to form an interior annular layer adjacent the outer layer.

16. A method for co-extruding multiple plastic materials as for injecting through a gate region into a mold cavity to produce a molded article having an interior core layer encased within inner and outer wall layers, that comprises, co-extrusively flowing inner and outer layer streams of plastic material encasing an interior core layer to inject the same though the gate region into the mold cavity; initially starting the flow with a substantially 50:50 ratio of inner and outer layer stream volumetric flows to cause the interior core stream to flow at a mid-plane region of substantially zero gradient in the transverse flow velocity profile of the extrusion; thereupon, for the major portion of the flow, varying the relative volumetric flow ratio of the inner and outer layer streams to offset the core layer stream from the mid-plane and shift the core layer closer to one of the inner or outer flow boundaries, thereby to produce a molded article wherein the major portion of the core layer within the article is closer to the inner or outer article wall.

17. The method claimed in claim 16 wherein said flow ratio is varied back to substantially 50:50 near the terminal end of the flow into the cavity.

18. The method claimed in claim 16 wherein the ratio is varied after a few percent of the core layer stream flow has initially flowed.

19. The method in claim 16 wherein the ratio is further varied during the continued flow to the gate region, and into the mold.

20. The method of claim 19 wherein said ratio is varied back to substantially 50:50 near the terminal end of the flow to re-establish the interior core stream flow back along substantially said zero gradient.

21. The method of claim 16 wherein the core layer stream material is selected for barrier function characteristics such as at least one of gas permeation control, gas-scavenging, and electromagnetic shielding.

22. The method of claim 1 wherein a plurality of similar extruder nozzles is provided similarly simultaneously fed from respective material sources, and with flow restriction inserted in corresponding inner and outer layer entry flow channels into each nozzle or in common feed channels from said sources.

23. The method of claim 1 wherein two interior streams are flowed within said inner and outer streams, with the flow of one of the interior stream started before the flow of the other interior stream and with its leading edge starting on said zero-gradient, and the subsequent initiation of the flow of said other interior stream offsetting the later-flowing portions of said one interior stream flow from said zero gradient, and with the completing of the injecting of the other interior stream before the completion of the injecting of said one interior stream through said gate region and into said mold cavity, and finishing the injecting of said interior stream on said zero gradient.

24. The method of claim 23 wherein the materials of the inner, outer and interior streams constitute three molding materials forming a four-layer molded article.

25. The method of claim 24 wherein the relative thickness and position of each of the interior streams is chosen to enhance the properties of the molded article.

26. The method of claim 25 wherein the innermost of the interior streams is of gas scavenging material in order to reduce the permeation rate of gas through said outer wall of the molded article, and to increase the rate of gas scavenging from the contents of the article if the scavenger material is intended to absorb gas permeating from the exterior of the article.

27. The method of claim 25 wherein the outermost of the interior streams is of humidity sensitive gas barrier material in order to position such barrier at a position within the molded article that is closer to the exterior atmosphere surrounding the article.

28. The method of claim 23 wherein the article is one of a cylindrical-shaped hollow container, such as a bottle, and a flat-shaped article.

* * * * *